United States Patent
Lee et al.

(10) Patent No.: US 11,721,343 B2
(45) Date of Patent: *Aug. 8, 2023

(54) HUB DEVICE, MULTI-DEVICE SYSTEM INCLUDING THE HUB DEVICE AND PLURALITY OF DEVICES, AND METHOD OF OPERATING THE SAME

(71) Applicant: SAMSUNG ELECTRONICS CO., LTD., Suwon-si (KR)

(72) Inventors: Yeonho Lee, Suwon-si (KR); Sangwook Park, Suwon-si (KR); Kookjin Yeo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 134 days.

This patent is subject to a terminal disclaimer.

(21) Appl. No.: 17/184,917

(22) Filed: Feb. 25, 2021

(65) Prior Publication Data
US 2021/0183393 A1 Jun. 17, 2021

Related U.S. Application Data

(63) Continuation of application No. 16/864,635, filed on May 1, 2020, now Pat. No. 10,964,327.

(30) Foreign Application Priority Data

May 2, 2019 (KR) .................. 10-2019-0051824
Oct. 4, 2019 (KR) .................. 10-2019-0123310
Mar. 4, 2020 (KR) .................. 10-2020-0027217

(51) Int. Cl.
*G10L 15/26* (2006.01)
*G10L 15/18* (2013.01)
(Continued)

(52) U.S. Cl.
CPC .............. *G10L 15/26* (2013.01); *G10L 15/18* (2013.01); *G10L 15/22* (2013.01); *G16Y 20/20* (2020.01)

(58) Field of Classification Search
CPC ......... G10L 15/26; G10L 15/18; G10L 15/22; G10L 15/1822; G10L 2015/223;
(Continued)

(56) References Cited

U.S. PATENT DOCUMENTS 5,335,816 A * 8/1994 Kaufman ................ G07F 11/14
                                                   221/124
6,757,718 B1   6/2004 Halverson et al.
(Continued)

FOREIGN PATENT DOCUMENTS

EP     3 382 698 A1   10/2018
JP     2014-510942 A   5/2014
(Continued)

OTHER PUBLICATIONS

Communication dated Mar. 30, 2022 issued by European Patent Office issued in EP Application No. 20172271.7.
(Continued)

*Primary Examiner* — Michael Colucci
(74) *Attorney, Agent, or Firm* — Sughrue Mion, PLLC

(57) ABSTRACT

A hub device, a multi-device system including the hub device, and a method of operating the same may include: converting, by the hub device, received voice input into text; identifying, by the hub device, a device capable of performing an operation corresponding to the text; identifying which device stores a function determination model corresponding to the device capable of performing the operation corresponding to the text, from among the hub device, and a plurality of other devices connected to the hub device; and based on the identified device that stores the function
(Continued)

determination model being a device that is different from the hub device, transmitting at least part of the text to the identified device.

20 Claims, 23 Drawing Sheets

Related U.S. Application Data

(60) Provisional application No. 62/905,707, filed on Sep. 25, 2019, provisional application No. 62/862,201, filed on Jun. 17, 2019.

(51) Int. Cl.
*G10L 15/22* (2006.01)
*G16Y 20/20* (2020.01)

(58) Field of Classification Search
CPC ... G10L 2015/228; G10L 15/30; G10L 15/01; G10L 15/32; G16Y 20/20
See application file for complete search history.

(56) References Cited

U.S. PATENT DOCUMENTS

| | | | |
|---|---|---|---|
| 9,558,740 B1 | 1/2017 | Mairesse et al. | |
| 9,734,839 B1 | 8/2017 | Adams | |
| 9,940,927 B2* | 4/2018 | Georges | G10L 15/08 |
| 9,978,367 B2* | 5/2018 | Aleksic | G06F 40/30 |
| 9,984,686 B1 | 5/2018 | Mutagi et al. | |
| 10,115,017 B2 | 10/2018 | Jeong et al. | |
| 10,127,908 B1 | 11/2018 | Deller et al. | |
| 10,217,463 B2 | 2/2019 | Juneja | |
| 10,810,997 B2 | 10/2020 | Yeracaris et al. | |
| 10,845,079 B1* | 11/2020 | Picardi | F24F 11/58 |
| 2010/0333163 A1 | 12/2010 | Daly | |
| 2011/0060587 A1* | 3/2011 | Phillips | G10L 15/30 704/235 |
| 2014/0309990 A1 | 10/2014 | Gandrabur et al. | |
| 2016/0104480 A1* | 4/2016 | Sharifi | G10L 15/32 704/254 |
| 2017/0025124 A1* | 1/2017 | Mixter | G10L 15/32 |
| 2017/0102681 A1* | 4/2017 | Verhoeven | G05B 15/02 |
| 2017/0206896 A1 | 7/2017 | Ko et al. | |
| 2018/0068663 A1 | 3/2018 | Choi | |
| 2018/0075490 A1 | 3/2018 | Chintalapoodi et al. | |
| 2018/0122378 A1 | 5/2018 | Mixter et al. | |
| 2018/0285065 A1 | 10/2018 | Jeong | |
| 2018/0337962 A1 | 11/2018 | Ly et al. | |
| 2018/0350353 A1 | 12/2018 | Gruber et al. | |
| 2019/0013024 A1 | 1/2019 | Jeon et al. | |
| 2019/0019112 A1 | 1/2019 | Gelfenbeyn et al. | |
| 2019/0019518 A1 | 1/2019 | Kojima et al. | |
| 2019/0066670 A1 | 2/2019 | White et al. | |
| 2019/0172465 A1 | 6/2019 | Lee et al. | |
| 2020/0117717 A1* | 4/2020 | Ramamurti | G10L 15/16 |
| 2020/0118548 A1* | 4/2020 | Huang | G10L 15/22 |
| 2020/0118559 A1* | 4/2020 | Huang | G06F 40/30 |
| 2020/0243093 A1 | 7/2020 | Choi | |
| 2020/0245423 A1* | 7/2020 | Honjo | F21V 23/0471 |

FOREIGN PATENT DOCUMENTS

| | | |
|---|---|---|
| JP | 2015-18238 A | 1/2015 |
| KR | 10-2018-0022021 A | 3/2018 |
| KR | 10-2018-0027950 A | 3/2018 |
| KR | 10-1909498 B1 | 10/2018 |
| KR | 10-1947079 B1 | 5/2019 |

OTHER PUBLICATIONS

Communication dated Dec. 14, 2021 by the Korean Intellectual Property Office in counterpart English Korean Patent Application No. 10-2021-0128348 translation.
Communication dated Jun. 29, 2021 issued by the Korean Patent Office in Counterpart Korean Application No. 10-2019-0092641.
Communication (PCT/ISA/220, PCT/ISA/210 and PCT/ISA/237) dated Jul. 15, 2020 by the International Searching Authority in counterpart International Patent Application No. PCT/KR2020/005052.
Communication (PCT/ISA/220, PCT/ISA/210 and PCT/ISA/237) dated Jul. 31, 2020 by the International Searching Authority in counterpart International Patent Application No. PCT/KR2020/005704.
Communication dated Dec. 24, 2020, issued by the Korean Intellectual Property Office in Korean Patent Application No. 10-2019-0092641.
Communication dated Sep. 23, 2020 by the European Patent Office in counterpart European Patent Application No. 20168960.1.
Communication dated Sep. 23, 2020 by the European Patent Office in counterpart European Patent Application No. 20172271.7.
Communication dated Mar. 2, 2023 by the European Patent Office in counterpart European Patent Application No. 22205263.1.

* cited by examiner

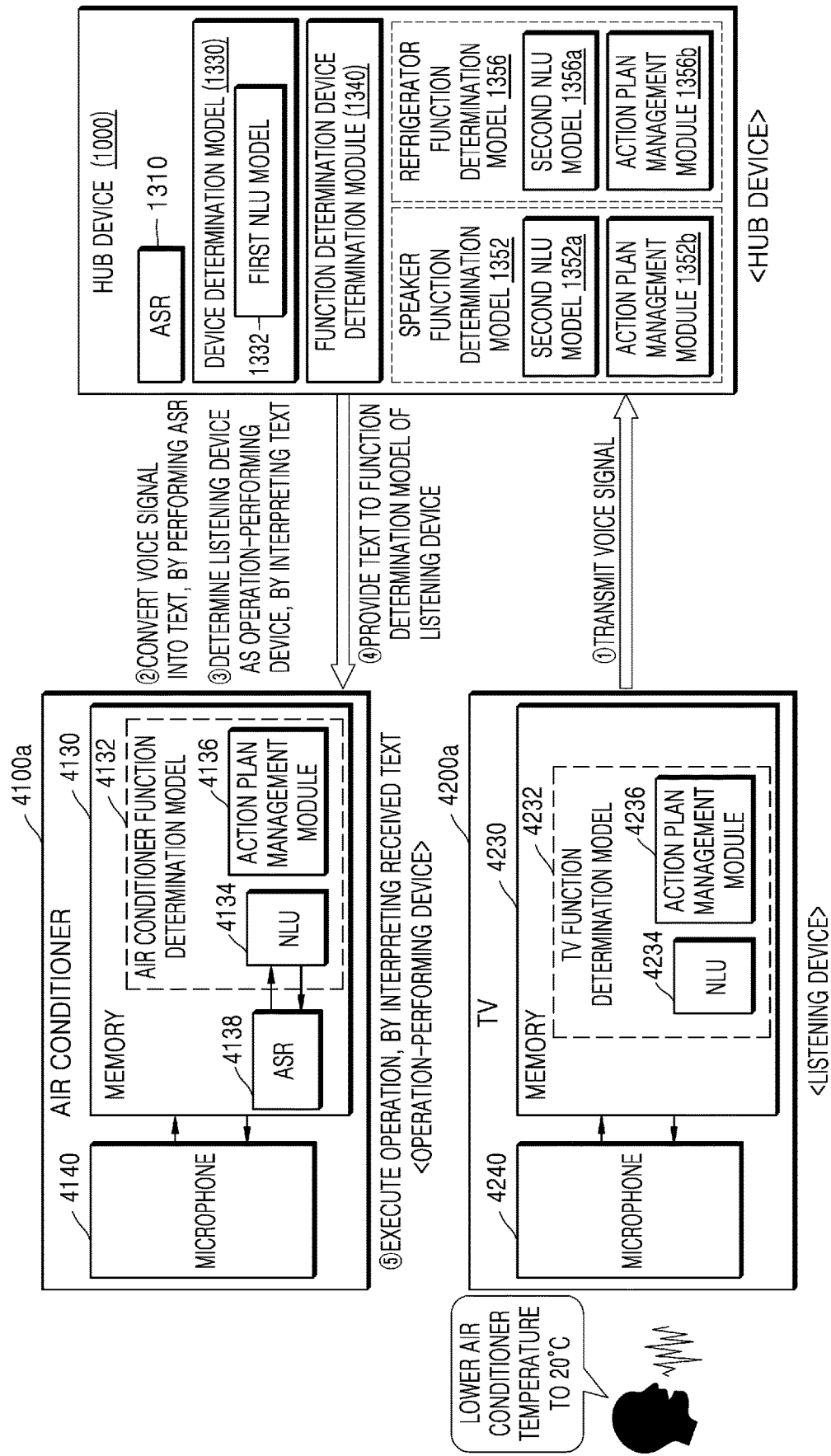

HUB DEVICE, MULTI-DEVICE SYSTEM INCLUDING THE HUB DEVICE AND PLURALITY OF DEVICES, AND METHOD OF OPERATING THE SAME

CROSS-REFERENCE TO RELATED APPLICATION

This application is a Continuation of U.S. application Ser. No. 16/864,635, filed May 1, 2020, which is based on and claims the benefit of U.S. Provisional Patent Application Nos. 62/862,201 and 62/905,707, respectively filed on Jun. 17, 2019 and Sep. 25, 2019, in the United States Patent and Trademark Office, and claims priority under 35 U.S.C. § 119 to Korean Patent Application Nos. 10-2019-0051824, 10-2019-0123310, and 10-2020-0027217, respectively filed on May 2, 2019, Oct. 4, 2019, and Mar. 4, 2020, in the Korean Intellectual Property Office, the disclosures of which are incorporated herein by reference in their entirety.

BACKGROUND

1. Field

The disclosure relates to a hub device, a multi-device system including the hub device, and a method of operating the hub device. For example, according to an embodiment, the hub device may determine an operation-performing device (e.g., an Internet of Things (IoT) device) for performing an operation according to a user's intention (e.g., included in a voice input received from the user) in a multi-device environment from among the hub device itself and a plurality of other electronic devices. According to an embodiment, the hub device may control the determined operation-performing device.

2. Description of Related Art

As multimedia technology and network technology have developed, users may receive various services by using devices IoT devices, such as, an air purifier or a television (TV)). In particular, with the development of voice recognition technology, such as, virtual personal assistant technology, a user may input a voice (e.g., an utterance) to a device (e.g., a listening device) and may receive a response message to the voice input through a service providing agent (e.g., a virtual assistant).

However, in a multi-device system such as a home network environment including a plurality of IoT devices, when a user wants to receive a service by using an unregistered IoT device that has not been registered to interact through a voice input or the like, the user has to inconveniently register the IoT device (e.g., including selecting an IoT device to provide the service). In particular, because types of services provided by the plurality of IoT devices are different, there is a demand for technology capable of recognizing an intention included in the voice input of the user and effectively providing a corresponding service.

In order to recognize an intention included in a voice input of a user, artificial intelligence (AI) technology may be used, and rule-based natural language understanding (NLU) technology may also be used. When a voice input of a user is received through a hub device, because the hub device may not directly select a device for providing a service according to the voice input and has to control the device by using a separate voice assistant service-providing server, the user may have to pay network usage fees, and because the voice assistant service-providing server is used, response speed is reduced.

SUMMARY

The disclosure relates to a hub device, a multi-device system including the hub device and a plurality of devices, and a method of operating the same, and more particularly, to a hub device, a multi-device system, and a method of operating the same which receive a voice input of a user, automatically determine a device for performing an operation according to the user's intention based on the received voice input, and provide pieces of information required to perform the service according to the determined device.

Additional aspects will be set forth in part in the description which follows and, in part, will be apparent from the description, or may be learned by practice of the presented embodiments of the disclosure.

According to an embodiment of the disclosure, a method, performed by a hub device, of controlling a device based on a voice input includes: receiving a voice input of a user; converting the received voice input into text by performing automatic speech recognition (ASR); determining an operation-performing device based on the text, by using a device determination model; identifying a device that stores a function determination model corresponding to the determined operation-performing device, from among a plurality of devices connected to the hub device; and providing at least part of the text to the identified device.

The device determination model may include a first natural language understanding (NLU) model configured to analyze the text and determine the operation-performing device based on a result of the analyzing of the text.

The function determination model may include a second NLU model configured to analyze at least part of the text and obtain operation information related to an operation to be performed by the determined operation-performing device based on a result of the analyzing of the at least part of the text.

The method may further include obtaining, from at least one device storing the function determination model used to determine a function related to each of the plurality of devices from among the plurality of devices, information about the function determination model stored in the at least one device.

The identifying of the device may include identifying the device storing the function determination model corresponding to the determined operation-performing device, based on the obtained information about the function determination model.

According to another embodiment of the disclosure, a hub device for controlling a device based on a voice input includes: a communication interface configured to perform data communication with at least one of a plurality of devices, a voice assistant server, or an Internet of Things (IoT) server; a microphone configured to receive a voice input of a user; a memory configured to store a program including one or more instructions; and a processor configured to execute the one or more instructions of the program stored in the memory, wherein the processor is further configured to execute the one or more instructions to convert the voice input received through the microphone into text by performing automatic speech recognition (ASR), determine an operation-performing device from among the plurality of devices based on the text, by using a device determination model, identify a device that stores a function determination model corresponding to the determined operation-performing device, by using a function determination device determination module, and control the communication interface to provide at least part of the text to the identified device.

The device determination model may include a first natural language understanding (NLU) model configured to analyze the text and determine the operation-performing device based on a result of the analyzing of the text.

The function determination model may include a second NLU model configured to analyze at least part of the text and obtain operation information about an operation to be performed by the determined operation-performing device based on an analysis result of the at least part of the text.

The processor may be further configured to execute the one or more instructions to control the communication interface to obtain, from at least one device storing the function determination model used to determine a function related to each of the plurality of devices from among the plurality of devices, information about the function determination model stored in the at least one device.

The processor may be further configured to execute the one or more instructions to identify the device storing the function determination model corresponding to the determined operation-performing device, based on the obtained information about the function determination model.

According to another embodiment of the disclosure, a method of operating a system including a hub device and a first device that stores a function determination model includes: receiving, by the hub device, a voice input of a user; converting the received voice input into text, by performing automatic speech recognition (ASR) by using data about an ASR module stored in a memory of the hub device; determining the first device as an operation-performing device based on the text, by using data about a device determination model stored in the memory of the hub device; obtaining, by the hub device, from the first device, information about the function determination model stored in the first device; and transmitting, by the hub device, at least part of the text to the first device, based on the obtained information about the function determination model.

The device determination model may include a first natural language understanding (NLU) model configured to analyze the text and determine the first device from among a plurality of devices as an operation-performing device based on an analysis result of the text.

The function determination model may include a second NLU model configured to analyze at least part of the text received from the hub device and obtain operation information about an operation to be performed by the first device based on an analysis result of the at least part of the text.

The method may further include analyzing, by the first device, the at least part of the text by using the second NLU model of the function determination model and obtain the operation information about the operation to be performed by the first device based on an analysis result of the at least part of the text.

The method may further include: generating, by the first device, a control command for controlling an operation of the first device based on the operation information; and executing, by the first device, the operation based on the control command.

According to another embodiment of the disclosure, a multi-device system includes a hub device and a first device that stores a function determination model, wherein the hub device includes: a communication device configured to perform data communication with the first device; a microphone configured to receive a voice input of a user; a memory configured to store a program including one or more instructions; and a processor configured to execute the one or more instructions of the program stored in the memory, wherein the processor is further configured to execute the one or more instructions to convert the voice input received through the microphone into text by performing automatic speech recognition (ASR), determine the first device as an operation-performing device based on the text, by using a device determination model, control the communication interface to obtain, from the first device, information about the function determination model stored in the first device, and control the communication interface to transmit at least part of the text to the first device, based on the obtained information about the function determination model.

The device determination model may include a first natural language understanding (NLU) model configured to analyze the text and determine the first device from among a plurality of devices as the operation-performing device based on a result of the analyzing of the text.

The first device may include a communication interface configured to receive the at least part of the text from the hub device, wherein the function determination model includes a second NLU model configured to analyze the received at least part of the text and obtain operation information about an operation to be performed by the first device based on an analysis result of the at least part of the text.

The first device may further include a processor configured to analyze the at least part of the text by using the second NLU model and obtain the operation information to be performed by the first device based on a result of the analyzing of the at least part of the text.

The processor of the first device may be further configured to control at least one element of the first device to generate a control command for controlling an operation of the first device based on the operation information and execute the operation based on the control command.

According to another embodiment of the disclosure, a method, performed by a hub device, of controlling a device, includes: receiving a voice signal from a listening device; converting the received voice signal into text, by performing automatic speech recognition (ASR); analyzing the text by using a first natural language understanding (NLU) model, and determining an operation-performing device corresponding to the analyzed text by using a device determination model; identifying a device that stores a function determination model corresponding to the determined operation-performing device from among the determined operation-performing device and the listening device; and providing at least part of the text to the identified device.

The device determination model may include the first NLU model configured to analyze the text and determine the operation-performing device based on an analysis result of the text.

The function determination model may include a second NLU model configured to analyze the at least part of the text and obtain operation information about an operation to be performed by the determined operation-performing device based on an analysis result of the at least part of the text.

The method may further include determining whether the determined operation-performing device is the same as the listening device.

Based on determining that the operation-performing device is the same as the listening device, the identifying of the device that stores the function determination model may include: obtaining function determination model information about whether the listening device stores the function determination model in an internal memory; and determining the listening device as the device that stores the function determination model, based on the obtained function determination model information.

Based on determining that the operation-performing device is a device different from the listening device, the identifying of the device that stores the function determination model may include: obtaining function determination model information about whether the determined operation-performing device stores the function determination model in an internal memory; and determining whether the operation-performing device is the device that stores the function determining model, based on the obtained function determination model information.

The method may further include: receiving update data of the device determination model from a voice assistant server; and updating the device determination model, by using the received update data.

The update data may include data for updating the device determination model to determine an updated function from the text and determine the operation-performing device corresponding to the updated function, based on update information of the function determination model included in at least one of the operation-performing device or the listening device.

The method may further include: receiving device information of a new device including at least one of device identification information, storage information of a device determination model, or storage information of a function determination model of the new device, from a voice assistant server; and updating the device determination model, by adding the new device to device candidates determinable as the operation-performing device by the device determination model by using the received device information of the new device.

According to another embodiment of the disclosure, a hub device for controlling a device includes: a communication interface configured to perform data communication with at least one of a voice assistant server or a plurality of devices including a listening device; a voice signal receiver configured to receive a voice signal from the listening device; a memory configured to store a program including one or more instructions; and a processor configured to execute the one or more instructions of the program stored in the memory, wherein the processor is further configured to convert the received voice signal into text, by performing automatic speech recognition (ASR), analyze the text by using a first natural language understanding (NLU) model and determine an operation-performing device corresponding to the analyzed text by using a device determination model, identify a device that stores a function determination model corresponding to the determined operation-performing device from among the determined operation-performing device and the listening device, and transmit at least part of the text to the identified device, by using the communication interface.

The device determination model may include the first NLU model configured to analyze the text and determine the operation-performing device based on an analysis result of the text.

The function determination model may include a second NLU model configured to analyze the at least part of the text and obtain operation information about an operation to be performed by the determined operation-performing device based on an analysis result of the at least part of the text.

The processor may be further configured to determine whether the determined operation-performing device is the same as the listening device.

Based on determining that the operation-performing device is the same as the listening, the processor may be further configured to obtain function determination model information about whether the listening device stores the function determination model in an internal memory and determine the listening device as the device that stores the function determination model based on the obtained function determination model information.

Based on determining that the operation-performing device is a device different from the listening device, the processor may be further configured to obtain function determination model information about whether the determined operation-performing device stores the function determination model in an internal memory and determine whether the operation-performing device is the device that stores the function determination model based on the obtained function determination model information.

The processor may be further configured to receive update data of the device determination model from the voice assistant server, by using the communication interface, and update the device determination model, by using the received update data.

The update data may include data for updating the device determination model to determine an updated function from the text and determine the operation-performing device corresponding to the updated function, based on update information of the function determination model included in at least one of the operation-performing device or the listening device.

The processor may be further configured to receive device information of a new device including at least one of device identification information, storage information of a device determination model, or storage information of a function determination model of the new device, from the voice assistant server by using the communication interface, and update the device determination model, by adding the new device to device candidates determinable as the operation-performing device by the device determination model by using the received device information of the new device.

According to an embodiment of the disclosure, a method may include: based on receiving a voice input of a user by a hub device: converting, by the hub device, the received voice input into text by performing automatic speech recognition (ASR); identifying, by the hub device, a device capable of performing an operation corresponding to the text; identifying which device stores a function determination model corresponding to the device capable of performing the operation corresponding to the text, from among the hub device, and a plurality of other devices connected to the hub device; and based on the identified device that stores the function determination model being a device that is different from the hub device, transmitting at least part of the text to the identified device. The hub device may include a hardware processor.

The identifying the first device as the device capable of performing the operation may further comprise: analyzing, using a first natural language understanding (NLU) model, the text, and determining the device capable of performing the operation based on a result of the analyzing of the text, wherein the NLU is a device determination model.

The method may further comprise analyzing, using a second natural language understanding (NLU) model included in the device determination model, at least part of the text and obtaining operation information related to the operation corresponding to the text, based on a result of the analyzing of the at least part of the text.

The method may further comprise obtaining, from at least one device storing the function determination model, information about the function determination model stored in the at least one device.

The identifying of which device stores the function determination model may comprise identifying the device storing the function determination model corresponding to the identified device capable of performing the operation, based on the obtained information about the function determination model.

According to an embodiment, a hub device for controlling a device based on a voice input may comprise: a communication interface configured to perform data communication with at least one of a plurality of devices, a voice assistant server, or an Internet of things (IoT) server; a microphone configured to receive a voice input of a user; a memory configured to store a program comprising one or more instructions; and a processor configured to execute the one or more instructions of the program stored in the memory, to: convert the voice input received through the microphone into text by performing automatic speech recognition (ASR), identify a device capable of performing an operation corresponding to the text; identify which device stores a function determination model corresponding to the device capable of performing the operation corresponding to the text, from among the hub device, and a plurality of other devices connected to the hub device; and based on the identified device that stores the function determination model being a device that is different from the hub device, control the communication interface to transmit at least part of the text to the identified device which stores the function determination model.

The processor may be further configured to identify the device capable of performing the operation corresponding to the text using a device determination model that comprises a first natural language understanding (NLU) model configured to analyze the text and determine the device capable of performing the operation corresponding to the text based on a result of the analyzing of the text.

The function determination model may comprise a second NLU model configured to analyze at least part of the text and obtain operation information about an operation to be performed by the device capable of performing the operation corresponding to the text based on a result of the analyzing of the at least part of the text.

The processor may be further configured to execute the one or more instructions to control the communication interface to obtain, from at least one device storing the function determination model used to determine a function related to each of the plurality of devices from among the plurality of devices, information about the function determination model stored in the at least one device.

The processor may be further configured to execute the one or more instructions to identify which device stores the function determination model corresponding to the device capable of performing the operation corresponding to the text, based on the obtained information about the function determination model.

According to an embodiment, a method of operating a system comprising a hub device and a first device that stores a function determination model, the method comprising: based on receiving, by a hub device a voice input of a user: converting, by the hub device, the received voice input into text, by performing automatic speech recognition (ASR) by using data about an ASR module stored in a memory of the hub device; identifying, by the hub device, the first device as a device capable of performing an operation corresponding to the text, by using data stored in the memory of the hub device; obtaining, by the hub device, from the first device, information about a function determination model stored in the first device; and transmitting, by the hub device, at least part of the text to the first device, based on the obtained information about the function determination model.

The identifying the first device as the device capable of performing the operation may further comprise: analyzing, using a first natural language understanding (NLU) model, the text, and determining the first device from among a plurality of devices as the device capable of performing an operation corresponding to the text based on a result of the analyzing of the text.

The method may further comprise analyzing, using the function determination model comprises using a second natural language understanding (NLU) model included in the device determination model, to analyze at least part of the text received from the hub device and obtaining operation information about an operation to be performed by the first device based on a result of the analyzing of the at least part of the text.

The method may further comprise analyzing, by the first device, the at least part of the text by using the second NLU model of the function determination model and obtaining the operation information about the operation to be performed by the first device based on a result of the analyzing of the at least part of the text.

The method may further comprise: generating, by the first device, a control command for controlling an operation of the first device based on the operation information; and executing, by the first device, the operation based on the control command.

According to an embodiment, a multi-device system may comprise a hub device and a first device that stores a function determination model, wherein the hub device comprises: a communication interface configured to perform data communication with the first device that stores a function determination model; a microphone configured to receive a voice input of a user; a memory configured to store a program comprising one or more instructions; and a processor configured to execute the one or more instructions of the program stored in the memory, to: convert the voice input received through the microphone into text by performing automatic speech recognition (ASR), identify the first device as a device capable of performing an operation corresponding to the text, control the communication interface to obtain, from the first device, information about the function determination model stored in the first device, and control the communication interface to transmit at least part of the text to the first device, based on the obtained information about the function determination model.

The processor may be further configured to identify the first device as the device capable of performing the operation corresponding to the text by using a device determination model that includes a first natural language understanding (NLU) model to analyze the text and determine the first device from among a plurality of devices as the device capable of performing an operation corresponding to the text based on a result of the analyzing of the text.

The first device may comprise a communication interface configured to receive the at least part of the text from the hub device, wherein the function determination model comprises a second NLU model configured to analyze the received at least part of the text and obtain operation information about an operation to be performed by the first device based on a result of the analyzing of the at least part of the text.

The first device may further comprise a processor configured to analyze the at least part of the text by using the second NLU model, and obtain the operation information to be performed by the first device based on a result of the analyzing of the at least part of the text.

The processor of the first device may be further configured to control at least one element of the first device to generate a control command for controlling an operation of the first device based on the operation information and execute the operation based on the control command.

According to an embodiment, a method may comprise: based on receiving a voice signal from a listening device by a hub device: converting, by the hub device, the received voice signal into text, by performing automatic speech recognition (ASR); analyzing the text by using a first natural language understanding (NLU) model, and identifying a device capable of performing an operation corresponding to the analyzed text by using a device determination model; identifying which device stores a function determination model corresponding to the device capable of performing the operation, from among the device capable of performing the operation and a listening device; and transmitting at least part of the text to the identified device.

The identifying the first device as the device capable of performing the operation may further comprise: analyzing, using the first NLU model included in the device determination model, the text; and determining the device capable of performing the operation based on an analysis result of the text.

The method may further comprise analyzing, using a second natural language understanding (NLU) model included in the device determination model, the at least part of the text and obtaining operation information about an operation to be performed by the device capable of performing the operation based on an analysis result of the at least part of the text.

The method may further comprise determining whether the device capable of performing the operation is the same as the listening device.

The method may further comprise based on determining that the device capable of performing the operation is the same as the listening device, the identifying of the device that stores the function determination model comprises: obtaining function determination model information about whether the listening device stores the function determination model in an internal memory; and determining the listening device as the device that stores the function determination model, based on the obtained function determination model information.

The method may further comprise based on determining that the device capable of performing the operation is a device different from the listening device, the identifying of the device that stores the function determination model comprises: obtaining function determination model information about whether the device capable of performing the operation stores the function determination model in an internal memory; and determining whether the device capable of performing the operation is the device that stores the function determining model, based on the obtained function determination model information.

The method may further comprise: receiving update data of the device determination model from a voice assistant server; and updating the device determination model, by using the received update data.

The update data may comprise data for updating the device determination model to determine an updated function from the text and determine the device capable of performing the operation corresponding to the updated function, based on update information of the function determination model included in at least one of the device capable of performing the operation or the listening device.

The method may further comprise: receiving device information of a new device comprising at least one of device identification information, storage information of a device determination model, or storage information of a function determination model of the new device, from a voice assistant server; and updating the device determination model, by adding the new device to device candidates determinable as the device capable of performing the operation by the device determination model by using the received device information of the new device.

According to an embodiment, a hub device may comprise: a communication interface configured to perform data communication with at least one of a voice assistant server or a plurality of devices comprising a listening device; a voice signal receiver configured to receive a voice signal from the listening device; a memory configured to store a program comprising one or more instructions; and a processor configured to execute the one or more instructions of the program stored in the memory, to: convert the received voice signal into text, by performing automatic speech recognition (ASR), analyze the text by using a first natural language understanding (NLU) model and identify a device capable of performing an operation corresponding to the analyzed text by using a device determination model, identify which device stores a function determination model corresponding to the device capable of performing the operation from among the device capable of performing the operation and the listening device, and transmit at least part of the text to the identified device that stores the function determination model, by using the communication interface.

The device determination model may comprise the first NLU model configured to analyze the text and determine the device capable of performing the operation based on an analysis result of the text.

The function determination model may comprise a second NLU model configured to analyze the at least part of the text and obtain operation information about an operation to be performed by device capable of performing the operation based on an analysis result of the at least part of the text.

The processor may be further configured to determine whether the device capable of performing the operation is the same as the listening device.

The processor may be further configured to: based on determining that the device capable of performing the operation is the same as the listening device, the processor is further configured to obtain function determination model information about whether the listening device stores the function determination model in an internal memory and determine the listening device as the device that stores the function determination model based on the obtained function determination model information.

The processor may be further configured to: based on determining that the device capable of performing the operation is a device different from the listening device, the processor is further configured to obtain function determination model information about whether the device capable of performing the operation stores the function determination model in an internal memory and determine whether the device capable of performing the operation is the device that stores the function determination model based on the obtained function determination model information.

The processor may be further configured to: receive update data of the device determination model from the voice assistant server, by using the communication interface, and update the device determination model, by using the received update data.

The update data may comprise data for updating the device determination model to determine an updated function from the text and determine the device capable of performing the operation corresponding to the updated function, based on update information of the function determination model included in at least one of the device capable of performing the operation or the listening device.

The processor may be further configured to: receive device information of a new device comprising at least one of device identification information, storage information of a device determination model, or storage information of a function determination model of the new device, from the voice assistant server by using the communication interface, and update the device determination model, by adding the new device to device candidates determinable as the device capable of performing the operation by the device determination model by using the received device information of the new device.

According to an embodiment, a method may comprise: based on detecting a user's speech by a hub device: converting, by the hub device, the received voice input into text by performing automatic speech recognition (ASR); identifying, by the hub device, an intent of the user; identifying, by the hub device, an Internet of Things (IoT) device capable of performing an operation corresponding to the text; identifying which device stores a function determination model corresponding to the IoT device capable of performing the operation corresponding to the text, from among the hub device, and a plurality of other devices connected to the hub device; and based on the identified device that stores the function determination model being a device that is different from the hub device, transmitting at least part of the text to the identified device.

The method may further comprise: storing, by the hub device, information regarding whether a function determination model of each of a plurality of IoT devices that are previously registered with a user account in association with information regarding a storage position of the function determination model of each of the plurality of devices in the form of a lookup table (LUT).

The method may further comprise: obtaining operation information about the operation corresponding to the text to be performed by the IoT device by using the function determination model.

BRIEF DESCRIPTION OF THE DRAWINGS

The above and other aspects, features, and advantages of certain embodiments of the disclosure will be more apparent from the following description taken in conjunction with the accompanying drawings and like reference numerals denote like structural elements, in which:

FIG. 12B is a conceptual diagram illustrating operations of the hub device and the plurality of devices according to an embodiment of the disclosure;

DETAILED DESCRIPTION

Figure 1:
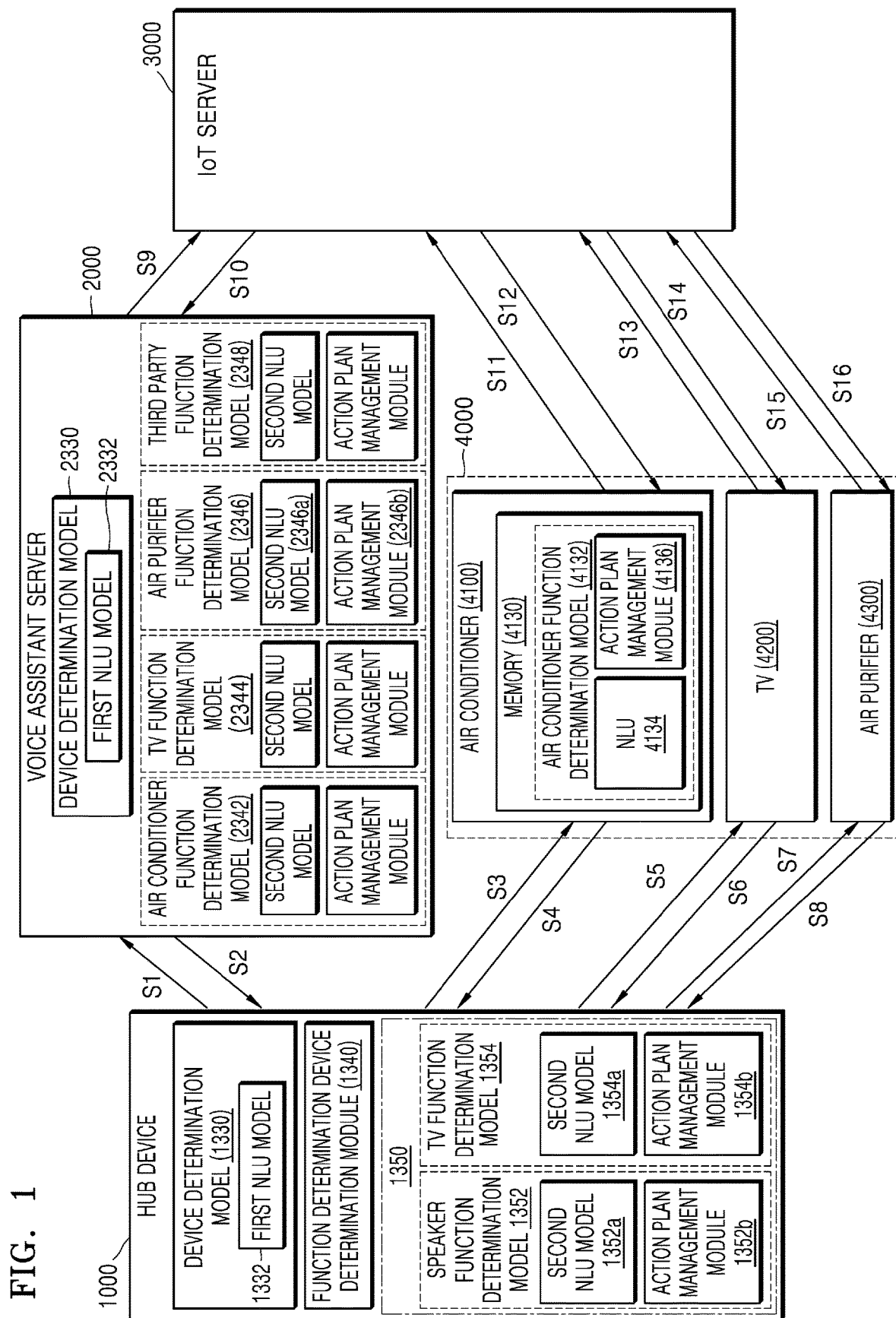
FIG. 1 is a block diagram illustrating some elements of a multi-device system including a hub device, a voice assistant server, an Internet of things (IoT) server, and a plurality of devices, according to an embodiment of the disclosure.

Although the terms used herein are selected from among common terms that are currently widely used in consideration of their functions in the disclosure, the terms may vary according the intention of one of ordinary skill in the art, a precedent, or the advent of new technology. Also, in particular cases, the terms are discretionally selected by the applicant of the disclosure, and the meaning of those terms will be described in detail in the corresponding part of the detailed description. Therefore, the terms used in the disclosure are not merely designations of the terms, but the terms are defined based on the meaning of the terms and content throughout the disclosure.

Throughout the disclosure, the expression "at least one of a, b or c" indicates only a, only b, only c, both a and b, both a and c, both b and c, all of a, b, and c, or variations thereof.

As used herein, the singular forms "a," "an," and "the" are intended to include the plural forms as well, unless the context clearly indicates otherwise. The terms including technical and scientific terms used herein have the same meaning as commonly understood by one of ordinary skill in the art to which the disclosure belongs.

Throughout the present application, when a part "includes" an element, it is to be understood that the part additionally includes other elements rather than excluding other elements as long as there is no particular opposing recitation. Also, the terms such as " . . . unit," "module," or the like used in the disclosure indicate a unit, which processes at least one function or motion, and the unit may be implemented as hardware or software, or a combination of hardware and software.

The expression "configured to (or set to)" used herein may be replaced with, for example, "suitable for," "having the capacity to," "designed to," "adapted to," "made to," or "capable of" according to cases. The expression "configured to (or set to)" may not necessarily mean "specifically designed to" in hardware. Instead, in some cases, the expression "system configured to . . . " may mean that the system is "capable of . . . " along with other devices or parts. For example, "a processor configured to (or set to) perform A, B, and C" may refer to a dedicated processor (e.g., an embedded processor) for performing a corresponding operation, or a general-purpose processor (e.g., a central processing unit (CPU) or an application processor (AP)) capable of performing a corresponding operation by executing one or more software programs stored in a memory.

According to an embodiment of the disclosure, the term "first natural language understanding (NLU) model" used herein may refer to a model trained to analyze text converted from a voice input and determine an operation-performing device based on an analysis result. The first NLU model may be used to determine an intent by interpreting text and determine an operation-performing device based on the intent.

According to an embodiment of the disclosure, the term "second NLU model" used herein may refer to a model trained to analyze text related to a specific device. The second NLU model may be a model trained to obtain operation information about an operation to be performed by the specific device by interpreting at least part of the text. A storage capacity of the second NLU model may be greater than a storage capacity of the first NLU model.

According to an embodiment of the disclosure, the term 'intent' used herein may refer to information indicating a user's intention determined by interpreting text. The intent that is information indicating the user's utterance intention may be information indicating an operation of an operation-performing device requested by the user. The intent may be determined by interpreting the text by using an NLU model. For example, based on the text converted from a voice input of the user being "play the movie Avengers on TV", the intent may be determined to be "content playback". Alternatively, based on the text converted from a voice input of the user being "lower the air conditioner temperature to 18° C.", the intent may be determined to be "temperature control".

According to an embodiment of the disclosure, the intent may include not only the information indicating the user's utterance intention (hereinafter, referred to as intention information) but also a numerical value corresponding to the information indicating the user's intention. The numerical value may indicate a probability that the text is related to information indicating a specific intention. After the text is interpreted by using the NLU model, when a plurality of pieces of intention information indicating the user's intention are obtained, intention information having a largest numerical value from among a plurality of numerical values corresponding to the plurality of pieces of intention information may be determined as the intent.

According to an embodiment of the disclosure, the term "operation" of a device used herein may refer to at least one action performed by the device when the device executes a specific function. According to an embodiment of the disclosure, the operation may indicate at least one action performed by the device when the device executes an application. For example, the operation may indicate, for example, one of: video playback, music playback, email creation, weather information reception, news information display, game play, and photography performed, when the device executes the application. However, the operation is not limited to the above examples.

According to an embodiment of the disclosure, the operation of the device may be performed based on information about a detailed operation output from an action plan management module. According to an embodiment of the disclosure, the device may perform at least one action by executing a function corresponding to the detailed operation output from the action plan management module. According to an embodiment of the disclosure, the device may store instructions for executing the function corresponding to the detailed operation, and when the detailed operation is determined, the device may determine instructions corresponding to the detailed operation and may execute a specific function by executing the instructions.

Also, according to an embodiment, the device may store instructions for executing an application corresponding to the detailed operation. According to an embodiment of the disclosure, the instructions for executing the application may include instructions for executing the application itself and instructions for executing a detailed function constituting the application. Based on determining the detailed operation, the device may execute the application by executing the instructions for executing the application corresponding to the detailed operation, and may execute the detailed function by executing the instructions for executing the detailed function of the application corresponding to the detailed operation.

According to an embodiment of the disclosure, the term "operation information" used herein may refer to information related to detailed operations to be determined by a device, a relationship between each of the detailed operations and another detailed operation, and an execution order of the detailed operations. According to an embodiment of the disclosure, the relationship between each of the detailed operations and another detailed operation may include, when a first operation is to be executed, information about a second operation that has to be executed before the first operation is executed. For example, when an operation to be performed is "music playback", "power on" may be another detailed operation that has to be executed before "music playback" is performed. According to an embodiment of the disclosure, the operation information may include, but is not limited to, one or more of: functions to be executed by an operation-performing device to perform a specific operation, an execution order of the functions, an input value required to execute the functions, and an output value output as an execution result of the functions.

According to an embodiment of the disclosure, the term "operation-performing device" used herein may refer to a device determined to perform an operation based on an intent obtained from text from among a plurality of devices. The text may be analyzed by using a first NLU model, and the operation-performing device may be determined based on an analysis result. According to an embodiment of the disclosure, the operation-performing device may perform at least one action by executing a function corresponding to a detailed operation output from an action plan management module. According to an embodiment of the disclosure, the operation-performing device may perform an operation based on operation information.

According to an embodiment of the disclosure, the term "action plan management module" used herein may refer to a module for managing detailed operations to be performed by an operation-performing device and operation information related to a detailed operation of a device to generate an execution order of the detailed operations. According to an embodiment of the disclosure, the action plan management module may manage operation information about detailed operations of devices according to device types and a relationship between the detailed operations.

According to an embodiment of the disclosure, the term "Internet of things (IoT) server" used herein may refer to a server that obtains, stores, and manages IoT device information about each of a plurality of devices (e.g., including IoT devices, mobile phones, etc.). The IoT server may obtain, determine, or generate a control command for controlling the device (e.g., an IoT device) by using the stored device information. According to an embodiment of the disclosure, the IoT server may transmit the control command to the device determined to perform an operation based on operation information. According to an embodiment of the disclosure, the IoT server may be implemented as, but not limited to, a hardware device independent of a "server" of the disclosure. According to an embodiment, the IoT server may be an element of a "voice assistant server" of the disclosure, or may be a server designed to be classified as software. Hereinafter, embodiments of the disclosure will be described in detail with reference to the attached drawings in order to enable one of ordinary skill in the art to easily embody and practice the disclosure. According to an embodiment of the disclosure, the disclosure may, however, be embodied in many different forms and should not be construed as being limited to the embodiments of the disclosure set forth herein.

Reference will now be made in detail to embodiments of the disclosure, examples of which are illustrated in the accompanying drawings.

FIG. 1 is a block diagram illustrating some elements of a multi-device system including a hub device 1000, a voice assistant server 2000, an IoT server 3000, and a plurality of devices 4000 according to an embodiment of the disclosure.

In an embodiment of FIG. 1, elements for describing operations of the hub device 1000, the voice assistant server 2000, the IoT server 3000, and the plurality of devices 4000 are illustrated. Elements included in the hub device 1000, the voice assistant server 2000, the IoT server 3000, and the plurality of devices 4000 are not limited to those illustrated in FIG. 1.

Reference numerals S1 through S16 marked by arrows in FIG. 1 denote data movement operations (transmission, or reception) between a plurality of entities through a network. Numbers attached to the English letter S in S1 through S16 are for convenience of explanation and are not related to an order of data movement operations (transmission, or reception).

Referring to FIG. 1, according to an embodiment of the disclosure, the hub device 1000, the voice assistant server 2000, the IoT server 3000, and the plurality of devices 4000 may be connected to one another by using a wired communication or wireless communication method and may perform communication. In an embodiment of the disclosure, the hub device 1000 and the plurality of devices 4000 may be directly connected to each other or connected via a communication network, but the disclosure is not limited thereto. According to an embodiment, the hub device 1000 and the plurality of devices 4000 may be connected to the voice assistant server 2000, and the hub device 1000 may be connected to the plurality of devices 4000 through the voice assistant server 2000. Also, according to an embodiment, the hub device 1000 and the plurality of devices 4000 may be connected to the IoT server 3000. In another embodiment of the disclosure, each of the hub device 1000 and the plurality of devices 4000 may be connected to the voice assistant server 2000 through a communication network, and may be connected to the IoT server 3000 through the voice assistant server 2000.

According to an embodiment, the hub device 1000, the voice assistant server 2000, the IoT server 3000, and the plurality of devices 4000 may be connected through one or more of: a local area network (LAN), a wide area network (WAN), a value-added network (VAN), a mobile radio communication network, a satellite communication network, or a combination thereof. Examples of the wireless communication method may include, but are not limited to, Wi-Fi (Wireless Fidelity), Bluetooth, Bluetooth low energy (BLE), Zigbee, Wi-Fi Direct (WFD), ultra-wideband (UWB), infrared data association (IrDA), or near-field communication (NFC).

According to an embodiment, the hub device 1000 may be a device that receives a voice input of a user and controls at least one of the plurality of devices 4000 based on the received voice input. According to an embodiment of the disclosure, the hub device 1000 may be a listening device that receives the voice input from the user.

According to an embodiment, at least one of the plurality of devices 4000 may be an operation-performing device that performs a specific operation by receiving a control command of the hub device 1000 or the IoT server 3000. According to an embodiment of the disclosure, the plurality of devices 4000 may be IoT devices that are logged in by using a same user account as a user account of the hub device 1000 and that are previously registered to the IoT server 3000 by using the user account of the hub device 1000.

According to an embodiment, at least one of the plurality of devices 4000 may be a listening device that receives speech data (e.g., a voice input from the user). The listening device may be, but is not limited to, a device that is designed for processing user speech (e.g., a device that only receives and processes a voice input from a human user, or from a specific registered user). In an embodiment of the disclosure, the listening device may be an operation-performing device that receives a control command from the hub device 1000 and performs an operation for a specific function.

According to an embodiment of the disclosure, at least one of the plurality of devices 4000 may receive the control command from the IoT server 3000 (S12, S14, and S16), or may receive at least part of text converted from the voice input from the hub device 1000 (S3 and S5). According to an embodiment of the disclosure, at least one of the plurality of devices 4000 may receive the control command from the IoT server 3000 (S12, S14, and S16) without receiving the at least part of the text from the hub device 1000.

According to an embodiment, the hub device 1000 may include a device determination model 1330 that determines a device for performing an operation based on the voice input of the user. According to an embodiment, the device determination model 1330 may determine an operation-performing device from among the plurality of devices 4000 that are registered according to the user account. In an embodiment of the disclosure, the hub device 1000 may receive, from the voice assistant server 2000, device information including at least one of identification information of each of the plurality of devices 4000 (e.g., device id information), a device type of each of the plurality of devices 4000, a function execution capability of each of the plurality of devices 4000, position information, or state information (S2). According to an embodiment, each of the plurality of devices 4000 are an IoT device. According to an embodiment, the hub device 1000 may determine the device (e.g., IoT device) for performing the operation according to the voice input of the user from among the plurality of devices 4000 based on the received device information, by using data about the device determination model 1330.

According to an embodiment of the disclosure, a function determination model corresponding to the operation-performing device determined by the hub device 1000 may be stored in a memory 1300 (see FIG. 2) of the hub device 1000, may be stored in the operation-performing device itself, or may be stored in a memory 2300 (see FIG. 3) of the voice assistant server 2000. According to an embodiment of the disclosure, the term "function determination model" corresponding to each device refers to a model used to obtain operation information about detailed operations for performing an operation according to a determined function of a device and a relationship between the detailed operations.

According to an embodiment of the disclosure, a function determination device determination module 1340 of the hub device 1000 may identify a device in which the function determination model corresponding to the operation-performing device is stored from among the hub device 1000, the voice assistant server 2000, and the operation-performing device by using a database 1360 including information about function determination models of devices stored in the memory. According to an embodiment of the disclosure, the database 1360 may include information about the plurality of devices 4000 registered with the user account associated with the hub device 1000. In detail, identification information (e.g., device identifier (ID) information) of each of the plurality of devices 4000, information about whether there exists a function determination model of each of the plurality of devices 4000, information about a storage position of the function determination model of each of the plurality of devices 4000 (e.g., identification information of the stored device/server, an Internet protocol (IP) address of the stored device/server, or a media access control (MAC) address of the stored device/server) may be stored. In an embodiment of the disclosure, the function determination device determination module 1340 may search the database 1360 according to device identification information of the operation-performing device output by the device determination model 1330 and may obtain information about a storage position of the function determination model corresponding to the operation-performing device based on a search result of the database 1360.

According to an embodiment of the disclosure, the hub device 1000 may transmit the at least part of the text converted from the voice input of the user to the device that is identified as storing the function determination model corresponding to the operation-performing device, by using the function determination device determination module 1340.

For example, based on the hub device 1000 receiving a voice input of the user saying "raise the temperature 1° C.", the hub device 1000 may determine that the device for raising the temperature is an air conditioner through the device determination model 1330. Next, according to an embodiment, the function determination device determination module 1340 may check whether a function determination model corresponding to the air conditioner is stored in the air conditioner (an IoT device), and, based on determining that it is stored in the air conditioner, may transmit text corresponding to "raise the temperature 1° C." to the air conditioner. According to an embodiment, the IoT device that can perform the operation of raising the air temperature (e.g., an air conditioner) may analyze the received text received through the stored function determination model corresponding to the air conditioner and perform a temperature control operation by using a text analysis result. That is, based on determining by the device determination model 1330 that an operation-performing device capable of performing the user's voice input is a first device 4100 that is the "air conditioner", because the function determination model corresponding to the air conditioner is stored in the first device 4100 itself, the function determination device determination module 1340 may transmit at least part of the text to the first device 4100 (S3) (e.g., the air conditioner).

For example, based on the hub device 1000 receiving a voice input of the user saying "change the channel", the hub device 1000 may determine that the device for changing the channel is a TV through the device determination model 1330. Next, according to an embodiment, the function determination device determination module 1340 may check whether a function determination model corresponding to the TV is stored in the hub device 1000 and may analyze text corresponding to "change the channel" through the stored function determination model corresponding to the TV. According to an embodiment, the hub device 1000 may determine a channel change operation as an operation to be performed by the TV by using a text analysis result and may transmit operation information about the channel change operation to the TV. That is, based on the device determination model 1330 determining that an operation-performing device is a second device 4200 that is the "TV", because the function determination model corresponding to the TV is stored in the hub device 1000, the function determination device determination module 1340 may provide (e.g., transmit) at least part of the text to a TV function determination model 1354 so that the hub device 1000 itself may process the at least part of the text.

For example, based on the hub device 1000 receiving a voice input of the user saying "execute the deodorization mode", the hub device 1000 may determine that the device for performing the deodorization mode is an air purifier through the device determination model 1330. Next, according to an embodiment, the function determination device determination module 1340 may check whether a function determination model corresponding to the air purifier is stored in the voice assistant server 2000 and may, based on determining that the function determination model corresponding to the air purifier is stored in the voice assistant server 200, transmit text corresponding to "execute the deodorization mode" to the voice assistant server 2000. According to an embodiment of the disclosure, the voice assistant server 2000 may analyze the received text through the function determination model corresponding to the air purifier and may determine a deodorization mode execution operation as an operation to be executed by the air purifier by using a text analysis result. According to an embodiment of the disclosure, the voice assistant server 2000 may transmit operation information about the deodorization mode execution operation to the air purifier, and in this case, the operation information about the deodorization mode execution operation may be transmitted through the IoT server 3000. That is, according to an embodiment, based on determining by the device determination model 1330 that an operation-performing device is a third device 4300 that is the "air purifier", because the function determination model corresponding to the air purifier is stored in the voice assistant server 2000, the function determination device determination module 1340 may transmit at least part of the text to the voice assistant server 2000 (S1).

In an embodiment of the disclosure, the hub device 1000 itself may store a function determination model corresponding to at least one of the plurality of devices 4000. For example, when the hub device 1000 is a voice assistant speaker, the hub device 1000 may store a speaker function determination model 1352 used to obtain operation information about detailed operations for performing a function of the voice assistant speaker and a relationship between the detailed operations.

According to an embodiment, the hub device 1000 may also store a function determination model corresponding to another device. For example, the hub device 1000 may store the TV function determination model 1354 used to obtain operation information about detailed operations corresponding to the TV and a relationship between the detailed operations. According to an embodiment of the disclosure, the TV may be a device previously registered to the IoT server 3000 by using the same user account as the user account of the hub device 1000.

According to an embodiment, the speaker function determination model 1352 and the TV function determination model 1354 may respectively include second NLU models 1352a and 1354a and action plan management modules 1532b and 1354b. The second NLU models 1352a and 1354a and the action plan management modules 1352b and 1354b are described with reference to FIG. 2.

According to an embodiment, the voice assistant server 2000 may determine an operation-performing device for performing an operation intended by the user, based on text received from the hub device 1000. According to an embodiment, the voice assistant server 2000 may receive user account information from the hub device 1000 (S1). According to an embodiment of the disclosure, based on the voice assistant server 2000 receiving the user account information from the hub device 1000, the voice assistant server 2000 may transmit, to the IoT server 3000, a query for requesting device information about the plurality of devices 4000 that are previously registered according to the received user account information (S9), and may receive the device information about the plurality of devices 4000 from the IoT server 3000 (S10). According to an embodiment, the voice device information may include at least one of identification information (e.g., device id information) of each of the plurality of devices 4000, a device type of each of the plurality of devices 4000, a function execution capability of each of the plurality of devices 4000, position information, or state information. According to an embodiment, the voice assistant server 2000 may transmit the device information received from the IoT server 3000 to the hub device 1000 (S2).

Elements of the hub device 1000, according to an embodiment, will be described with reference to FIG. 2.

According to an embodiment, the voice assistant server 2000 may include a device determination model 2330 and a plurality of function determination models 2342, 2344, 2346, and 2348. According to an embodiment, the voice assistant server 2000 may select a function determination model corresponding to at least part of text received from the hub device 1000 from among the plurality of function determination models 2342, 2344, 2346, and 2348 by using the device determination model 2330, and may obtain operation information needed for the operation-performing device to perform an operation by using the selected function determination model. According to an embodiment, the voice assistant server 2000 may transmit the operation information to the IoT server 3000 (S9).

Elements of the voice assistant server 2000, according to an embodiment of the disclosure, is described with reference to FIG. 3.

According to an embodiment, the IoT server 3000 may be connected through a network, and may store information about the plurality of devices 4000 that are previously registered by using the user account of the hub device 1000. In an embodiment of the disclosure, the IoT server 3000 may receive at least one of user account information which each of the plurality of devices 4000 is logged in using, identification information (e.g., device id information) of each of the plurality of devices 4000, a device type of each of the plurality of devices 4000, or function execution capability information of each of the plurality of devices 4000 (S11, S13, and S15). In an embodiment of the disclosure, the IoT server 3000 may receive state information about power on/off of each of the plurality of devices 4000 or an operation that is being executed from the plurality of devices 4000 (S11, S13, and S15). The IoT server 3000 may store the device information and the state information received from the plurality of devices 4000.

According to an embodiment, the IoT server 3000 may generate a control command readable and executable by the operation-performing device based on the operation information received from the voice assistant server 2000. According to an embodiment of the disclosure, the IoT server 3000 may transmit the control command to the device determined as the operation-performing device from among the plurality of devices 4000 (S12, S14, and S16).

Elements of the IoT server 3000, according to an embodiment, are described with reference to FIG. 4.

In an embodiment of FIG. 1, the plurality of devices 4000 may include the first device 4100, the second device 4200, and the third device 4300. Although the first device 4100 may be an air conditioner, the second device 4200 may be a TV, and the third device 4300 may be an air purifier in FIG. 1, the disclosure is not limited thereto. The plurality of devices 4000 may include not only an air conditioner, a TV, and an air purifier, but also other IoT devices, such as, a home appliance such as a robot cleaner, a washing machine, an oven, a microwave oven, a scale (e.g., a weight scale), a refrigerator, or an electronic picture frame and a mobile device such as a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, or a wearable device.

According to an embodiment, at least one of the plurality of devices 4000 itself may store a function determination model. For example, a function determination model 4132 used to obtain operation information about detailed operations needed for the first device 4100 to perform an operation determined from a voice input of the user and a relationship between the detailed operations and generate a control command based on the operation information may be stored in a memory 4130 of the first device 4100.

According to an embodiment, each of the second device 4200 and the third device 4300 from among the plurality of devices 4000 may not store a function determination model.

According to an embodiment, at least one of the plurality of devices 4000 may transmit information about whether the device itself stores a function determination model to the hub device 1000 (S4, S6, and S8).

According to an embodiment, the plurality of devices 4000 may further include a third party device that is not manufactured by the same manufacturer as that of the hub device 1000 (e.g., the third party device is manufactured by a different manufacturer that is different from the manufacturer of the hub device 1000), the voice assistant server 2000, and the IoT server 3000 and is not directly controlled by the hub device 1000, the voice assistant server 2000, and the IoT server 3000. The third party device will be described in detail with reference to FIG. 11.

Figure 2:
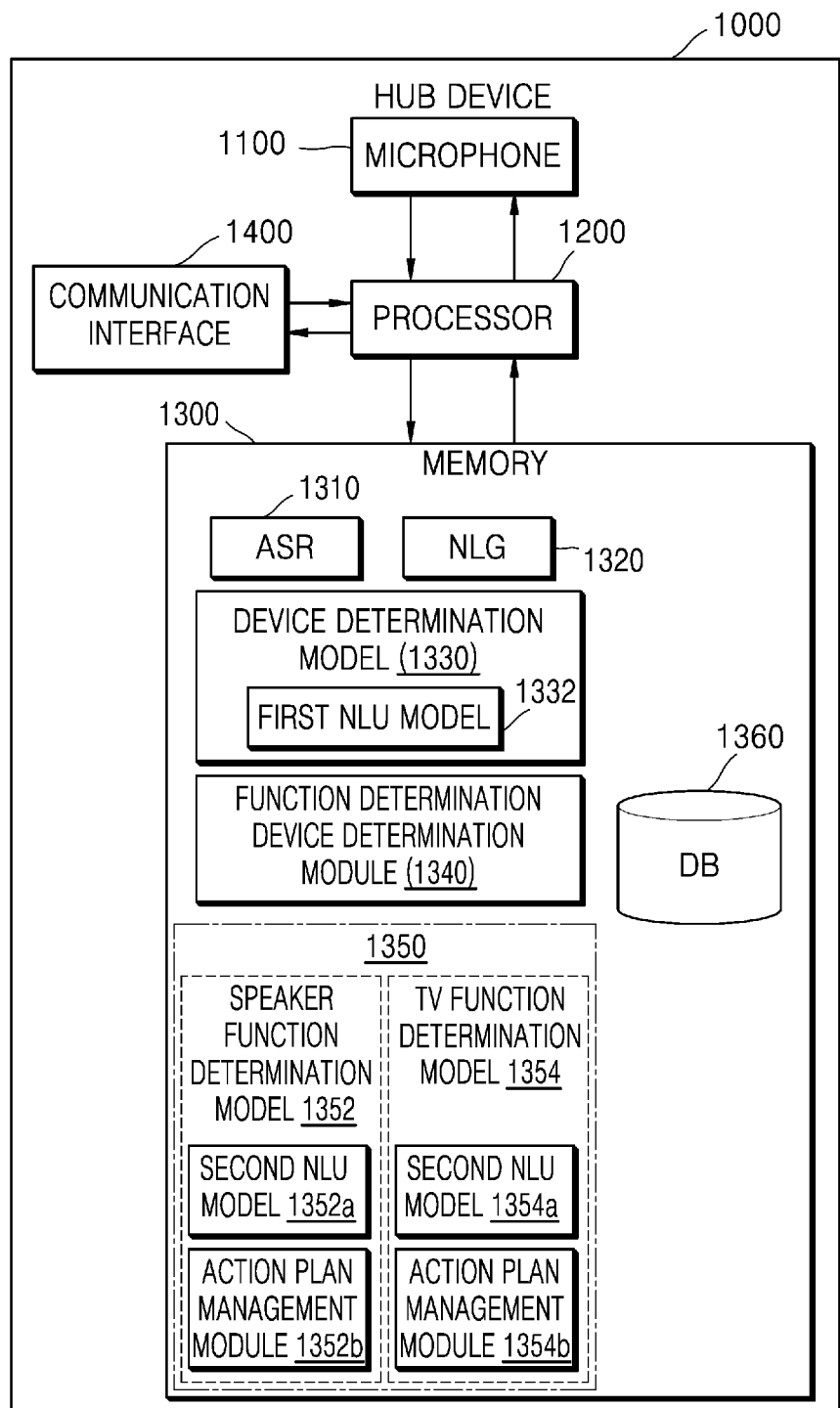
FIG. 2 is a block diagram illustrating elements of the hub device, according to an embodiment of the disclosure.

FIG. 2 is a block diagram illustrating elements of the hub device 1000 according to an embodiment of the disclosure.

According to an embodiment, the hub device 1000 may be a device that receives a voice input of a user and controls at least one of the plurality of devices 4000 based on the received voice input. According to an embodiment, the hub device 1000 may be a listening device that receives the voice input from the user.

Referring to FIG. 2, according to an embodiment, the hub device 1000 may include a microphone 1100, a processor 1200, a memory 1300, and a communication interface 1400. According to an embodiment, the hub device 1000 may receive the voice input (e.g., the user's utterance) from the user through the microphone 1100, and may obtain a voice signal from the received voice input. In an embodiment of the disclosure, the processor 1200 of the hub device 1000 may convert a sound received through the microphone 1100 into an acoustic signal, and may obtain the voice signal by removing noise (e.g., a non-voice component) from the acoustic signal.

However, the disclosure is not limited thereto, and the hub device 1000 may receive the voice signal from the listening device.

According to an embodiment, the hub device 1000 may include a voice recognition module having a function of detecting a designated voice input (e.g., a wake-up input such as "Hi, Bixby" or "OK, Google") or a function of pre-processing the voice signal obtained from part of the voice input.

According to an embodiment of the disclosure, the processor 1200 may execute one or more instructions of a program stored in the memory 1300. According to an embodiment of the disclosure, the processor 1200 may include hardware components that perform arithmetic, logic, and input/output operations and signal processing. According to an embodiment, the processor 1200 may include at least one of, but not limited to, a central processing unit (CPU), a microprocessor, a graphics processing unit (GPU), an application-specific integrated circuit (ASIC), a digital signal processor (DSP), a digital signal processing device (DSPD), a programmable logic device (PLD), or a field programmable gate array (FPGA).

According to an embodiment, a program may include one or more instructions for controlling the plurality of devices 4000 based on the voice input of the user received through the microphone 1100 may be stored in the memory 1300. According to an embodiment, instructions and/or program code readable by the processor 1200 may be stored in the memory 1300. In exemplary embodiments of the disclosure, the processor 1200 may be implemented by executing the instructions or the code stored in the memory.

According to an embodiment, one or more of or all of data about an automatic speech recognition (ASR) module 1310, data about a natural language generator (NLG) module 1320, data about the device determination model 1330, data about the function determination device determination module 1340, data corresponding to each of a plurality of function determination models 1350, and data corresponding to the database 1360 may be stored in the memory 1300.

According to an embodiment, the memory 1300 may include at least one type of storage medium from among a flash memory type, a hard disk type, a multimedia card micro type, a card type memory (e.g., an SD (secure digital) memory or XD (eXtreme Digital) memory), a random-access memory (RAM), a static random-access memory (SRAM), a read-only memory (ROM), an electrically erasable programmable read-only memory (EEPROM), a programmable read-only memory (PROM), a magnetic memory, a magnetic disk, and an optical disk.

According to an embodiment, the processor 1200 may perform ASR by using the data about the ASR module 1310 stored in the memory 1300, and may convert the voice signal received through the microphone 1100 into text.

However, the disclosure is not limited thereto. In an embodiment of the disclosure, the processor 1200 may receive the voice signal from the listening device through the communication interface 1400, and may convert the voice signal into text by performing ASR by using the ASR module 1310.

According to an embodiment, the processor 1200 may analyze the text by using the data about the device determination model 1330 stored in the memory 1300 and may determine an operation-performing device (e.g., an IoT device) from among the plurality of devices 4000 (e.g., a plurality of IoT devices) based on an analysis result of the text. According to an embodiment of the disclosure, the device determination model 1330 may include a first NLU model 1332. In an embodiment of the disclosure, the processor 1200 may analyze the text by using data about the first NLU model 1332 included in the device determination model 1330, and may determine the operation-performing device for performing an operation according to the user's intention from among the plurality of devices 4000 based on an analysis result of the text.

According to an embodiment, the first NLU model 1332 may be a model trained to analyze the text converted from the voice input and determine the operation-performing device based on an analysis result. According to an embodiment of the disclosure, the first NLU model 1332 may be used to determine an intent by interpreting the text and determine the operation-performing device based on the intent.

In an embodiment of the disclosure, the processor 1200 may parse the text in units of morphemes, words, or phrases by using the data about the first NLU model 1332 stored in the memory 1300 and may infer the meaning of a word extracted from the parsed text by using linguistic features (e.g., grammatical constituents) of the morphemes, words, or phrases. According to an embodiment, the processor 1200 may compare the inferred meaning of the word with pre-defined intents provided by the first NLU model 1332 and may determine an intent corresponding to the inferred meaning of the word.

According to an embodiment, the processor 1200 may determine a device related to the intent recognized from the text as the operation-performing device, based on a matching model for determining a relation between the intent and the device. In an embodiment of the disclosure, the matching model may be included in the data about the device determination model 1330 stored in the memory 1300 and may be obtained through learning through a rule-based system, but the disclosure is not limited thereto.

In an embodiment of the disclosure, the processor 1200 may obtain a plurality of numerical values indicating relation degrees between the intent and the plurality of devices 4000 by applying the matching model to the intent, and may determine a device having a largest numerical value from among the obtained plurality of numerical values as a final operation-performing device (e.g., an IoT device capable of performing the operation intended by the user's speech (voice input)). For example, based on the intent being related to each of the first device 4100 (see FIG. 1) and the second device 4200 (see FIG. 1), the processor 1200 may obtain a first numerical value indicating a relation degree between the intent and the first device 4100 and a second numerical value indicating a relation degree between the intent and the second device 4200, and may determine the first device 4100 having a larger numerical value from among the first numerical value and the second numerical value as the final operation-performing device.

For example, based on the hub device 1000 receiving a voice input of the user saying "lower the set temperature 2° C. because it is hot" from the user, the processor 1200 may perform ASR of converting the voice input into text and may obtain (e.g., by inferring) an intent corresponding to "set temperature adjustment" by analyzing the text by using the data related to the first NLU model 1332. According to an embodiment, the processor 1200 may obtain a first numerical value indicating a relation degree between the intent of "set temperature adjustment" and the first device 4100 that is an air conditioner, a second numerical value indicating a relation degree between the intent of "set temperature adjustment" and the second device 4200 that is a TV, and a third numerical value indicating a relation degree between the intent of "set temperature adjustment" and the third device 4300 (see FIG. 1) that is an air purifier, by applying the matching model. According to an embodiment, the processor 1200 may determine the first device 4100 as an operation-performing device related to 'set temperature adjustment' by using the first numerical value that is a largest value from among the obtained numerical values.

According to an embodiment, based on the hub device 1000 receiving a voice input of the user saying "play the movie Avengers" from the user, the processor 1200 may analyze text converted from the voice input and may obtain an intent corresponding to "content playback". According to an embodiment, the processor 1200 may determine the second device 4200 as an operation-performing device related to "content playback", based on second numerical value information that is a largest value from among a first numerical value indicating a relation degree between the intent of "content playback" and the first device 4100 that is an air conditioner, a second numerical value indicating a relation degree between the intent of "content playback" and the second device 4200 that is a TV, and a third numerical value indicating a relation degree between the intent of "content playback" and the third device 4300 that is an air purifier calculated by using the matching model.

However, the disclosure is not limited to the above examples, and the processor 1200 may arrange, in an ascending order, numerical values indicating relation degrees between an intent and a plurality of devices and may determine a pre-determined number of devices as operation-performing devices. In an embodiment of the disclosure, the processor 1200 may determine a device whose numerical value indicating a relation degree is equal to or greater than a predetermined critical value as an operation-performing device related to an intent. In this case, a plurality of devices may be determined as operation-performing devices.

According to an embodiment, the processor 1200 may train the matching model between an intent and an operation-performing device by using, for example, a ruble-based system, but the disclosure is not limited thereto. An AI model used by the processor 1200 may be, for example, a neural network-based system (e.g., a convolution neural network (CNN) or a recurrent neural network (RNN)), a support-vector machine (SVM), linear regression, logistic regression, Naïve Bayes, a random forest, a decision tree, or a k-nearest neighbor algorithm. Alternatively, the AI model may be a combination of the above examples or any of other AI models. According to an embodiment, AI models used by the processor 1200 may be stored in the device determination model 1330.

According to an embodiment, the device determination model 1330 stored in the memory 1300 of the hub device 1000 may determine an operation-performing device from among the plurality of devices 4000 that are registered according to a user account of the hub device 1000. According to an embodiment, the hub device 1000 may receive device information about each of the plurality of devices 4000 from the voice assistant server 2000, by using the communication interface 1400. According to an embodiment, the device information may include at least one of, for example, identification information (e.g., device id information) of each of the plurality of devices 4000, a device type of each of the plurality of devices 4000, a function execution capability of each of the plurality of devices 4000, position information, or state information. According to an embodiment, the processor 1200 may determine a device for performing an operation according to an intent from among the plurality of devices 4000 based on the device information, by using the data about the device determination model 1330 stored in the memory 1300.

In an embodiment of the disclosure, the processor 1200 may analyze numerical values indicating relation degrees between an intent and the plurality of devices 4000 that are previously registered by using the same user account as the user account of the hub device 1000 by using the device determination model 1330, and may determine a device having a largest value from among the numerical values indicating the relation degrees between the intent and the plurality of devices 4000 as an operation-performing device.

Because the device determination model 1330 is configured to determine an operation-performing device by using only the plurality of devices 4000 that are logged in and registered by using the same user account as that of the hub device 1000 as device candidates, there may be a technical effect in that the amount of calculation performed by the processor 1200 in order to determine a relation degree with the intent may be reduced to be less than that of a processor 2200 of the voice assistant server 2000. Also, due to the reduction in the amount of calculation, a processing time required to determine the operation-performing device may be reduced, and thus a response speed may be improved.

In an embodiment of the disclosure, the processor 1200 may obtain a name of a device from text by using the first NLU model 1332, and may determine an operation-performing device based on the name of the device by using the data about the device determination model 1330 stored in the memory 1300. In an embodiment of the disclosure, the processor 1200 may extract a common name related to the device and a word or a phrase regarding an installation position of the device from the text by using the first NLU model 1332, and may determine the operation-performing device based on the extracted common name and installation position of the device. For example, when text converted from a voice input is "play the movie Avengers on TV", the processor 1200 may parse the text in units of words or phrases by using the first NLU model 1332, and may recognize the name of the device corresponding to 'TV' by comparing a word or a phrase with pre-stored words or phrases. According to an embodiment, the processor 1200 may determine the second device 4200, which is logged in by using the same account as the user account of the hub device 1000 and is a TV from among the plurality of devices 4000 connected to the hub device 1000, as an operation-performing device.

In an embodiment of the disclosure, any one of the plurality of devices 4000 may be a listening device that receives a voice input from the user, and the processor 1200 may determine the listening device as an operation-performing device by using the device determination model 1330. However, the disclosure is not limited thereto, and the processor 1200 may determine a device other than the listening device from among the plurality of devices 4000 as an operation-performing device, by using the device determination model 1330.

According to an embodiment, the processor 1200 may receive update data of the device determination model 1330 from the voice assistant server 2000, by using the communication interface 1400. In an embodiment of the disclosure, an updated latest function may be included in at least one of the plurality of devices 4000, or a new device having a new function may be added to the user account. In this case, the device determination model 1330 of the hub device 1000 may fail to determine the new function of the plurality of devices 4000 or may fail to determine the added new device as an operation-performing device. According to an embodiment, the processor 1200 may update the device determination model 1330 to a latest version, by using the received update data. According to an embodiment, the latest version may be the same as a version of the device determination model 2330 (see FIG. 3) of the voice assistant server 2000.

According to an embodiment, the update data of the device determination model 1330 may include data updated so that the device determination model 1330 may determine detailed operation information about an updated latest function of each of the plurality of devices 4000 connected by the user account and may determine an operation-performing device that performs the updated latest function from text. In an embodiment of the disclosure. According to an embodiment, the update data of the device determination model 1330 may include information about a function of a new device newly added to the user account.

An embodiment of updating the device determination model 1330 is described with reference to FIGS. 17 and 18.

According to an embodiment, the processor 1200 may receive device information of a new device from the voice assistant server 2000, by using the communication interface 1400. According to an embodiment, the device information obtained by the processor 1200 of the hub device 1000 from the voice assistant server 2000 may include at least one of, for example, device identification information (e.g., device id information) of the new device, storage information of a device determination model of the new device, or storage information of a function determination model of the new device. According to an embodiment, the new device may be a target device expected to be registered in a user account of the voice assistant server 2000.

According to an embodiment, the processor 1200 may add the new device to the device candidates that may be determined as an operation-performing device by the device determination model 1330, by using the device information of the new device obtained from the voice assistant server 2000. In an embodiment of the disclosure, because the device determination model 1330 causes the new device to be included in the device candidates, the processor 1200 may improve device determination capability to determine an operation-performing device from text.

An embodiment of registering the new device is described with reference to FIG. 19.

According to an embodiment, the NLG model 1320 may be used to provide a response message during an interaction between the hub device 1000 and the user. For example, the processor 1200 may generate a response message such as "I will play the movie on TV" or "I will lower the set temperature of the air conditioner by 2° C." by using the NLG model 1320.

According to an embodiment, when there exists a plurality of operation-performing devices determined by the processor 1200 or there exists a plurality of devices having similar relation degrees with an intent, the NLG model 1320 may store data used to generate a query message for determining a specific operation-performing device. In an embodiment of the disclosure, the processor 1200 may generate a query message for selecting one operation-performing device from among a plurality of device candidates by using the NLG model 1320. According to an embodiment, the query message may be a message for requesting a response from the user regarding which one of the plurality of device candidates is to be identified (determined) as an operation-performing device.

According to an embodiment, the function determination device determination module 1340 may be a module used to identify a device in which a function determination model corresponding to the operation-performing device is stored and may determine a target device to which at least part or the text or all of the whole text is to be transmitted. According to an embodiment, the function determination device determination module 1340 may identify a device in which the function determination model corresponding to the operation-performing device is stored from among the hub device 1000, the voice assistant server 2000, and the operation-performing device by using the database 1360 including information about function determination models of devices. In an embodiment of the disclosure, when the hub device 1000 receives a voice signal from a listening device, the function determination device determination module 1340 may identify a device in which the function determination model corresponding to the operation-performing device is stored from among the hub device 1000, an internal memory of the operation-performing device, an internal memory of the listening device, and the voice assistant server 2000, by using the database 1035.

According to an embodiment, information about whether a function determination model of each of the plurality of devices 4100 that are previously registered by using the user account may be stored, and information about a storage position of the function determination model of each of the plurality of devices 4000 (e.g., device identification information, an IP address, or a MAC address) may be stored in the form of a lookup table (LUT) in the database 1360. In an embodiment of the disclosure, the function determination device determination module 1340 may search the lookup table in the database 1360 according to device identification information of the operation-performing device output by the device determination model 1330 and may obtain information about a storage position of the function determination model corresponding to the operation-performing device based on a search result of the lookup table.

In an embodiment of the disclosure, the function determination device determination module 1340 itself may store the data used to determine the target device to which the whole text or at least part of the whole text is to be transmitted. According to an embodiment, the processor 1200 may identify the device storing the function determination model corresponding to the operation-performing device by using the data about the function determination device determination module 1340.

According to an embodiment, the function determination model corresponding to the operation-performing device may be stored in the memory 1300 of the hub device 1000, may be stored in a memory of the operation-performing device itself, or may be stored in the memory 2300 of the voice assistant server 2000.

According to an embodiment, the term "function determination model corresponding to the operation-performing device" refers to a model used to obtain operation information about detailed operations for performing an operation according to a determined function of the operation-performing device and a relationship between the detailed operations. In an embodiment of the disclosure, the speaker function determination model 1352 and the TV function determination model 1354 stored in the memory 1300 of the hub device 1000 may respectively correspond to a plurality of devices that are logged in by using the same account as the user account and are connected to the hub device 1000 through a network.

For example, the speaker function determination model 1352 that is a first function determination model may be a model used to obtain operation information about detailed operations for performing an operation according to a function of the first device 4100 (see FIG. 1) and a relationship between the detailed operations. In an embodiment of the disclosure, the speaker function determination model 1352 may be, but is not limited to, a model used to obtain operation information according to a function of the hub device 1000. Likewise, the TV function determination model 1354 that is a second function determination model may be a model used to obtain operation information about detailed operations for performing an operation according to a function of the second device 4200 (see FIG. 1) and a relationship between the detailed operations.

According to an embodiment, the speaker function determination model 1352 and the TV function determination model 1354 may respectively include the second NLU models 1352a and 1354a configured to analyze at least part of text and obtain operation information about an operation to be performed by an operation-performing device determined based on an analysis result of the at least part of the text. According to an embodiment, the speaker function determination model 1352 and the TV function determination model 1354 may respectively include action plan management modules 1352b and 1354b configured to manage operation information related to a detailed operation of a device in order to generate detailed operations to be performed by the device and an execution order of the detailed operations. According to an embodiment, the action plan management modules 1352b and 1354b may mange operation information about detailed operations of devices according devices and a relationship between the detailed operations. According to an embodiment, the action plan management modules 1352b and 1354b may plan detailed operations to be performed by a device and an execution order of the detailed operations, based on an analysis result of at least part of text.

According to an embodiment, a plurality of function determination models of a plurality of devices, e.g., the speaker and TV function determination models 1352 and 1354, may be stored in the memory 1300 of the hub device 1000.

As described above, according to an embodiment, the processor 1200 may check whether a function determination model corresponding to an operation-performing device is stored in the memory 1300 by searching the lookup table stored in the database 1360 by using the data about the function determination device determination module 1340. For example, based on determining that the operation-performing device is the first device 4100, a function determination model corresponding to the first device 4100 may not be stored in the memory 1300 of the hub device 1000. In this case, according to an embodiment, the processor 1200 may check that the function determination model corresponding to the operation-performing device is not stored in the hub device 1000. As another example, based on determining that the operation-performing device is the second device 4200, the TV function determination model 1354 corresponding to the second device 4200 may be stored in the memory 1300 of the hub device 1000. In this case, according to an embodiment, the processor 1200 may check that the function determination model corresponding to the operation-performing device is stored in the hub device 1000.

According to an embodiment, when the processor 1200 checks that the function determination model corresponding to the operation-performing device is stored in the hub device 1000, the processor 1200 may provide at least part of text to the function determination model corresponding to the operation-performing device stored in the hub device 1000, by using the data about the function determination device determination module 1340. For example, when the operation-performing device is the second device 4200, the TV function determination model 1354 corresponding to a TV that is the second device 4200 may be stored in the memory 1300 of the hub device 1000, and thus the processor 1200 may provide the at least part of the text to the TV function determination model 1354 by using the function determination device determination module 1340.

In an embodiment of the disclosure, the processor 1200 may transmit only a portion of the whole text (instead of the whole text) to the TV function determination model 1354. For example, when text converted from a voice input is "play the movie Avengers on TV", "on TV" specifies a name of an operation-performing device and thus may be unnecessary information for the TV function determination model 1354. According to an embodiment, processor 1200 may parse the text in units of words or phrases by using the first NLU model 1332, may recognize a word or a phrase specifying a name, a common name, or an installation position of a device, and may provide remaining part of the text other than the word or phrase recognized in the entire text to the TV function determination model 1354.

According to an embodiment, the processor 1200 may obtain operation information about an operation to be performed by the operation-performing device by using the function determination model corresponding to the operation-performing device stored in the memory 1300, for example, the second NLU model 1354a of the TV function determination model 1354. According to an embodiment, the second NLU model 1354a that is a model specialized for a specific device (e.g., a TV) may be an AI model trained to obtain an intent related to a device corresponding to an operation-performing device determined by the first NLU model 1332 and corresponding to text. Also, the second NLU model 1354a may be a model trained to determine an operation of the device related to the user's intention by interpreting the text. According to an embodiment, the operation may refer to at least one action performed by the device when the device executes a specific function. The operation may indicate at least one action performed by the device when the device executes an application.

In an embodiment of the disclosure, the processor 1200 may analyze the text by using the second NLU model 1354a of the TV function determination model 1354 corresponding to the determined operation-performing device (e.g., a TV). According to an embodiment, the processor 1200 may parse text in units of morphemes, words, or phrases by using the second NLU model 1354a, may recognize the meaning of a morpheme, a word, or a phrase parsed through grammatical or semantic analysis, and may determine an intent and parameters by matching the recognized meaning to predefined words. According to an embodiment, the term "parameters" used herein refers to variable information for determining detailed operations of an operation-performing device related to the intent. For example, when text transmitted to the TV function determination model 1354 is "play the movie Avengers on TV", an intent may be "content playback" and parameters may be "the movie Avengers" that is information about content to be played.

According to an embodiment, the processor 1200 may obtain operation information about at least one detailed operation related to the intent and the parameters, by using the action plan management module 1354b of the TV function determination model 1354. According to an embodiment, the action plan management module 1354b may manage information about detailed operations of devices according to devices and a relationship between the detailed operations. According to an embodiment, the processor 1200 may plan detailed operations to be performed by an operation-performing device (e.g., a TV) and an execution order of the detailed operations based on the intent and the parameters by using the action plan management module 1354b, and may obtain operation information. According to an embodiment, the operation information may be information related to detailed operations to be performed by a device and an execution order of the detailed operations. According to an embodiment, the operation information may include information related to detailed operations to be performed by a device, a relationship between each of the detailed operations and another detailed operation, and an execution order of the detailed operations. The operation information may include, but is not limited to, functions to be executed by an operation-performing device to perform a specific operation, an execution order of the functions, an input value required to execute the functions, and an output value output as an execution result of the functions.

According to an embodiment, the processor 1200 may generate a control command for controlling the operation-performing device based on the operation information. According to an embodiment, the control command may refer to instructions readable and executable by the operation-performing device so that the operation-performing device performs the detailed operations included in the operation information. According to an embodiment, the processor 1200 may control the communication interface 1400 to transmit the generated control command to the operation-performing device.

In an embodiment of the disclosure, the processor 1200 may obtain information about a function determination model from the plurality of devices 4000 that are logged in by using the same account as the user account of the hub device 1000 and are connected through a network to the hub device 1000, through the communication interface 1400. According to an embodiment, the information about the function determination model may include information regarding whether each of the plurality of devices 4000 stores a function determination model. Referring to FIG. 1, although the first device 4100 from among the plurality of devices 4000 may store the function determination model 4132 in the memory 4130 in an embodiment of FIG. 1, the second device 4200 and the third device 4300 may not have function determination models (or may not have the function determination model 4132). According to an embodiment, when information about whether at least one of the first device 4100, the second device 4200, or the third device 4300 stores a function determination model is transmitted to the hub device 1000 (S4, S6, and S8), the hub device 1000 may provide the information about the function determination model obtained through the communication interface 1400 to the processor 1200.

In an embodiment of the disclosure, the processor 1200 may obtain the information about the function determination model of the plurality of devices 4000 (see FIG. 1) from the voice assistant server 2000 (see FIG. 1) through the communication interface 1400. According to an embodiment, each of the plurality of devices 4000 may be registered according to the user account by being logged in when the user inputs a user id and a password, and user account information and device information of each of the plurality of devices 4000 may be transmitted to the IoT server 3000. In this case, information about whether each of the plurality of devices 4000 itself stores a device determination model and stores a function determination model may also be transmitted to the IoT server 3000. According to an embodiment, the IoT server 3000 may transmit the device information about the plurality of devices 4000 registered in the user account information, the information about the device determination model, and the information about the function determination model to the voice assistant server 2000. According to an embodiment, the voice assistant server 2000 may transmit the device information about the plurality of devices 4000, the information about the device determination model, and the information about the function determination model to the hub device 1000 having the same user account information. According to an embodiment, the hub device 1000 may store the information about the function determination model of each of the plurality of devices 4000 in the form of a lookup table in the database 1360.

However, the disclosure is not limited thereto, and the hub device 1000 may receive the information about the function determination model from at least one of the plurality of devices 4000. In an embodiment of the disclosure, the processor 1200 may control the communication interface 1400 to receive the information about the function determination model from at least one device storing the function determination model used to determine a function of each of the plurality of devices 4000. According to an embodiment, based on the information about the function determination model of the plurality of devices 4000 being received, the processor 1200 may control the communication interface 1400 to also receive information about a storage position of the function determination model of each of the plurality of devices 4000 (e.g., device identification information, an IP address, or a MAC address).

According to an embodiment, the processor 1200 may store the received information about the function determination model and the received information about the storage position of the function determination model of each device in the database 1360. In an embodiment of the disclosure, the processor 1200 may store the information about the storage position of the function determination model and the information about whether the function determination model is stored according to a name or identification information of a device in the form of a lookup table.

According to an embodiment, the processor 1200 may obtain the information about the function determination model of each device by searching the lookup table stored in the database 1360, and may identify a device that stores the function determination model corresponding to the operation-performing device based on the obtained information about the function determination model. For example, according to an embodiment, when an operation-performing device determined based on text is the first device 4100, the processor 1200 may determine the first device 4100 itself as a device storing the function determination model 4132 (see FIG. 1) based on the information about the function determination model obtained from the first device 4100. In this case, the processor 1200 may determine the first device 4100 as a target device to which at least part of the text is to be transmitted, by using the data about the function determination device determination module 1340. According to an embodiment, the processor 1200 may control the communication interface 1400 to transmit the at least part of the text to the function determination model 4132 of the first device 4100.

In an embodiment of the disclosure, the processor 1200 may control the communication interface 1400 to separate part about a name of the operation-performing device from the text and transmit only remaining part of the text to the first device 4100. For example, when the first device 4100 is an air conditioner and text is "lower the set temperature 2° C. in the air conditioner", "in the air conditioner" does not need to be transmitted when the text is transmitted to the air conditioner. In this case, the processor 1200 may parse the text in units of words or phrases, may recognize a word or a phrase specifying a name, a common name, an installation position, or the like of the first device 4100, and may provide remaining part of the text other than the word or phrase recognized in the entire text to the first device 4100.

According to an embodiment, when the processor 1200 is to identify a device that stores the function determination model corresponding to the operation-performing device based on the obtained information about the function determination model, the processor 1200 may check whether the function determination model is not stored in the operation-performing device. For example, based on determining that the operation-performing device is the third device 4300, according to an embodiment, a function determination model is not stored in the third device 4300. According to an embodiment, the function determination model corresponding to the third device 4300 is not stored in the hub device 1000 as well. In this case, the processor 1200 may check that the function determination model corresponding to the operation-performing device is not stored in any of the hub device 1000 and the plurality of devices 4000, by using the data about the function determination device determination module 1340. According to an embodiment, the processor 1200 may determine that a target device to which at least part of text is to be transmitted is the voice assistant server 2000, by using the data about the function determination device determination module 1340. According to an embodiment, the processor 1200 may control the communication interface 1400 to transmit the at least part of the text to the voice assistant server 2000.

In an embodiment of the disclosure, the function determination device determination module 1340 may be configured to determine whether the operation-performing device determined by the device determination model 1330 is the same as a listening device. In an embodiment of the disclosure, when the processor 1200 receives a voice signal from the listening device through the communication interface 1400, the processor 1200 may also receive device identification information of the listening device (e.g., device id information of the listening device). According to an embodiment, the function determination device determination module 1340 may check function information of the listening device from the device identification information of the listening device, and may determine whether the listening device and the operation-performing device are the same, by comparing the function information of the listening device with function information of the operation-performing device.

According to an embodiment, based on determining that the operation-performing device is the same as the listening device, the processor 1200 may determine whether the listening device stores a function determination model in an internal memory by using data about the function determination device determination module 1340. According to an embodiment, when the function determination model stored in the internal memory of the listening device is the same as a function determination model corresponding to the operation-performing device, the processor 1200 may transmit at least part of text to the function determination model that is previously stored in the internal memory of the listening device, by using the communication interface 1400. In an embodiment of the disclosure, the processor 1200 may control the communication interface 1400 to separate part about a name of the operation-performing device from the text and transmit only remaining part of the text to the listening device. For example, when the listening device is an air conditioner and text is "lower the set temperature to 20° C. in the air conditioner", "in the air conditioner" does not need to be transmitted when the text is transmitted to the air conditioner. In this case, the processor 1200 may parse the text in units of words or phrases, may recognize a word or phrase specifying a name, a common name, an installation position, or the like of the listening device, and may provide remaining part of the text other than the word or phrase recognized in the entire text to the listening device.

According to an embodiment, when the function determination model stored in the internal memory of the listening device is not the same as the function determination model corresponding to the operation-performing device, the processor 1200 may transmit at least part of the text to the voice assistant server 2000, by using the communication interface 1400.

According to an embodiment, based on determining that the operation-performing device is a separate device that is not the same as the listening device, the processor 1200 may determine whether the operation-performing device stores a function determination model in an internal memory by using the data about the function determination device determination module 1340. According to an embodiment, when the function determination model is stored in the internal memory of the operation-performing device, the processor 1200 may transmit at least part of the text to the function determination model that is previously stored in the internal memory of the operation-performing device, by using the communication interface 1400. In an embodiment of the disclosure, the processor 1200 may control the communication interface 1400 to separate part about a name of the operation-performing device from the text and transmit only remaining part of the text to the operation-performing device.

According to an embodiment, when the function determination model is not stored in the internal memory of the operation-performing device, the processor 1200 may transmit at least part of the text to the voice assistant server 2000, by using the communication interface 1400.

According to an embodiment, it may be determined whether the operation-performing device and the listening device are the same and at least part of the text may be transmitted to any one of the operation-performing device, the listening device, or the voice assistant server, which will be described with reference to FIG. 14.

According to an embodiment, the communication interface 1400 may perform data communication with the voice assistant server 2000, the IoT server 3000, and the plurality of devices 4000. According to an embodiment, the communication interface 1400 may perform data communication with one or more of the voice assistant server 2000, the IoT server 3000, and the plurality of devices 4000 by using at least one of data communication methods including wireless LAN, Wi-Fi, Bluetooth, Zigbee, WFD, IrDA, BLE, NFC, wireless broadband Internet (Wibro), world interoperability for microwave access (WiMAX), shared wireless access protocol (SWAP), wireless gigabit alliance (WiGig), or radio-frequency (RF) communication.

According to an embodiment, the database 1360 may store identification information of each of the plurality of devices 4000, information about whether there exists a function determination model, and information about a storage position of the function determination model of each of the plurality of devices 4000 (e.g., identification information of a stored device, an IP address of the stored device, or a MAC address of the stored device).

Although the database 1360 may be stored in the memory 1300 in FIG. 2, the database 1360 may be stored in a memory separate from the memory 1300.

In an embodiment (e.g., of FIGS. 1 and 2), the hub device 1000 may include the device determination model 1330 configured to determine an operation-performing device by using only the plurality of devices 4000, which are logged in by using the same user account information as that of the hub device 1000 and registered according to the user account information, as device candidates, and the function determination device determination module 1340 may be configured to identity a device storing a function determination model corresponding to the operation-performing device determined by the device determination model 1330 and may determine at least part of text to be transmitted to the identified device. Because the hub device 1000 includes some of models included in the voice assistant server 2000, determines the operation-performing device by using the models, and controls an operation of the operation-performing device, it is not necessary to operate the voice assistant server 2000 by using a network in all processes, and thus network usage fees may be reduced and server operation efficiency may be improved. Also, because the operation-performing device is determined by using only a plurality of devices registered by using the user account of the hub device 1000 as device candidates, the amount of calculation and a processing time may be reduced and a response speed may be improved.

Figure 3:
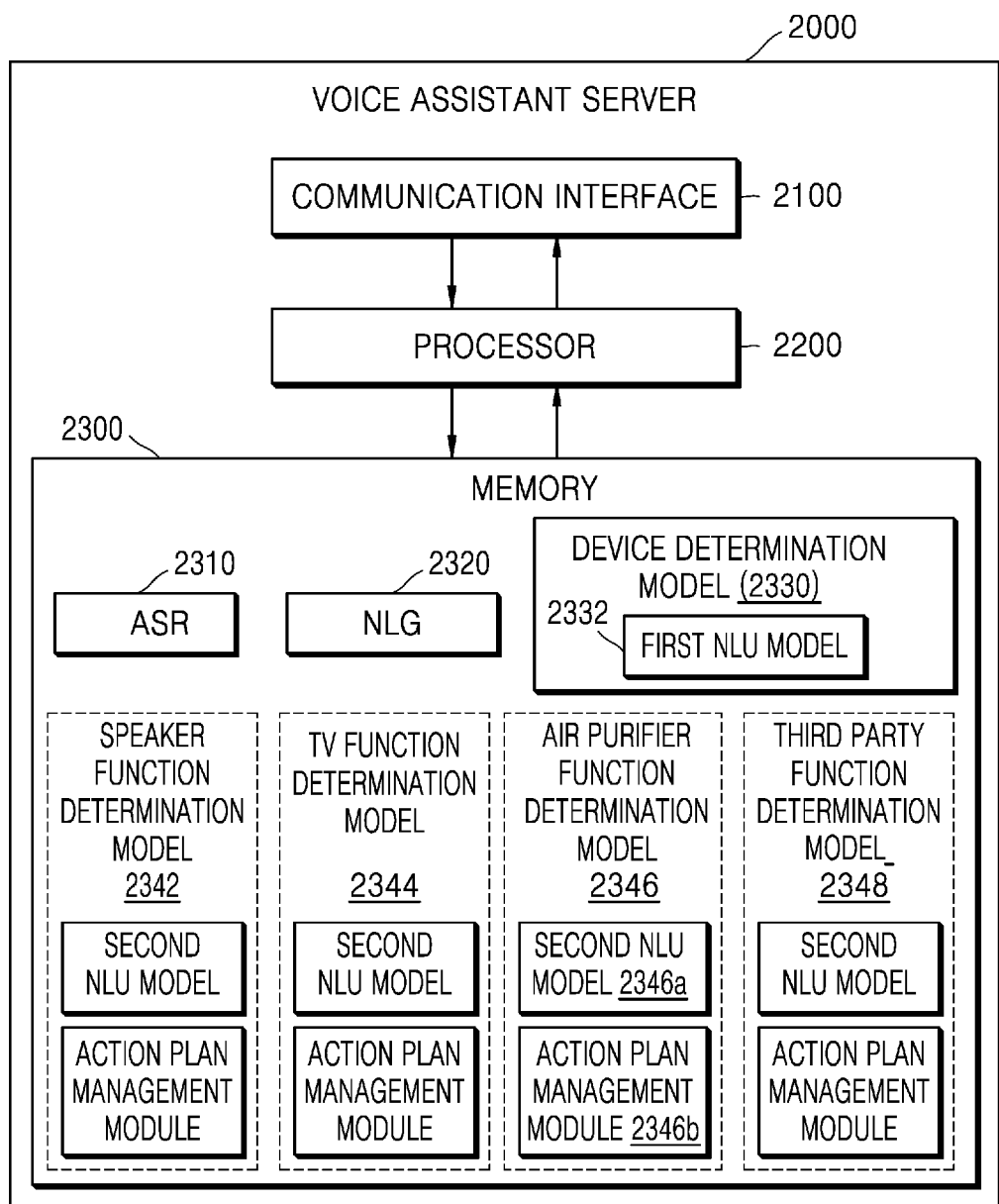
FIG. 3 is a block diagram illustrating elements of the voice assistant server, according to an embodiment of the disclosure.

FIG. 3 is a block diagram illustrating elements of the voice assistant server 2000 according to an embodiment of the disclosure.

According to an embodiment, the voice assistant server 2000 may be a server that receives text converted from a voice input of a user from the hub device 1000, determines an operation-performing device based on the received text, and obtains operation information by using a function determination model corresponding to the operation-performing device.

Referring to FIG. 3, according to an embodiment, the voice assistant server 2000 may include at least a communication interface 2100, the processor 2200, and the memory 2300.

According to an embodiment, the communication interface 2100 of the voice assistant server 2000 may receive, from the IoT server 3000, device information including at least one of identification information (e.g., device id information) of each of the plurality of devices 4000 (see FIG. 1), a device type of each of the plurality of devices 4000, a function execution capability of each of the plurality of devices 4000, position information, or state information, by performing data communication with the IoT server 3000 (see FIG. 1). In an embodiment of the disclosure, the voice assistant server 2000 may receive, from the IoT server 3000, information about a function determination model of each of the plurality of devices 4000 through the communication interface 2100. According to an embodiment, the voice assistant server 2000 may receive user account information from the hub device 1000 through the communication interface 2100, and may transmit the device information about the plurality of devices 4000 registered according to the received user account information and the information about the function determination model to the hub device 1000.

According to an embodiment, the processor 2200 and the memory 2300 of the voice assistant server 2000 may perform functions that are the same as or similar to those of the processor 1200 (see FIG. 2) and the memory 1300 (see FIG. 2) of the hub device 1000 (see FIG. 2). Accordingly, the same description of the processor 2200 and the memory 2300 of the voice assistant server 2000 as that made for the processor 1200 and the memory 1300 of the hub device 1000 is not provided here.

According to an embodiment, the memory 2300 of the voice assistant server 2000 may store data about one or more or all of: an ASR module 2310, data about an NLG module 2320, data about a device determination model 2330, and data corresponding to each of a plurality of function determination models 2340. According to an embodiment, the memory 2300 of the voice assistant server 2000 may store the plurality of function determination models 2340 corresponding to a plurality of devices related to a plurality of different user accounts, instead of the plurality of function determination models 1350 (see FIG. 2) stored in the memory 1300 of the hub device 1000. Also, according to an embodiment, the plurality of function determination models 2340 for more types of devices than the plurality of function determination models 1350 stored in the memory 1300 of the hub device 1000 may be stored in the memory 2300 of the voice assistant server 2000. A total capacity of the plurality of function determination models 2340 stored in the memory 2300 of the voice assistant server 2000 may be greater than a capacity of the plurality of function determination models 1350 stored in the memory 1300 of the hub device 1000.

According to an embodiment, when at least part of text is received from the hub device 1000, the communication interface 2100 of the voice assistant server 2000 may transmit the received at least part of the text to the processor 2200, and the processor 2200 may analyze the at least part of the text by using a first NLU model 2332 stored in the memory 2300. According to an embodiment, the processor 2200 may determine an operation-performing device related to the at least part of the text based on an analysis result, by using the data about the device determination model 2330 stored in the memory 2300. According to an embodiment, the processor 2200 may select a function determination model corresponding to the operation-performing device from among a plurality of function determination models stored in the memory 2300, and may obtain operation information about detailed operations for performing a function of the operation-performing device and a relationship between the detailed operations by using the selected function determination model.

For example, based on determining that the operation-performing device is the third device 4300 that is an air purifier, the processor 2200 may analyze the at least part of the text by using a second NLU model 2346a of the function determination model 2346 corresponding to the air purifier, and may obtain operation information by planning detailed operations to be performed by a device and an execution order of the detailed operations by using an action plan management module 2346b. A detailed description thereof is the same as the description of the hub device 1000, and thus a repeated explanation will be omitted.

According to an embodiment, based on the hub device 1000 transmitting at least part of a whole text of the user's speech, the voice assistant server 2000 may determine an operation-performing device related to the at least part of the whole text, and may obtain operation information for performing an operation of the operation-performing device. The part of the whole text may be less than the whole text of the user's speech, according to an embodiment. According to an embodiment, the voice assistant server 2000 may transmit the obtained operation information to the IoT server 3000 through the communication interface 2100.

According to an embodiment, the voice assistant server 2000 may receive update request information of a function determination model and device identification information from an operation-performing device from among the plurality of devices 4000. According to an embodiment, the update request information of the function determination model may be information for requesting to synchronize a version of a function determination model stored in a memory of the operation-performing device with a version of a function determination model corresponding to the operation-performing device from among the plurality of function determination models 2342, 2344, 2346, and 2348 stored in the voice assistant server 2000. According to an embodiment, the processor 2200 of the voice assistant server 2000 may identify the function determination model corresponding to the operation-performing device, based on the device identification information received from the operation-performing device, and may check version information of the identified function determination model. According to an embodiment, the processor 2200 may transmit update data for updating the function determination model of the operation-performing device to the operation-performing device, by using the communication interface 2100.

In an embodiment of the disclosure, based on the operation-performing device receiving a control command from the IoT server 3000, the processor 2200 may control the communication interface 2100 to transmit the update data for updating the function determination model to the operation-performing device.

In an embodiment of the disclosure, the processor 2200 may control the communication interface 2100 to periodically transmit update data of a function determination model to a device that stores the function determination model from among the plurality of devices 4000 connected by a user account of the hub device 1000. In an embodiment of the disclosure, when the processor 2200 transmits update data for updating an application or firmware to a device that stores a function determination model from among the plurality of devices 4000 connected by the user account of the hub device 1000, the processor 2200 may control the communication interface 2100 to also transmit update data of the function determination model.

In an embodiment of the disclosure, a new device may be registered in user account information registered to the IoT server 300. In this case, the processor 2200 may receive user account information, a device list updated to include the new device, and storage information of a device determination model and a function determination model of each device candidate included in the device list from the IoT server 3000 by using the communication interface 2100. According to an embodiment, the processor 2200 may identify a device in which the device determination model is stored from among a plurality of devices registered according to a user account, based on the storage information of the device determination model, and may determine the identified device as a hub device. According to an embodiment, the processor 2200 may transmit device identification information of the new device, and the storage information of the device determination model and the function determination model to the hub device, by using the communication interface 2100. An embodiment of registering the new device is described with reference to FIG. 19.

Figure 4:
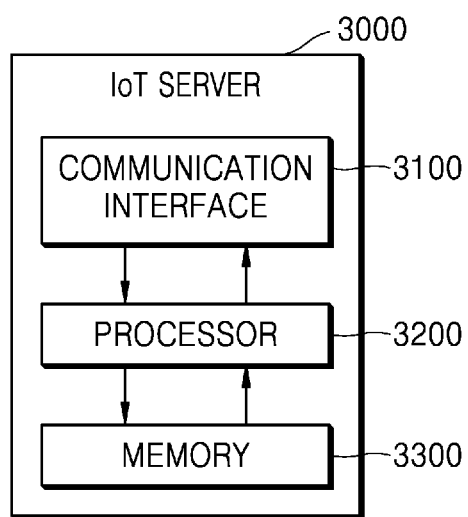
FIG. 4 is a block diagram illustrating elements of the IoT server, according to an embodiment of the disclosure.

FIG. 4 is a block diagram illustrating elements of the IoT server 3000 according to an embodiment of the disclosure.

According to an embodiment, the IoT server 3000 may be a server that obtains, stores, and manages device information about each of the plurality of devices 4000 (see FIG. 1). According to an embodiment, the IoT server 3000 may obtain, determine, or generate a control command for controlling a device by using the stored device information. Although the IoT server 3000 is implemented as an independent hardware device separate from the voice assistant server 2000 in FIG. 1, the disclosure is not limited thereto. In an embodiment of the disclosure, the IoT server 3000 may be an element of the voice assistant server 2000 (see FIG. 1), or may be a server designed to be classified as software.

According to an embodiment, referring to FIG. 4, the IoT server 3000 may include at least a communication interface 3100, a processor 3200, and a memory 3300.

According to an embodiment, the IoT server 3000 may be connected via a network to an operation-performing device or the voice assistant server 2000 through the communication interface 3100, and may receive or transmit data. According to an embodiment, the IoT server 3000 may transmit data stored in the memory 3300 to the voice assistant server 2000 or the operation-performing device through the communication interface 3100 under the control of the processor 3200. Also, the IoT server 3000 may receive data from the voice assistant server 2000 or the operation-performing device through the communication interface 3100 under the control of the processor 3200.

In an embodiment of the disclosure, the communication interface 3100 may receive device information including at least one of device identification information (e.g., device id information), function execution capability information, position information, or state information from each of the plurality of devices 4000 (see FIG. 1). In an embodiment of the disclosure, the communication interface 3100 may receive user account information from each of the plurality of devices 4000. Also, the communication interface 3100 may receive information about power on/off or an operation that is being performed from the plurality of devices 4000. According to an embodiment, the communication interface 3100 may provide the received device information to the memory 3300.

According to an embodiment, the memory 3300 may store the device information received through the communication interface 3100. In an embodiment of the disclosure, the memory 3300 may classify the device information according to the user account information received from the plurality of devices 4000 and may store the classified device information in the form of a lookup table.

In an embodiment of the disclosure, the communication interface 3100 may receive a query for requesting the user account information and the device information about the plurality of devices 4000 that are previously registered by using the user account information from the voice assistant server 2000. According to an embodiment, in response to the received query, the processor 3200 may obtain, from the memory 3300, the device information about the plurality of devices 4000 that are previously registered by using a user account, and may control the communication interface 3100 to transmit the obtained device information to the voice assistant server 2000.

According to an embodiment, the processor 3200 may control the communication interface 3100 to transmit a control command to the operation-performing device determined to perform an operation, based on operation information received from the voice assistant server 2000. According to an embodiment, the IoT server 3000 may receive an operation performing result according to the control command through the communication interface 3100 from the operation-performing device.

Figure 5:
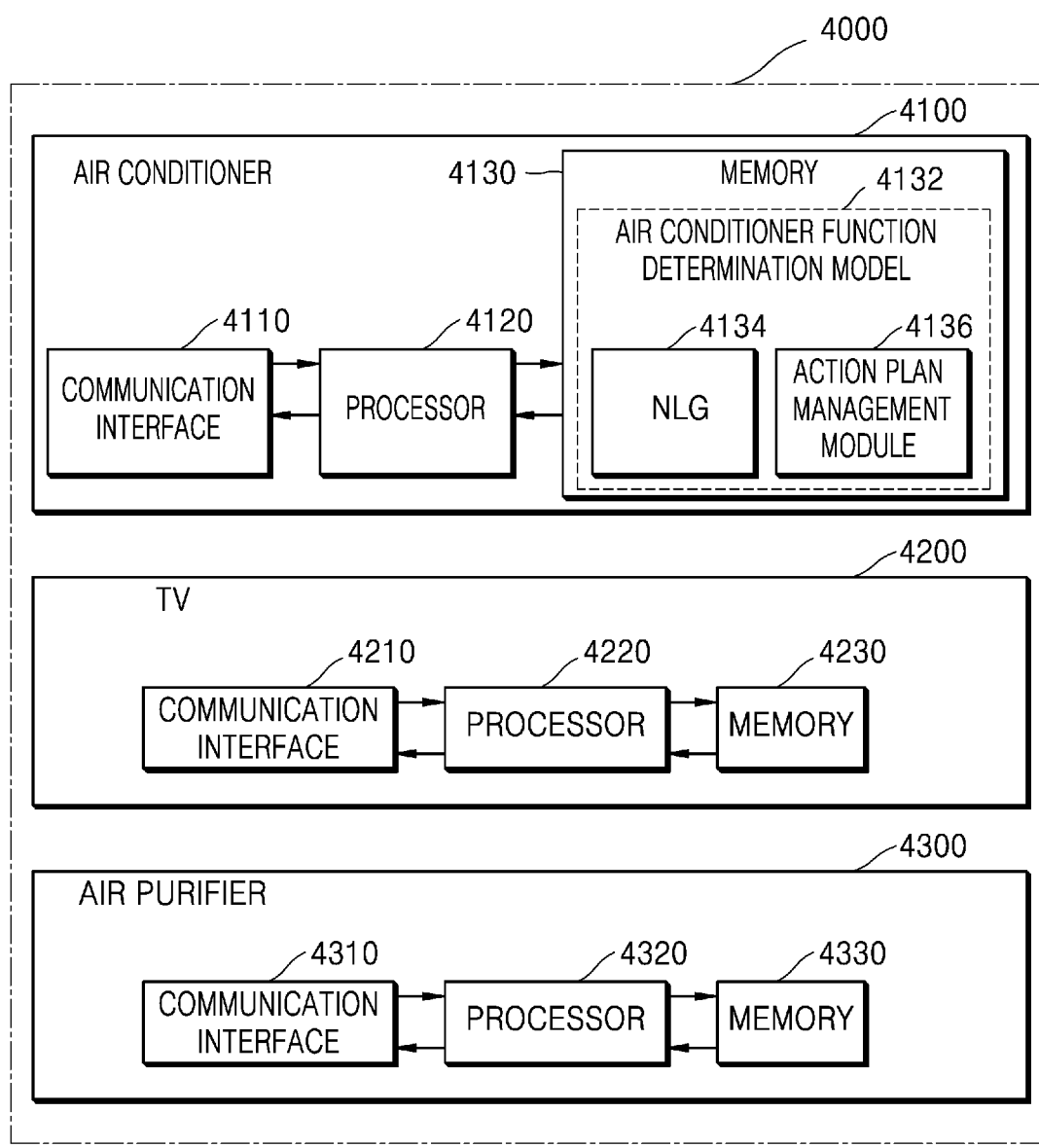
FIG. 5 is a block diagram illustrating some elements of the plurality of devices, according to an embodiment of the disclosure.

FIG. 5 is a block diagram illustrating some elements of the plurality of devices 4000 according to an embodiment of the disclosure.

According to an embodiment, the plurality of devices 4000 may be devices that are controlled by the hub device 1000 (see FIG. 1) or the IoT server 3000 (see FIG. 1). In an embodiment of the disclosure, the plurality of devices 4000 may be executor devices that execute an operation based on a control command received from the hub device 1000 or the IoT server 3000. According to an embodiment, the plurality of devices 4000 may be IoT devices.

Referring to FIG. 5, the plurality of devices 4000 may include the first device 4100, the second device 4200, and the third device 4300. Although the first device 4100 is an air conditioner, the second device 4200 is a TV, and the third device 4300 is an air purifier in an embodiment of FIG. 5, this is merely an example and the plurality of devices 4000 of the disclosure are not limited to those illustrated in FIG. 5.

According to an embodiment, each of the first device 4100, the second device 4200, and the third device 4300 may a processor, a memory, and a communication interface as shown in FIG. 5. Elements required for the plurality of devices 4000 to execute an operation based on a control may also be included in accordance with an embodiment. According to an embodiment, the elements required may be, for example, a fan for an air conditioner.

According to an embodiment, one or more of the plurality of devices 4000 may store function determination models. In an embodiment of FIG. 5, the first device 4100 may include a communication interface 4110, a processor 4120, and the memory 4130, and the function determination model 4132 may be stored in the memory 4130. According to an embodiment, the function determination model 4132 stored in the first device 4100 may be a model used to obtain operation information about detailed operations for performing an operation of the first device 4100 and a relationship between the detailed operations. According to an embodiment, the function determination model 4132 may include a first NLU model 4134 configured to analyze at least part of text received from the hub device 1000 or the IoT server 3000 and obtain operation information about an operation to be performed by the first device 4100 based on an analysis result of the at least part of the text. According to an embodiment, the function determination model 4132 may include an action plan management module 4136 configured to manage operation information related to a detailed operation of a device in order to generate detailed operations to be performed by the first device 4100 and an execution order of the detailed operations. The action plan management module 4136 may plan the detailed operations to be performed by the first device 4100 and the execution order of the detailed operations, based on an analysis result of the at least part of the text.

According to an embodiment, the second device 4200 may include a communication interface 4210, a processor 4220, and a memory 4230. According to an embodiment, the third device 4300 may include a communication interface 4310, a processor 4320, and a memory 4330. According to an embodiment, the second device 4200 and the third device 4300 may not store function determination models, unlike the first device 4100. According to an embodiment, the second device 4200 and the third device 4300 may not receive the at least part of the text from the hub device 1000 (see FIG. 1) or the IoT server 3000 (see FIG. 1). According to an embodiment, the second device 4200 and the third device 4300 may receive a control command from the hub device 1000 or the IoT server 3000, and may execute an operation based on the received control command.

According to an embodiment, the plurality of devices 4000 may transmit information about user account information, device information, and information about a function determination model to the IoT server 3000 by using the communication interfaces 4110, 4210, and 4310. In an embodiment of the disclosure, when the user logs in to the plurality of devices 4000, the plurality of devices 4000 may transmit, to the IoT server 3000, the user account information, information about whether each of the plurality of devices 4000 itself stores a device determination model, and information about whether each of the plurality of devices 4000 itself stores a function determination model. According to an embodiment, the device information may include at least one of identification information (e.g., device id information) of the plurality of devices 4000, a device type of each of the plurality of devices 4000, a function execution capability of each of the plurality of devices 4000, position information, or state information.

In an embodiment of the disclosure, the plurality of devices 4000 may transmit, to the hub device 1000 (see FIG. 1), the user account information, the information about whether each of the plurality of devices 4000 itself stores a device determination model, and the information about whether each of the plurality of devices 4000 itself stores a function determination model, by using the communication interfaces 4110, 4210, and 4310.

According to an embodiment, one or more of the plurality of devices 4000 may be third party devices manufactured by a manufacturer that is different from that of the hub device 1000. For example, the third device 4300 may be a third party device. When the third device 4300 is a third party device, a third party IoT server may be logged in by using a third party user account through the third device 4300, and the IoT server 3000 may access the third party IoT server by using a temporary account and may obtain device information and information about a function determination model of the third device 4300. According to an embodiment, based on determining that the third device 4300 is an operation-performing device, the IoT server 3000 may convert a control command into a control command readable and executable by the third device 4300, and may transmit the control command to the third party IoT server. According to an embodiment, the third party IoT server may transmit the converted control command to the third device 4300, and the third device 4300 may execute an operation based on the received control command.

Figure 6:
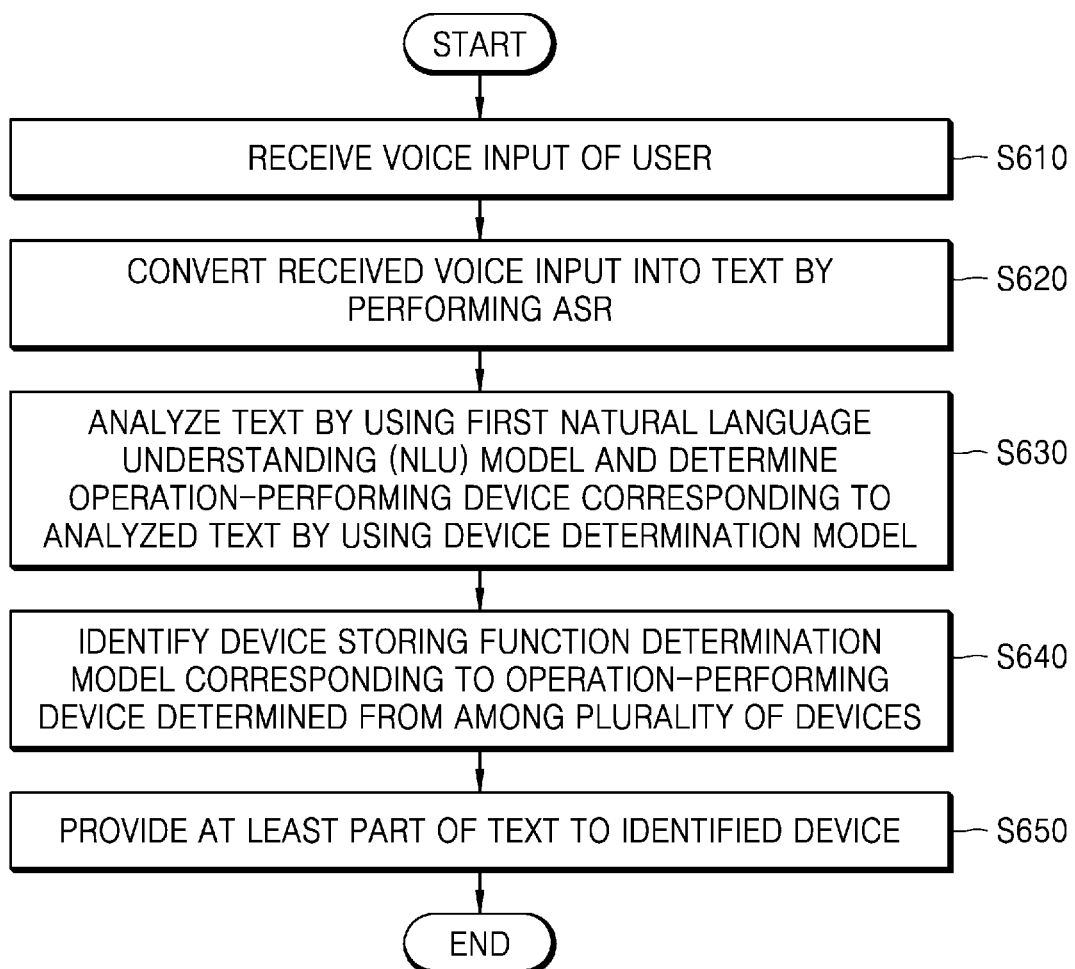
FIG. 6 is a flowchart of a method, performed by the hub device, of controlling a device based on a voice input, according to an embodiment of the disclosure.

FIG. 6 is a flowchart of a method, performed by the hub device 1000, of controlling a device based on a voice input according to an embodiment of the disclosure.

According to an embodiment, in operation S610, the hub device 1000 may receive speech data (e.g., a voice input of a user). In an embodiment of the disclosure, the hub device 1000 may receive the voice input (e.g., the user's utterance) from the user through the microphone 1100 (see FIG. 2), and may obtain a voice signal or speech data from the received voice input. In an embodiment of the disclosure, the processor 1200 (see FIG. 2) of the hub device 1000 may convert the speech data (e.g., a sound received through the microphone 1100) into an acoustic signal, and may obtain the voice signal by removing noise (e.g., a non-voice component) from the acoustic signal.

According to an embodiment, in operation S620, the hub device 1000 may convert the received voice input into text, by performing ASR. In an embodiment of the disclosure, the hub device 1000 may perform ASR that converts the voice signal into computer-readable text by using a pre-defined model such as an acoustic model (AM) or a language model (LM). When the acoustic signal from which noise is not removed is received, the hub device 1000 may obtain the voice signal by removing noise from the received acoustic signal and may perform ASR on the voice signal.

According to an embodiment, in operation S630, the hub device 1000 may analyze the text by using a first NLU model, and may determine an operation-performing device corresponding to the analyzed text by using a device determination model. In an embodiment of the disclosure, the hub device 1000 may analyze the text by using the first NLU model included in the device determination model, and may determine the operation-performing device for performing an operation according to the user's intention from among a plurality of devices based on an analysis result of the text. According to an embodiment, the plurality of devices may refer to devices, such as IoT devices, that are logged in by using the same user account as that of the hub device 1000 and are connected to the hub device 1000 through a network. The plurality of IoT devices may be devices that are registered to an IoT server by using the same user account as that of the hub device 1000.

According to an embodiment, the first NLU model may be a model trained to analyze the text converted from the voice input and determine the operation-performing device based on an analysis result. According to an embodiment, the first NLU model may be used to determine an intent by interpreting the text and determine the operation-performing device based on the intent. According to an embodiment, the hub device 1000 may parse the text in units of morphemes, words, or phrases by using the first NLU model, and may infer the meaning of a word extracted from the parsed text by using linguistic features (e.g., grammatical constituents) of the morphemes, words, or phrases. According to an embodiment, the hub device 1000 may compare the inferred meaning of the word with pre-defined intents provided by the first NLU model and may determine an intent corresponding to the inferred meaning of the word.

According to an embodiment, the hub device 1000 may determine a device related to the intent recognized from the text as the operation-performing device, based on a matching model for determining a relation between the intent and the device. In an embodiment of the disclosure, the matching model may be obtained through learning through a rule-based system, but the disclosure is not limited thereto.

In an embodiment of the disclosure, the hub device 1000 may obtain a plurality of numerical values indicating relation degrees between the intent and the plurality of devices by applying the matching model to the intent, and may determine a device having a largest value from among the obtained plurality of numerical values as a final operation-performing device. For example, when the intent is related to each of a first device and a second device, the hub device 1000 may obtain a first numerical value indicating a relation degree between the intent and the first device and a second numerical value indicating a relation degree between the intent and the second device, and may determine the first device having a larger numerical value from among the first numerical value and the second numerical value as the operation-performing device.

Although the hub device 1000 may train the matching model between the intent and the operation-performing device by using, for example, a rule-based system, the disclosure is not limited thereto. An AI model used by the hub device 1000 may include, for example, a neural network-based system (e.g., a CNN or an RNN), an SVM, linear regression, logistic regression, Naïve Bayes, a random forest, a decision tree, or a k-nearest neighbor algorithm. Alternatively, the AI model may be a combination of the above examples or any of other AI models.

According to an embodiment, the device determination model 1330 (see FIG. 2) stored in the memory 1300 (see FIG. 2) of the hub device 1000 may determine the operation-performing device from among the plurality of devices registered according to a user account of the hub device 1000. In an embodiment of the disclosure, the device determination model may analyze numerical values indicating relation degrees between the intent and the plurality of devices that are logged in and previously registered by using the same user account as the user account of the hub device 1000, and may determine a device having a largest value from among the numerical values indicating the relation degrees between the intent and the plurality of devices as the operation-performing device.

In an embodiment of the disclosure, the hub device 1000 may receive device information about each of the plurality of devices that are previously registered according to the user account from the voice assistant server 2000 (see FIG. 1). The device information may include at least one of, for example, identification information (e.g., device id information) of each of the plurality of devices, a device type of each of the plurality of devices, a function execution capability of each of the plurality of devices, position information, or state information. The hub device 1000 may determine a device for performing an operation according to the intent from among the plurality of devices based on the received device information.

According to an embodiment, in operation S640, the hub device 1000 may identify a device that stores a function determination model corresponding to the operation-performing device determined from among the plurality of devices.

According to an embodiment, the function determination model corresponding to the operation-performing device may be stored in a memory of the hub device 1000, may be stored in a memory of the operation-performing device itself, or may be stored in a memory of the voice assistant server 2000 (see FIG. 1). According to an embodiment, the term "function determination model corresponding to the operation-performing device" may refer to a model used to obtain operation information about detailed operations for performing an operation according to a determined function of the operation-performing device and a relationship between the detailed operations.

In an embodiment of the disclosure, the hub device 1000 may identify the device storing the function determination model from among the memory of the hub device 1000, the memory of the voice assistant server 2000, or the memory of the operation-performing device itself, by using information about whether a function determination model of each of the plurality of devices stored in the database 1360 (see FIG. 2) is stored and information about a storage position of the function determination model corresponding to each of the plurality of devices. According to an embodiment, the hub device 1000 may obtain information about the function determination model from at least one device storing the function determination model used to determine a function related to each of the plurality of devices from among the plurality of devices, and may store the obtained information about the function determination model in the database 1360. According to an embodiment, based on the information about the function determination model of the plurality of devices being received, the hub device 1000 may also receive the information about the storage position of the function determination model of each of the plurality of devices (e.g., device identification information, an IP address, or a MAC address). According to an embodiment, the information about whether the function determination model of each of the plurality of devices that are previously registered according to the user account is stored and the information about the storage position of the function determination model of each of the plurality of devices may be stored in the form of a lookup table in the database 1360.

In an embodiment of the disclosure, the hub device 1000 may obtain device identification information of the operation-performing device determined in operation S630, may search the lookup table in the database 1360 according to the device identification information, and may obtain information about a storage position of the function determination model corresponding to the operation-performing device based on a search result of the lookup table. By using the above method, the hub device 1000 may identify the device storing the function determination model corresponding to the operation-performing device from among the memory of the hub device 1000, the memory of the voice assistant server 2000, and the memory of the operation-performing device itself.

According to an embodiment, in operation S650, the hub device 1000 may provide at least part of text to the identified device. For example, when it is checked in operation S640 that the function determination model corresponding to the operation-performing device is stored in the hub device 1000, the hub device 1000 may provide the at least part of the text to the function determination model corresponding to the operation-performing device.

For example, when it is checked in operation S640 that the function determination model corresponding to the operation-performing device is stored in the voice assistant server 2000, the hub device 1000 may transmit the at least part of the text to the voice assistant server 2000.

For example, when it is checked in operation S640 that the function determination model corresponding to the operation-performing device is stored in the memory of the operation-performing device itself, the hub device 1000 may transmit the at least part of the text to the operation-performing device.

In an embodiment of the disclosure, the hub device 1000 may provide only part of the text, without providing the whole of the text to the identified device. For example, when the text converted from the voice input is "play the movie Avengers on TV", 'on TV' specifies a name of the operation-performing device and thus may be unnecessary information for the TV function determination model 1354. According to an embodiment, the hub device 1000 may parse the text in units of words or phrases by using the first NLU model 1332 (see FIG. 2), may recognize a word or a phrase specifying a name, a common name, or an installation position of a device, and may provide remaining part of the text other than the word or phrase recognized in the entire text to the identified device.

Figure 7:
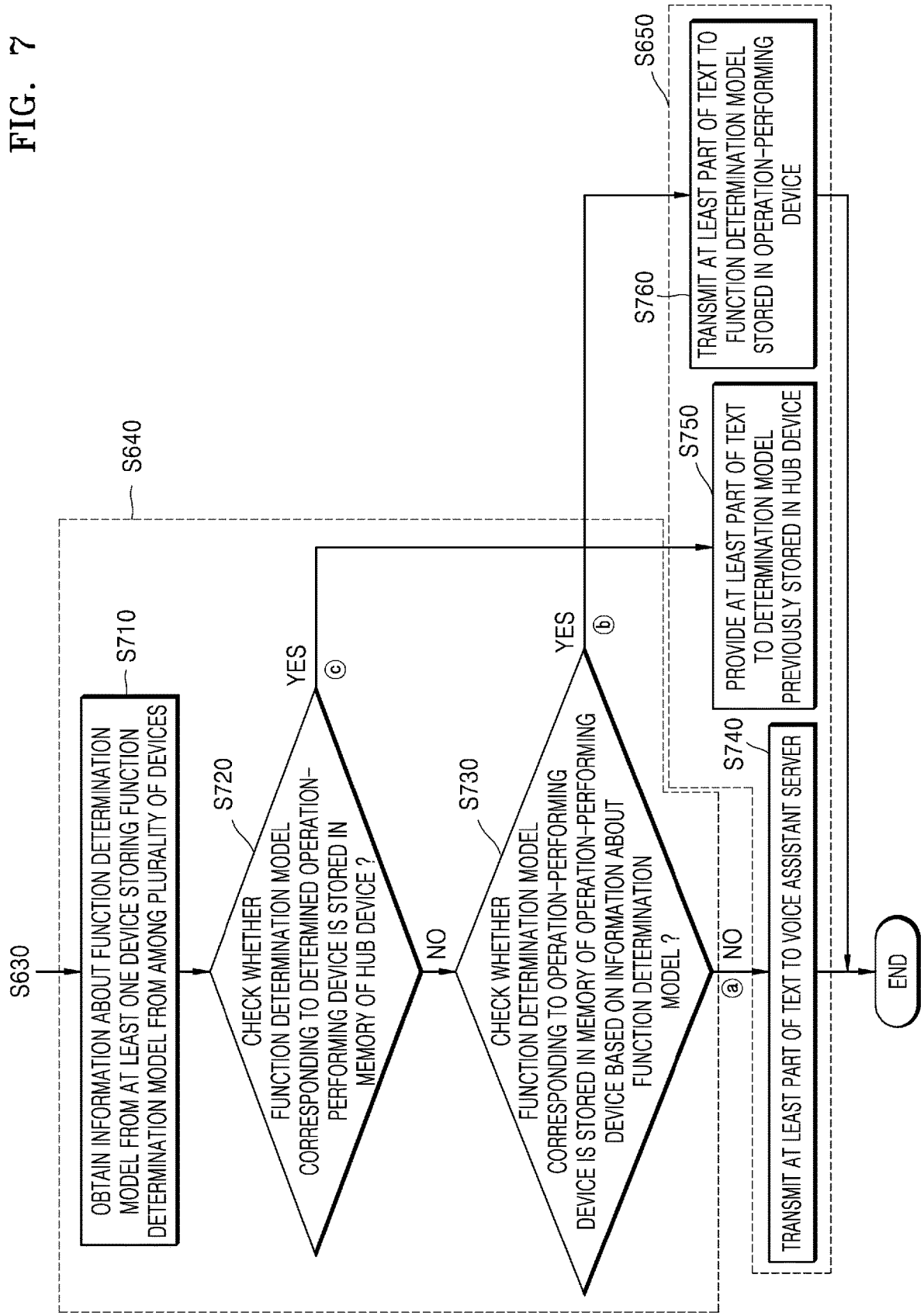
FIG. 7 is a flowchart of a method, performed by the hub device, of providing at least part of text according to a voice input of a user to one of the hub device, the voice assistant server, and an operation-performing device, according to an embodiment of the disclosure.

FIG. 7 is a flowchart illustrating a method, performed by the hub device 1000, of providing at least part of text according to a voice input of a user to one of the hub device 1000, the voice assistant server 2000, and an operation-performing device 4000a according to an embodiment of the disclosure. FIG. 7 illustrates detailed embodiments of operations S640 and S650 of FIG. 6. Operations S710 through S730 of FIG. 7 are a detailed embodiment of operation S640, and operations S740 through S760 are a detailed embodiment of operation S650 of FIG. 6.

According to an embodiment, operation S710 may be performed after operation S630 of FIG. 6. In operation S710, according to an embodiment, the hub device 1000 may obtain information about a function determination model from at least one device storing the function determination model from among the plurality of devices. In an embodiment of the disclosure, the hub device 1000 may receive the information about the function determination model from at least one device storing the function determination model used to determine a function related to each of the plurality of devices by using the communication interface 1400 (see FIG. 2). According to an embodiment, the term "information about the function determination model" may refer to information about whether each of the plurality of devices itself stores the function determination model used to obtain operation information about detailed operations for performing an operation according to a function and a relationship between the detailed operations. In an embodiment of the disclosure, when the information about the function determination model is received from the plurality of devices, the hub device 1000 may also obtain information about a storage position of the function determination model of each of the plurality of devices (e.g., device identification information, an IP address, or a MAC address).

According to an embodiment, the hub device 1000 may store, in the database 1360 (see FIG. 2), the received information about the function determination model and the information about the storage position of the function determination model of each device. In an embodiment of the disclosure, the hub device 1000 may store the information about whether the function determination model is stored and the information about the storage position of the function determination model according to a name or identification information of a device in the form of a lookup table in the database 1360.

According to an embodiment, in operation S720, the hub device 1000 may check whether the function determination model corresponding to the determined operation-performing device is stored in the memory of the hub device 1000. According to an embodiment, the term "function determination model corresponding to the operation-performing device" may be a model used to obtain operation information about detailed operations for performing an operation according to a determined function of the operation-performing device and a relationship between the detailed operations.

According to an embodiment, the function determination model corresponding to the operation-performing device may be stored in the memory 1300 (see FIG. 2) of the hub device 1000, may be stored in the memory of the operation-performing device itself, or may be stored in the voice assistant server 2000.

In an embodiment of the disclosure, the hub device 1000 may obtain the information about the function determination model of each device, by searching the lookup table stored in the database 1360. In an embodiment of the disclosure, the hub device 1000 may check whether the function determination model corresponding to the operation-performing device is stored in the memory 1300 of the hub device 1000, based on the obtained information about the function determination model. In another embodiment of the disclosure, the hub device 1000 may determine whether the function determination model corresponding to the operation-performing device is stored in the memory 1300, by accessing the memory 1300 and scanning data stored in the memory 1300.

A plurality of function determination models of the plurality of devices may be stored in the memory 1300 of the hub device 1000. In an embodiment of the disclosure, the plurality of function determination models corresponding to the plurality of devices that are logged in by using the same account as a user account and are connected to the hub device 1000 through a network may be stored to the memory 1300 of the hub device 1000.

According to an embodiment, in operation S730, based on determining in operation S720 that there is no function determination model corresponding to the operation-performing device in the memory 1300 of the hub device 1000, the hub device 1000 may check whether the function determination model corresponding to the operation-performing device is stored in the memory of the operation-performing device based on the information about the function determination model. In an embodiment of the disclosure, the hub device 1000 may check whether the function determination model corresponding to the operation-performing device is stored in the memory of the operation-performing device itself, by searching the lookup table stored in the database 1360. For example, when the operation-performing device determined based on the text is the first device, the hub device 1000 may check information about whether the first device itself stores the function determination model, by searching the lookup table.

In an embodiment of the disclosure, the function determination model may not be stored in the memory of the first device determined as the operation-performing device. According to an embodiment, in operation S740, when the hub device 1000 determines that the function determination model is not stored in the operation-performing device based on the information about the function determination model in operation S730, the hub device 1000 transmits at least part of the text to the voice assistant server. In an embodiment of the disclosure, the hub device 1000 may transmit the at least part of the text to the function determination model corresponding to the operation-performing device stored in the voice assistant server. In this case, the hub device 1000 may also transmit device identification information of the operation-performing device along with the at least part of the text.

According to an embodiment, in operation S750, when the hub device 1000 checks that the function determination model corresponding to the operation-performing device is stored in the memory of the hub device 1000 in operation S720, the hub device 1000 may provide the at least part of the text to the previously stored function determination model. In an embodiment of the disclosure, the hub device 1000 may select the function determination model corresponding to the operation-performing device from among the plurality of function determination models that are previously stored in the memory 1300 (see FIG. 2), and may prove the at least part of the text to the selected function determination model. For example, when the operation-performing device is the second device, the processor 1200 of the hub device 1000 may select a second function determination model corresponding to the second device from among a first function determination model and the second function determination model that are previously stored in the memory 1300, and may provide the at least part of the text to the second function determination model.

According to an embodiment, in operation S760, when the hub device 1000 checks that the function determination model corresponding to the operation-performing device is stored in the memory of the operation-performing device itself in operation S730, the hub device 1000 may transmit the at least part of the text to the function determination model stored in the operation-performing device.

According to an embodiment, in operations S740, S750, and S760, the hub device 1000 may transmit only the at least part of the text, without transmitting the whole of the text. In an embodiment of the disclosure, the processor 1200 of the hub device 1000 may phrase the text in units of words or phrases by using the first NLU model, may recognize a word or a phrase specifying a name, a common name, or an installation position of a device, and may transmit remaining part of the text other than the word or phrase recognized in the entire text to the function determination model of the operation-performing device.

Figure 8:
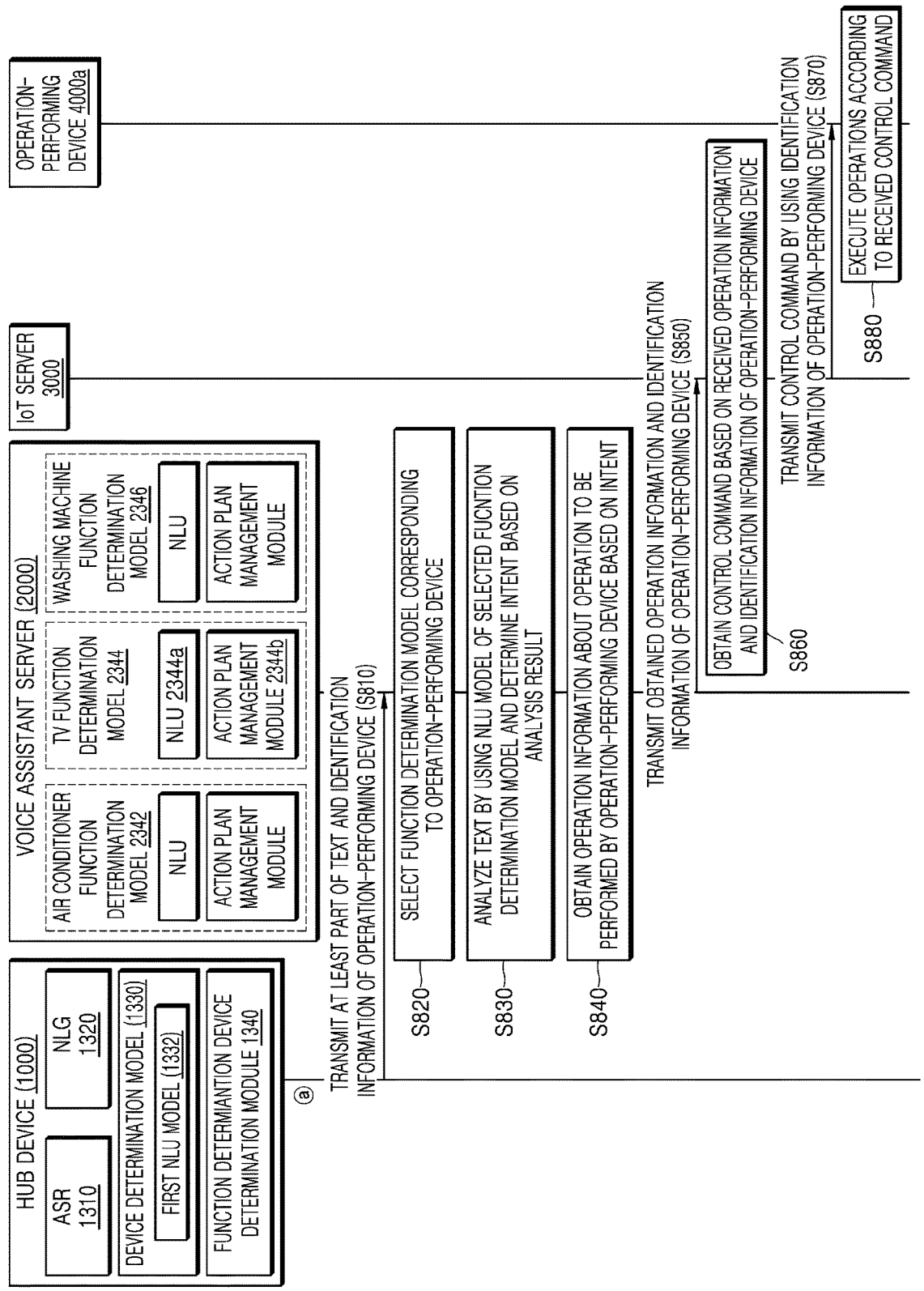
FIG. 8 is a flowchart of a method of operating the hub device, the voice assistant server, the IoT server, and the operation-performing device, according to an embodiment of the disclosure.

FIG. 8 is a flowchart illustrating a method of operating the hub device 1000, the voice assistant server 2000, the IoT server 3000, and the operation-performing device 4000a according to an embodiment of the disclosure.

FIG. 8 is a flowchart illustrating operations of entities in a multi-device system environment including the hub device 1000, the voice assistant server 2000, the IoT server 3000, and the operation-performing device 4000a after step ⓐ depicted in FIG. 7. Step ⓐ depicted in FIG. 7 indicates a state where it is checked that a function determination model corresponding to the operation-performing device 4000a is not stored in both a memory of the hub device 1000 and a memory of the operation-performing device 4000a itself.

Referring to FIG. 8, the hub device 1000 may include the ASR module 1310, the NLG module 1320, the device determination model 1330, and the function determination device determination module 1340. In an embodiment of FIG. 8, the hub device 1000 may not store a function determination model, or may not store a function determination model corresponding to an operation device.

According to an embodiment, the voice assistant server 2000 may store the plurality of function determination models 2342, 2344, and 2346. For example, the function determination model 2342 that is a first function determination model and is stored in the voice assistant server 2000 may be a model used to determine a function of an air conditioner and obtain operation information about detailed operations related to the determined function and a relationship between the detailed operations. For example, the function determination model 2344 that is a second function determination model may be a model used to determine a function of a TV and obtain operation information about detailed operations related to the determined function and a relationship between the detailed operations, and the function determination model 2346 may be a model used to determine a function of a washing machine and obtain operation information about detailed operations related to the determined function and a relationship between the detailed operations.

In an embodiment of FIG. 8, it may be determined that the operation-performing device 4000a is a 'TV', and the function determination model 2344 corresponding to the TV may be stored in the voice assistant server 2000.

In operation S810, the hub device 1000 transmits at least part of text and identification information of the operation-performing device 4000a to the voice assistant server 2000. The hub device 1000 may transmit the at least part of the text, without transmitting the whole of the text, converted from a voice input to the voice assistant server 2000. In an embodiment of the disclosure, Based on determining that the operation-performing device 4000a is a 'TV', in text corresponding to "play the movie Avengers on TV", 'on TV' specifies a name or a common name of the operation-performing device 4000a and thus may be unnecessary information. Also, because the hub device 1000 transmits the identification information (e.g., a device id) of the operation-performing device 4000a to the voice assistant server 2000, 'on TV' is unnecessary information. The processor 1200 (see FIG. 2) of the hub device 1000 may parse the text in units of words or phrases by using the first NLU model 1332, may recognize a word or a phrase specifying a name, a common name, or an installation position of a device, and may transmit remaining part of the text other than the word or phrase recognized in the entire text to the voice assistant server 2000.

In operation S810, while receiving the at least part of the text and the identification information of the operation-performing device 4000a, the hub device 1000 may transmit user account information of the hub device 1000 and the operation-performing device 4000a to the voice assistant server 2000.

According to an embodiment, in operation S820, the voice assistant server 2000 selects a function determination model corresponding to the operation-performing device 4000a. In an embodiment of the disclosure, the voice assistant server 2000 may identify the operation-performing device 4000a based on the identification information of the operation-performing device 4000a received from the hub device 1000, and may select the function determination model corresponding to the operation-performing device 4000a from among the plurality of function determination models 2342, 2344, and 2346. The term "function determination model corresponding to the operation-performing device" refers to a model used to obtain operation information about detailed operations for performing a determined function of the operation-performing device 4000a and a relationship between the detailed operations. In an embodiment of FIG. 8, when the operation-performing device 4000a is a TV, the voice assistant server 2000 may select the function determination model 2344 for obtaining operation information about detailed operations for performing an operation according to a function of the TV, for example, a function of playing a movie, and a relationship between the detailed operations from among the plurality of function determination models 2342, 2344, and 2346 stored in a memory.

In operation S830, the voice assistant server 2000 interprets the text by using an NLU model of the selected function determination model and determines an intent based on an analysis result. The voice assistant server 2000 may analyze at least part of the text received from the hub device 1000, by using an NLU model 2344a of the function determination model 2344. The NLU model 2344a that is an AI model trained to interpret text related to a specific device may be a model trained to determine an intent and parameters related to an operation intended by the user. The NLU model 2344a may be a model trained to determine a function related to a type of the specific device when the text is input.

In an embodiment of the disclosure, the voice assistant server 2000 may parse the at least part of the text in units of words or phrases by using the NLU model 2344a, may infer the meaning of a word extracted from the parsed text by using linguistic features (e.g., grammatical elements) of parsed morphemes, words, or phrases, and may obtain an intent and parameters from the text by matching the inferred meaning to pre-defined intents and parameters. The intent that is information indicating the user's utterance intention included in the text may be used to determine an operation to be performed by the operation-performing device 4000a. The parameters refer to variable information for determining detailed operations of the operation-performing device 4000a related to the intent. The parameters may be information corresponding to the intent, and a plurality of types of parameters may correspond to one intent. For example, when the text is "play the movie Avengers on TV", the intent may be 'video content playback' and the parameters may be 'movie' or 'the movie Avengers'.

In an embodiment of the disclosure, the voice assistant server 2000 may determine only the intent from the at least part of the text.

In operation S840, the voice assistant server 2000 obtains operation information about an operation to be performed by the operation-performing device 4000a based on the intent. In an embodiment of the disclosure, the voice assistant server 2000 plans the operation information to be performed by the operation-performing device 4000a based on the intent and the parameters, by using an action plan management module 2344b of the function determination model 2344. The action plan management module 2344b may interpret operations to be performed by the operation-performing device 4000a based on the intent and the parameters. The action plan management module 2344b may select detailed operations related to the interpreted operations from among operations of devices that are previously stored, and may plan an execution order of the selected detailed operations. The action plan management module 2344b may obtain operation information about a detailed operation to be performed by the operation-performing device 4000a by using a planning result. The term 'operation information' may be information related to detailed operations to be performed by a device, a relationship between the detailed operations, and information related to an execution order of the detailed operations. The operation information may include, but is not limited to, functions to be executed by the operation-performing device 4000a to perform detailed operations, an execution order of the functions, an input value required to execute the functions, and an output value output as an execution result of the functions.

In operation S850, the voice assistant server 2000 transmits the obtained operation information and identification information of the operation-performing device 4000a to the IoT server 3000.

In operation S860, the IoT server 3000 obtains a control command based on the identification information of the operation-performing device 4000a and the received operation information. The IoT server 3000 may include a database in which control commands for a plurality of devices and operation information are stored. In an embodiment of the disclosure, the IoT server 3000 may select a control command for controlling detailed operations of the operation-performing device 4000a based on the identification information of the operation-performing device 4000a, from among the control commands related to the plurality of devices previously stored in the database.

According to an embodiment, the control command that is information readable and executable by a device may include instructions for sequentially executing the detailed operations according to the operation information in an execution order when the device executes a function.

According to an embodiment, in operation S870, the IoT server 3000 may transmit the control command to the operation-performing device 4000a by using the identification information of the operation-performing device 4000a.

In operation S880, the operation-performing device 4000a may execute operations corresponding to the control command, according to the received control command. For example, the operation-performing device 4000a may play a movie based on the control command.

In an embodiment of the disclosure, after executing the operations, the operation-performing device 4000a may transmit information about an operation execution result to the IoT server 3000.

Figure 9:
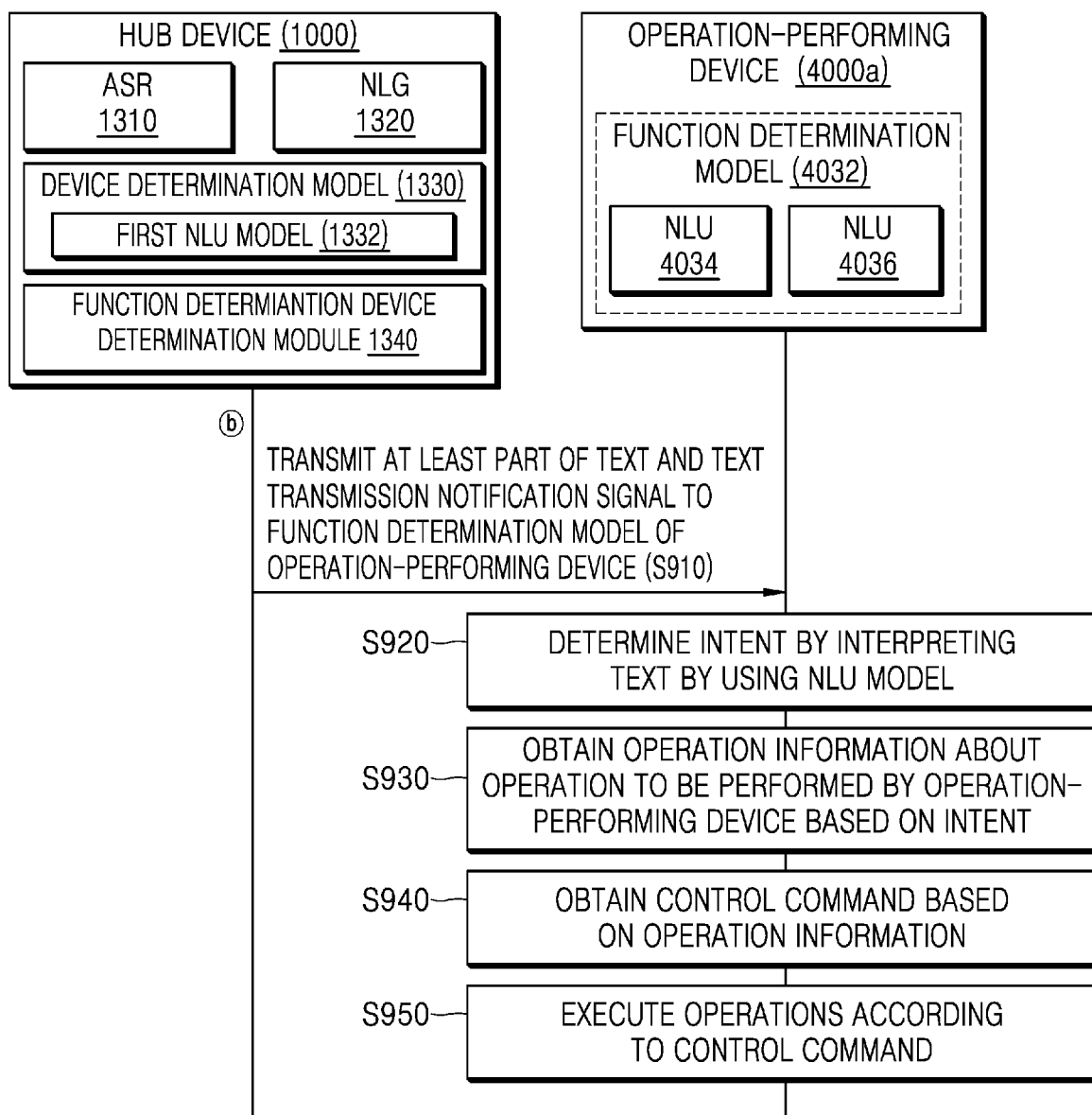
FIG. 9 is a flowchart of a method of operating the hub device and the operation-performing device, according to an embodiment of the disclosure.

FIG. 9 is a flowchart illustrating a method of operating the hub device 1000 and the operation-performing device 4000a according to an embodiment of the disclosure.

FIG. 9 is a flowchart illustrating operations of entities in a multi-device system including the hub device 1000 and the operation-performing device 4000a after step ⓑ of FIG. 7. Step ⓑ depicted in FIG. 7 indicates a state where it is checked that a function determination model corresponding to the operation-performing device 4000a is not stored in a memory of the hub device 1000 but is stored in a memory of the operation-performing device 4000a itself. Although the voice assistant server 2000 and the IoT server 3000 are not shown in FIG. 9, it does not mean that the multi-device system does not include the voice assistant server 2000 and the IoT server 3000.

Referring to FIG. 9, the hub device 1000 may include the ASR module 1310, the NLG module 1320, the device determination model 1330, and the function determination device determination module 1340. In an embodiment of FIG. 8, the hub device 1000 may not store a function determination model, or may not store a function determination model corresponding to an operation device.

The operation-performing device 4000a may store a function determination model 4032 of the operation-performing device 4000a itself. The operation-performing device 4000a itself may analyze text, and the function determination model 4032 used to perform an operation according to a user's intention based on an analysis result of the text may be stored in the memory of the operation-performing device 4000a. For example, when the operation-performing device 4000a is an 'air conditioner', the function determination model 4032 stored in the memory of the operation-performing device 4000a may be a model used to determine a function of the air conditioner, and obtain operation information about detailed operations related to the determined function and a relationship between the detailed operations.

In operation S910, the hub device 1000 transmits at least part of text and a text transmission notification signal to the function determination model 4032 of the operation-performing device 4000a. The hub device 1000 may transmit the at least part of the text, without transmitting the whole of the text, converted from a voice input to the operation-performing device 4000a. For example, in text saying "lower the temperature 2° C. in the air conditioner", 'in the air conditioner' specifies a name or a common name of the operation-performing device 4000a and thus may be unnecessary information. Also, because the operation-performing device 4000a itself is an air conditioner, 'in the air conditioner' is unnecessary information. The processor 1200 (see FIG. 2) of the hub device 1000 may parse the text in units of words or phrases by using the first NLU model 1332, may recognize a word or a phrase specifying a name, a common name, or an installation position of a device, and may transmit remaining part of the text other than the word or phrase recognized in the entire text to the operation-performing device 4000a.

In an embodiment of the disclosure, the hub device 1000 may transmit the text transmission notification signal to the operation-performing device 4000a. The text transmission notification signal is a signal notifying that the text is transmitted to the operation-performing device 4000*a*. When the operation-performing device 4000*a* receives the text transmission notification signal, an ASR operation, an operation of determining the operation-performing device, and an operation of selecting the function determination model may be omitted, and the operation-performing device 4000*a* may directly provide the at least part of the text to the function determination model 4032 and may determine an intent from the text by using the function determination model 4032.

However, the disclosure is not limited thereto, and in operation S910, the hub device 1000 may not transmit the text transmission notification signal to the operation-performing device 4000*a*. In this case, when the operation-performing device 4000*a* receives the at least part of the text from the hub device 1000, the operation-performing device 4000*a* may be preset to provide the received at least part of the text to the function determination model 4032. In an embodiment of the disclosure, data about a policy set to recognize that the text is received and provide the text to the function determination model 4032 may be stored in the memory of the operation-performing device 4000*a*.

According to an embodiment, in operation S920, the operation-performing device 4000*a* may determine the intent by interpreting the text by using an NLU model 4034. In an embodiment of the disclosure, the operation-performing device 4000*a* may analyze the at least part of the text received from the hub device 1000 by using the NLU model 4034 of the function determination model 4032. The NLU model 4034 that is an AI model trained to interpret the text related to the operation-performing device 4000*a* may be a model trained to determine an intent and parameters related to an operation intended by the user. The NLU model 4034 may be a model trained to determine a function related to a type of a specific device when the text is input.

In an embodiment of the disclosure, the operation-performing device 4000*a* may parse the at least part of the text in units of words or phrases by using the NLU model 4034, may infer the meaning of a word extracted from the parsed text by using linguistic features (e.g., grammatical elements) of parsed morphemes, words, or phrases, and may obtain the intent and the parameters from the text by matching the inferred meaning to pre-defined intents and parameters. The intent that is information indicating the user's utterance intention included in the text may be used to determine an operation to be performed by the operation-performing device 4000*a*. The parameters refer to variable information for determining detailed operations of the operation-performing device 4000*a* related to the intent. The parameters may be information corresponding to the intent, and a plurality of types of parameters may correspond to one intent. For example, when the text is "lower the temperature 2° C. in the air conditioner", the intent may be 'set temperature control' or 'set temperature down', and the parameters may be '2° C.'.

In an embodiment of the disclosure, the operation-performing device 4000*a* may determine only the intent from the at least part of the text.

According to an embodiment, in operation S930, the operation-performing device 4000*a* obtains operation information about an operation to be performed by the operation-performing device 4000*a* based on the intent. In an embodiment of the disclosure, the operation-performing device 4000*a* plans the operation information to be performed by the operation-performing device 4000*a* based on the intent and the parameters, by using an action plan management module 4036 of the function determination model 4032. The action plan management module 4036 may interpret operations to be performed by the operation-performing device 4000*a* based on the intent and the parameters. The action plan management module 4036 may select detailed operations related to the interpreted operations from among operations of devices that are previously stored, and may plan an execution order of the selected detailed operations. The action plan management module 4036 may obtain operation information about a detailed operation to be performed by the operation-performing device 4000*a* by using a planning result. The term 'operation information' may be information related to detailed operations to be performed by a device, a relationship between the detailed operations, and an execution order of the detailed operations. The operation information may include, but is not limited to, functions to be executed by the operation-performing device 4000*a* to perform detailed operations, an execution order of the functions, an input value required to execute the functions, and an output value output as an execution result of the functions.

According to an embodiment, in operation S940, the operation-performing device 4000*a* obtains a control command based on the operation information. In an embodiment of the disclosure, a plurality of control commands respectively corresponding to a plurality of different pieces of operation information may be stored in the memory of the operation-performing device 4000*a*. In an embodiment of the disclosure, the operation-performing device 4000*a* may select a control command for controlling detailed operations according to the operation information, from among the plurality of control command that are previously stored in the memory. The control command that is information readable and executable by the operation-performing device 4000*a* may include instructions for sequentially executing the detailed operations according to the operation information in an execution order when the operation-performing device 4000*a* executes a function.

According to an embodiment, in operation S950, the operation-performing device 4000*a* may execute operations corresponding to the control command, according to the control command. For example, the operation-performing device 4000*a* may lower the set temperature 2° C. based on the control command.

Figure 10:
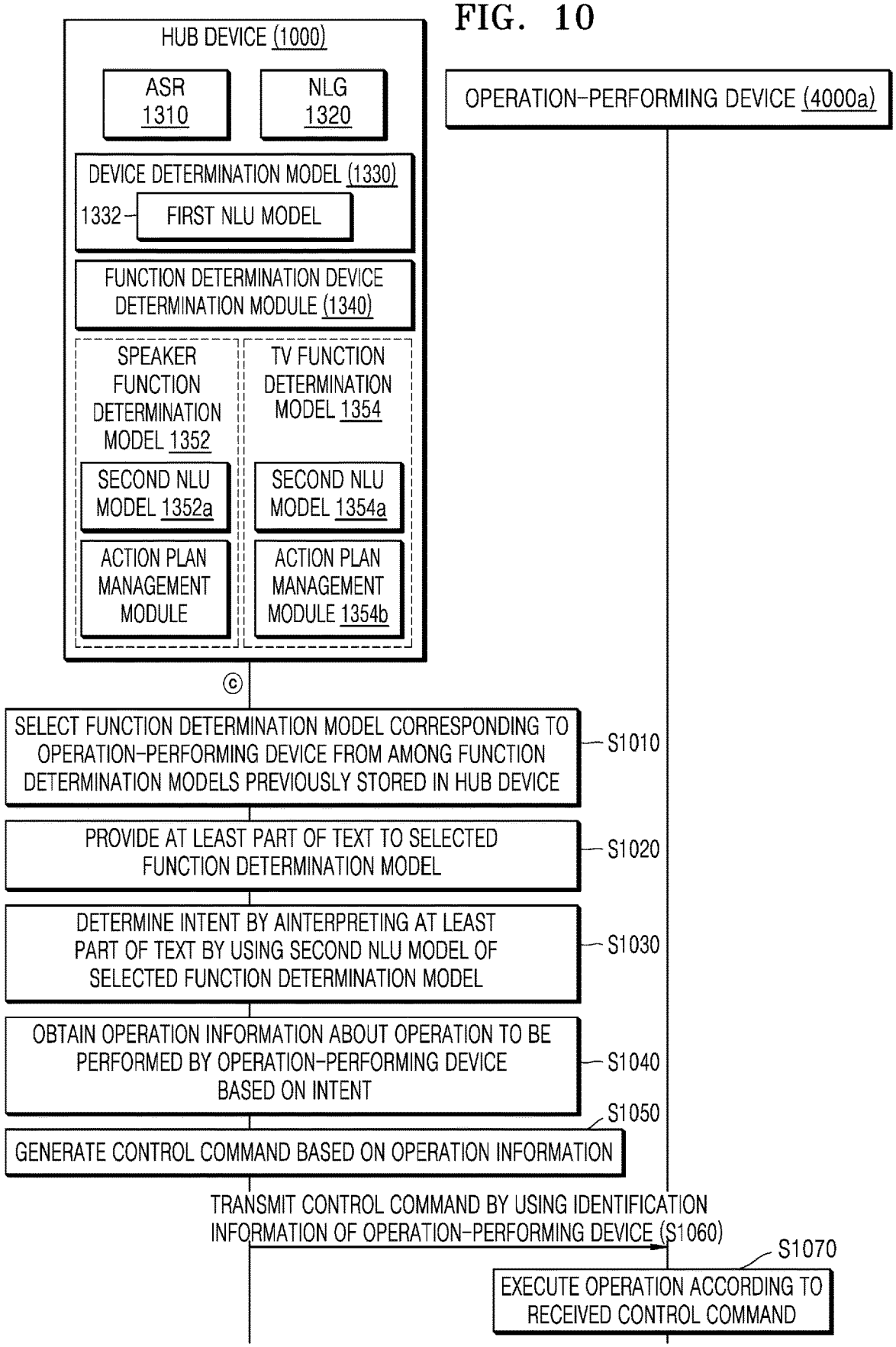
FIG. 10 is a flowchart of a method of operating the hub device and the operation-performing device, according to an embodiment of the disclosure.

FIG. 10 is a flowchart illustrating a method of operating the hub device 1000 and the operation-performing device 4000*a* according to an embodiment of the disclosure.

FIG. 10 is a flowchart illustrating operations of entities in a multi-device system environment including the hub device 1000 and the operation-performing device 4000*a* after step ⓒ of FIG. 7. Step ⓒ depicted in FIG. 7 indicates a state where it is checked that a function determination model corresponding to the operation-performing device 4000*a* is stored in a memory of the hub device 1000. Although the voice assistant server 2000 and the IoT server 3000 are not shown in FIG. 10, it does not mean that the multi-device system does not include the voice assistant server 2000 and the IoT server 3000.

Referring to FIG. 10, according to an embodiment, the hub device 1000 may include the ASR module 1310, the NLG module 1320, the device determination model 1330, the function determination device determination module 1340, the speaker function determination model 1352, and the TV function determination model 1354. In an embodiment of FIG. 10, the hub device 1000 may store a function determination model corresponding to the operation-performing device 4000*a*. For example, when the operation-performing device 4000*a* is a TV, the hub device 1000 may store the TV function determination model 1354 corresponding to the TV in the memory. The TV function determination model 1354 may be a model used to determine a function of the TV, and obtain operation information about detailed operations related to the determined function and a relationship between the detailed operations.

According to an embodiment, in operation S1010, the hub device 1000 may select a function determination model corresponding to the operation-performing device 4000*a* from among the speaker and TV function determination models 1352 and 1354 that are previously stored in the hub device 1000. In an embodiment of the disclosure, based on determining that the operation-performing device 4000*a* is a TV, the hub device 1000 may select the TV function determination model 1354 corresponding to the TV from among the speaker and TV function determination models 1352 and 1354.

In operation S1020, the hub device 1000 provides at least part of text to the selected function determination model. In an embodiment of the disclosure, the processor 1200 (see FIG. 2) of the hub device 1000 may provide the at least part of the text to the TV function determination model 1354 stored in the memory. In this case, the processor 1200 may provide the at least part of the text, without providing the whole of the text, to the TV function determination model 1354. For example, based on determining that the operation-performing device 4000*a* is a 'TV', in text saying "play the movie Avengers on TV", 'on TV' specifies a name or a common name of the operation-performing device 4000*a* and thus may be unnecessary information. Also, because the TV function determination model 1354 is a function determination model corresponding to the TV, 'on TV' is unnecessary information for the TV function determination model 1354. The processor 1200 may parse the text in units of words or phrases by using the first NLU model 1332, may recognize a word or a phrase specifying a name, a common name, or an installation position of a device, and may provide remaining part of the text other than the word or phrase recognized in the entire text to the TV function determination model 1354.

In operation S1030, the hub device 1000 determines an intent by interpreting the at least part of the text by using a second NLU model of the selected function determination model. In an embodiment of the disclosure, the processor 1200 (see FIG. 2) of the hub device 1000 may analyze the at least part of the text by using the second NLU model 1354*a* of the TV function determination model 1354. The second NLU model 1354*a* that is a model specialized for a specific device may be an AI model trained to obtain an intent related to a device corresponding to the operation-performing device 4000*a* determined by the first NLU model 1332 and corresponding to the at least part of the text. Also, the second NLU model 1354*a* may be a model trained to determine an operation of the device related to the user's intention by interpreting the text.

According to an embodiment, in an embodiment of the disclosure, the processor 1200 may parse the text in units of morphemes, words, or phrases by using the second NLU model 1354*a*, may recognize the meaning of a morpheme, a word, or a phrase parsed through grammatical and semantic analysis, and may determine an intent and parameters by matching the recognized meaning to pre-defined words. The term 'parameters' used herein refer to variable information for determining detailed operations of a target device related to the intent. The same description of the intent and the parameters as that made with reference to FIG. 7 is not provided here.

In an embodiment of the disclosure, the processor 1200 may determine only the intent from the at least part of the text, by using the second NLU model 1354*a*.

In operation S1040, the hub device 1000 obtains operation information about an operation to be performed by the operation-performing device 4000*a*, based on the intent. In an embodiment of the disclosure, the processor 1200 (see FIG. 2) of the hub device 1000 may obtain the operation information about at least one detailed operation related to the intent and the parameters, by using the action plan management module 1354*b* of the TV function determination model 1354. The action plan management module 1354*b* may manage information about detailed operations of the operation-performing device 4000*a* and a relationship between the detailed operations. The processor 1200 of the hub device 1000 may plan detailed operations to be performed by the operation-performing device 4000*a* and an execution order of the detailed operations based on the intent and the parameters by using the action plan management module 1354*b*, and may obtain operation information.

The operation information may be information related to detailed operations to be performed by the operation-performing device 4000*a* and an execution order of the detailed operations. The operation information may include information related to detailed operations to be performed by the operation-performing device 4000*a*, a relationship between each of the detailed operations and another detailed operation, and an execution order of the detailed operations. The operation information may include, but is not limited to, functions to be executed by the operation-performing device 4000*a* to perform a specific operation, an execution order of the functions, an input value required to execute the functions, and an output value output as an execution result of the functions.

According to an embodiment, in operation S1050, the hub device 1000 generates a control command based on the operation information. The control command refers to instructions readable and executable by the operation-performing device 4000*a* so that the operation-performing device 4000*a* performs the detailed operations included in the operation information.

FIG. 10 is different from FIG. 9 in that operations of determining an intent (S1030), obtaining operation information (S1040), and generating a control command (S1050) are performed by the hub device 1000. Referring to FIGS. 9 and 10, an entity that performs operations of determining an intent, obtaining operation information, and generating a control command varies according to whether a function determination model corresponding to the operation-performing device 4000*a* is stored in the hub device 1000 or the operation-performing device 4000*a*.

According to an embodiment, in operation S1060, the hub device 1000 transmits the control command to the operation-performing device 4000*a*, by using identification information of the operation-performing device 4000*a*. In an embodiment of the disclosure, the hub device 1000 may identify the operation-performing device 4000*a* by using identification information of the operation-performing device 4000*a* from among a plurality of devices that are connected through a network and are previously registered by using the same user account, and may transmit the control command to the identified operation-performing device 4000*a*.

According to an embodiment, in operation S1070, the operation-performing device 4000*a* executes an operation according to the received control command.

Figure 11:
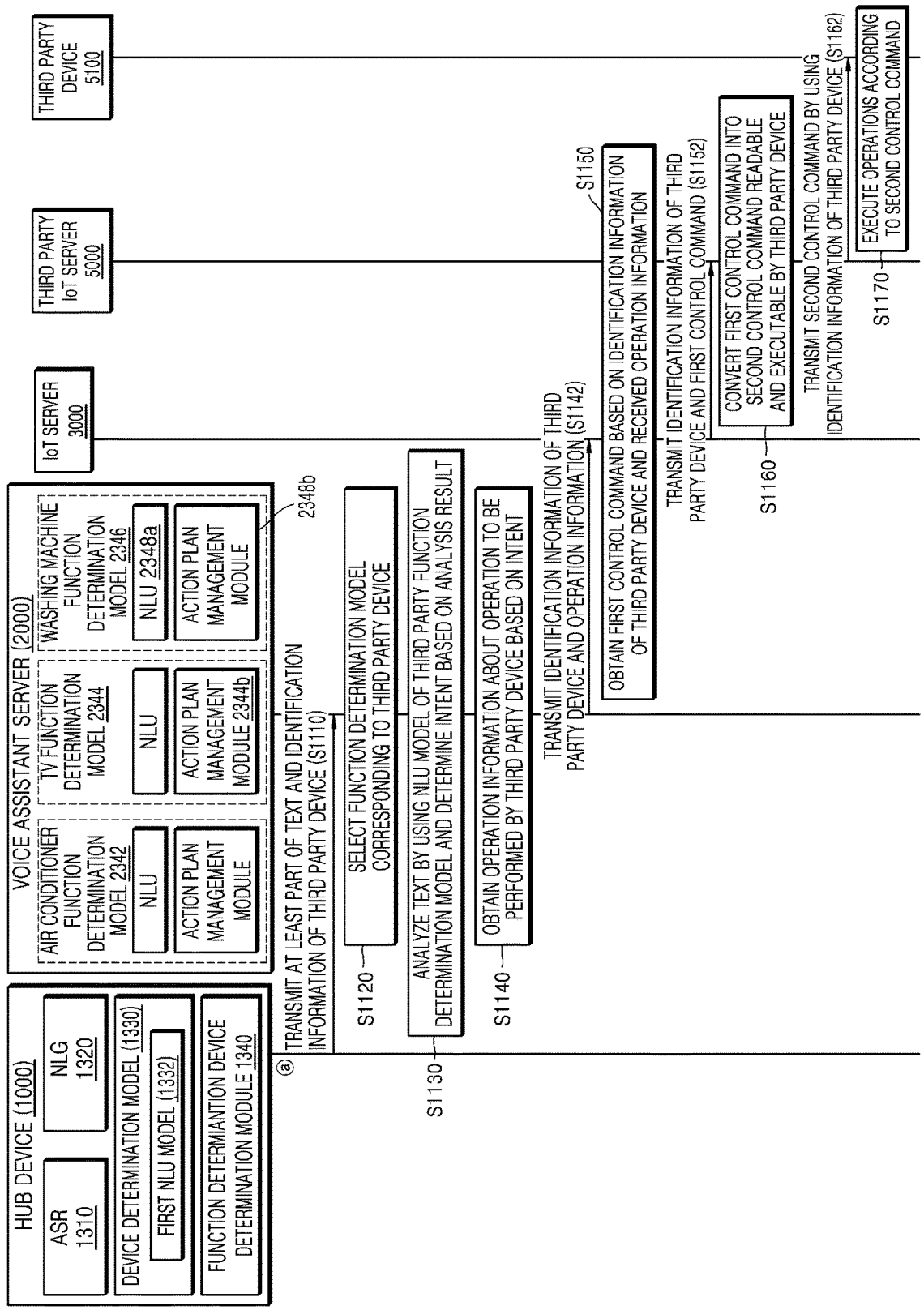
FIG. 11 is a flowchart of a method of operating the hub device, the voice assistant server, the IoT server, a third party IoT server, and a third party device, according to an embodiment of the disclosure.

FIG. 11 is a flowchart illustrating a method of operating the hub device 1000, the voice assistant server 2000, the IoT server 3000, a third party IoT server 5000, and a third party device 5100 according to an embodiment of the disclosure.

FIG. 11 is a flowchart illustrating operations of entities in a multi-device system environment including the hub device 1000, the voice assistant server 2000, the IoT server 3000, the third party IoT server 5000, and the third party device 5100 after step ⓐ of FIG. 7. Step ⓐ depicted in FIG. 7 indicates a state where it is checked that a function determination model corresponding to the operation-performing device 4000a is not stored in both a memory of the hub device 1000 and a memory of the operation-performing device 4000a itself.

Referring to FIG. 11, the hub device 1000 may include the ASR module 1310, the NLG module 1320, the device determination model 1330, and the function determination device determination module 1340. In an embodiment of FIG. 11, the hub device 1000 may not store a function determination model, or may not store a function determination model corresponding to an operation device.

The voice assistant server 2000 may store the plurality of function determination models 2342, 2344, and 2348. The voice assistant server 2000 may store the function determination model 2348 (referred to as third party function determination model).

The third party device 5100 refers to a device manufactured by a manufacturer other than a manufacturer of the hub device 1000, an affiliated company, or a company having a technical tie-up. In an embodiment of the disclosure, when a user of the third party device 5100 is the same as a user of the hub device 1000, the third party function determination model 2348 may be stored in the voice assistant server 2000 when the user registers the third party device 5100 by using a user account used to log in to the hub device 1000. For example, when the user registers the third party device 5100 by logging in by using the user account of the hub device 1000, the third party IoT server 5000 may allow the access right of the IoT server 3000, and the IoT server 3000 may access the third party IoT server 5000 and may request the third party function determination model 2348 used to obtain operation information about detailed operations according to a plurality of functions of the third party device 5100 and a relationship between the detailed operations. An open authorization (oAuth) method may be used to register the third party device 5100 to the IoT server 3000. The third party IoT server 500 may provide data of the third party function determination model 2348 to the IoT server 3000 according to the request, and the IoT server 3000 may provide the third party function determination model 2348 to the voice assistant server 2000.

The third party IoT server 5000 is a server that stores and manages at least one of device identification information of the third party device 5100, a device type of the third party device 5100, function execution capability information, position information, or state information. The third party IoT server 5000 may obtain, determine, or generate a control command for controlling the third party device 5100 by using device information of the third party device 5100. The third party IoT server 5000 may transmit a second control command to the third party device 5100 determined to perform an operation based on operation information. The third party IoT server 5000 may be operated by, but not limited to, a manufacturer of the third party device 5100.

In an embodiment of FIG. 11, it may be determined that an operation-performing device is the third party device 5100.

According to an embodiment, in operation S1110, the hub device 1000 transmits at least part of text and identification information of the third party device 5100 to the voice assistant server 2000. Operation S1110 is the same as operation S810 of FIG. 8 except that the identification information of the third party 5100, e.g., a device id of the third party device 5100, is transmitted to the voice assistant server 2000, and thus a repeated explanation thereof will not be provided.

According to an embodiment, in operation S1120, the voice assistant server 2000 selects a function determination model corresponding to the third party device 5100 by using the received identification information of the third party device 5100. In an embodiment of the disclosure, the voice assistant server 2000 may identify the third party device 5100 based on the identification information of the third party device 5100 received from the hub device 1000, and may select the third party function determination model 2348 corresponding to the third party device 5100 from among the plurality of function determination models 2342, 2344, and 2348.

According to an embodiment, in operation S1130, the voice assistant server 2000 analyzes the text by using an NLU model 2348a of the third party function determination model 2348, and determines an intent based on an analysis result. Operation S1130 is the same as operation S830 of FIG. 8 except that the NLU model 2348a of the third party function determination model 2348 is used, and thus a repeated explanation thereof will not be provided here.

According to an embodiment, in operation S1140, the voice assistant server 2000 obtains operation information about an operation to be performed by the third party device 5100 based on the intent. Operation S1140 is the same as operation S840 of FIG. 8 except that information about an operation to be performed by the third party device 5100 is obtained, and thus a repeated explanation thereof will not be provided here.

According to an embodiment, in operation S1142, the voice assistant server 2000 transmits the identification information of the third party device 5100 (e.g., the device id of the third party device 5100) and the operation information to the IoT server 3000.

According to an embodiment, in operation S1150, the IoT server 3000 obtains a first control command based on the identification information of the third party device 5100 and the received operation information. The IoT server 3000 may include a database storing the operation information about the third party device 5100 and a control command according to the operation information. The IoT server 3000 may obtain the operation information of the third party device 5100 from the third party IoT server 5000 through a registration method of the third party device 5100, and may store the obtained operation information in the database. In an embodiment of the disclosure, the IoT server 3000 may identify the third party device 5100 based on the identification information of the third party device 5100, and may generate the first control command by using the operation information of the third party device 5100.

The first control command may include instructions for sequentially executing detailed operations according to the operation information in an execution order when the third party device 5100 executes a function. In an embodiment of the disclosure, the first control command may not be read by the third party device 5100.

According to an embodiment, in operation S1152, the IoT server 3000 transmits the identification information of the third party device 5100 and the first control command to the third party IoT server 5000.

According to an embodiment, in operation S1160, the third party IoT server 5000 converts the first control command into a second control command readable and executable by the third party device 5100. The third party IoT server 5000 may convert the first control command into the second control command readable and executable by the third party device 5100 by using the received identification information of the third party device 5100.

According to an embodiment, in operation S1162, the third party IoT server 5000 transmits the second control command to the third party device 5100 by using the identification information of the third party device 5100.

According to an embodiment, in operation S1170, the third party device 5100 executes operations corresponding to the second control command, according to the received second control command.

Figure 12A:
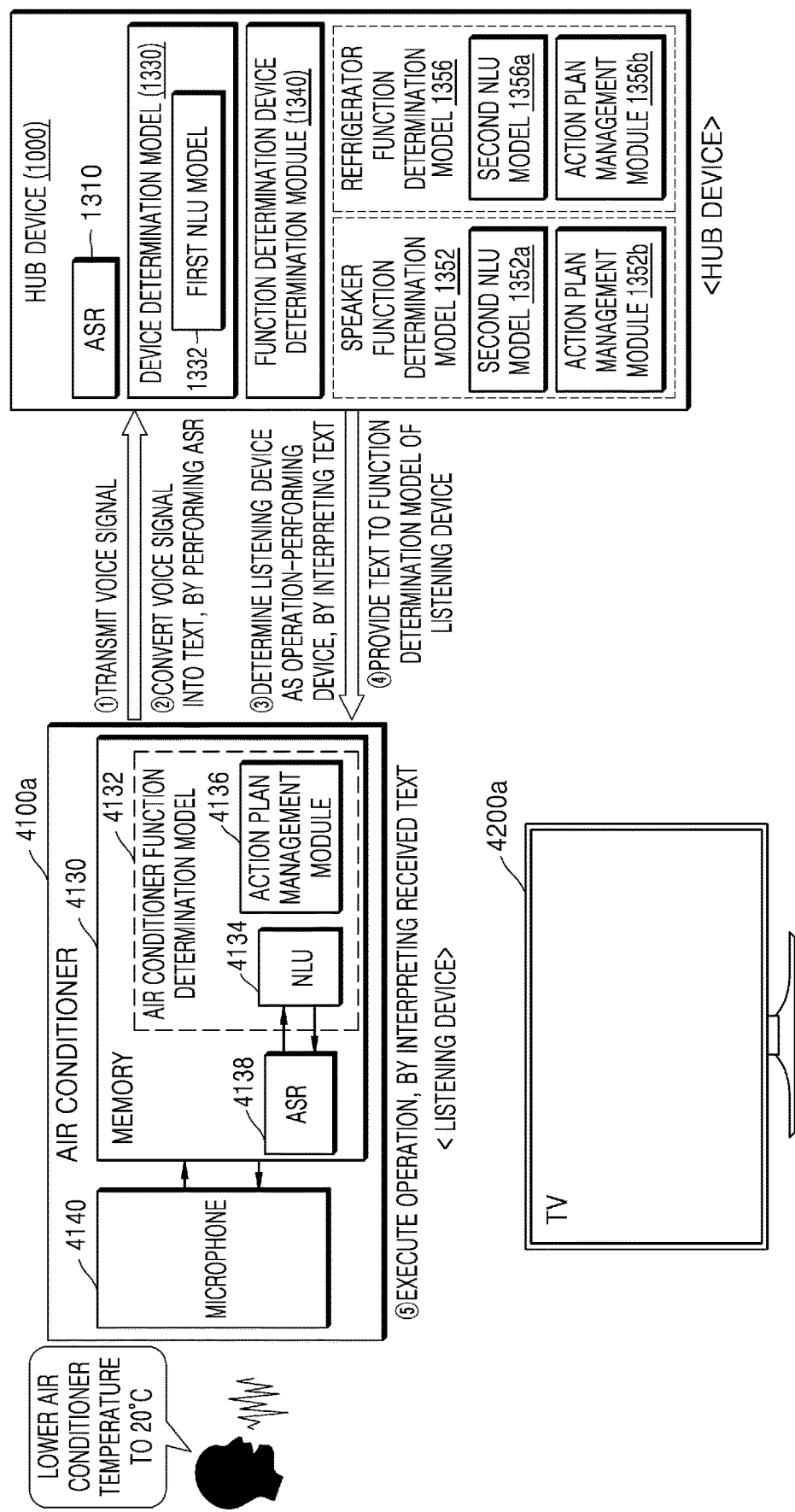
FIG. 12A is a conceptual diagram illustrating operations of the hub device and a plurality of devices according to an embodiment of the disclosure.

FIG. 12A is a conceptual diagram illustrating operations of the hub device 1000 and a plurality of devices (e.g., first and second devices 4100a and 4200a) according to an embodiment of the disclosure.

FIG. 12A is a block diagram illustrating essential elements for describing operations of the hub device 1000 and the plurality of devices (e.g., the first and second devices 4100a and 4200a). However, elements of the hub device 1000 and the plurality of devices (4100a and 4200a) are not limited to those of FIG. 12A.

Arrows of FIG. 12A indicate movement, transmission, and reception of data including a voice signal and text between the hub device 1000 and the first device 4100a. Circled numbers denote an order in which operations are performed.

Referring to FIG. 12A, the hub device 1000 and the plurality of devices (e.g., the first and second devices 4100a and 4200a) may be connected to one another by using a wired communication or wireless communication method and may perform data communication. In an embodiment of the disclosure, the hub device 1000 and the plurality of devices (e.g., the first and second devices 4100a and 4200a) may be directly connected to each other through a communication network, but the disclosure is not limited thereto. In an embodiment of the disclosure, although the hub device 1000 and the plurality of devices (e.g., the first and second devices 4100a and 4200a) may be connected to the voice assistant server 2000 (see FIG. 3), and the hub device 1000 may be connected to the plurality of devices (e.g., the first and second devices 4100a and 4200a) through the voice assistant server 2000.

The hub device 1000 and the plurality of devices (e.g., the first and second devices 4100a and 4200a) may be connected through a LAN, a WAN, a VAN, a mobile radio communication network, a satellite communication network, or a combination thereof. Examples of the wireless communication method may include, but are not limited to, Wi-Fi, Bluetooth, BLE, Zigbee, WFD, UWB, IrDA, and NFC.

The hub device 1000 is a device that receives a voice signal and controls at least one of the plurality of devices (e.g., the first and second devices 4100a and 4200a) based on the received voice signal.

The plurality of devices (e.g., the first and second devices 4100a and 4200a) may be devices that are logged in by using the same user account as a user account of the hub device 1000 and are previously registered to the IoT server 3000 by using the user account of the hub device 1000.

At least one of the plurality of devices (e.g., the first and second devices 4100a and 4200a) may be a listening device that receives a voice input from a user. In an embodiment of FIG. 12A, the first device 4100a may be a listening device that receives, from the user, a voice input including the user's utterance. The listening device may be, but is not limited to, a device that only receives a voice input from the user. In an embodiment of the disclosure, the listening device may be an operation-performing device that receives a control command from the hub device 1000 and performs an operation for a specific function. In an embodiment of the disclosure, the listening device may receive, from the user, a voice input related to a function performed by the listening device. For example, the first device 4100a may be an air conditioner, and the first device 4100a may receive a voice input such as "lower the air conditioner temperature to 20° C." from the user through a microphone 4140.

The first device 4100a that is a listening device may receive a voice signal from the voice input received from the user. In an embodiment of the disclosure, the first device 4100a may convert a sound received through the microphone 4140 into an acoustic signal, and may obtain the voice signal by removing noise (e.g., a non-voice component) form the acoustic signal.

The first device 4100a may transmit the voice signal to the hub device 1000 (step 1).

The hub device 1000 may receive the voice signal from the first device 4100a, and may convert the voice signal into text, by performing ASR by using data of the ASR module 1310 that is previously stored in a memory (step 2).

The memory 1300 (see FIG. 2) of the hub device 1000 may include the device determination model 1330 that detects an intent from the text by interpreting the text and determines a device that performs an operation corresponding to the detected intent. The device determination model 1330 may determine an operation-performing device from among the plurality of devices (e.g., the first and second devices 4100a and 4200a) registered according to the user account. The hub device 1000 may detect the intent from the text, by interpreting the text by using data of the first NLU model 1332 included in the device determination model 1330. The first NLU model 1332 is a model used to determine the intent by interpreting the text and determine the operation-performing device based on the intent. The hub device 1000 may determine that the operation-performing device that performs an operation corresponding to the intent is the first device 4100a by using the data of the device determination model 1330 (step 3).

A function determination model corresponding to the operation-performing device determined by the hub device 1000 may be stored in the memory 1300 of the hub device 1000, may be stored in the first device 4100a itself that is determined as the operation-performing device, or may be stored in the memory 2300 (see FIG. 3) of the voice assistant server 2000. A function determination model corresponding to each device is a model used to obtain operation information about detailed operations for performing an operation according to a determined function of the device and a relationship between the detailed operations.

The hub device 1000 itself may store a function determination model corresponding to at least one device of the plurality of devices (e.g., the first and second devices 4100a and 4200a). For example, when the hub device 1000 is a voice assistant speaker, the hub device 1000 may store the speaker function determination model 1352 used to obtain operation information about detailed operations for performing a function of the voice assistant speaker and a relationship between the detailed operations.

The hub device 1000 may also store a function determination model corresponding to another device. For example, the hub device 1000 may store a refrigerator function determination model 1356 used to obtain operation information about detailed operations corresponding to a refrigerator and a relationship between the detailed operations. The refrigerator may be a device that is previously registered to the IoT server 3000 by using the same user account as the user account of the hub device 1000.

The speaker function determination model 1352 and the refrigerator function determination model 1356 may respectively include second NLU models 1352*a* and 1356*a* and action plan management modules 1352*b* and 1356*b*. In an embodiment of FIG. 12A, the hub device 1000 includes the second NLU model 1352*a* and the action plan management module 1352*b* for a speaker and includes the second NLU module 1356*b* and the action plan management module 1356*b* for a refrigerator. Except that a device type changes from a TV to a refrigerator, the second NLU models 1352*a* and 1354*a* and the action plan management modules 1352*b* and 1354*b* respectively included in the speaker function determination model 1352 and the TV function determination model 1354 of FIG. 2 are the same, and thus a repeated explanation will not be given.

The hub device 1000 may identify a device in which the function determination model 4132 corresponding to the first device 4100*a* determined as the operation-performing device is stored, by using data of the function determination device determination module 1340. In an embodiment of the disclosure, the hub device 1000 may obtain information about a function determination model from each of the plurality of devices (e.g., the first and second devices 4100*a* and 4200*a*). The term 'information about a function determination model' refers to information about whether each of the plurality of devices (e.g., the first and second devices 4100*a* and 4200*a*) itself stores a function determination model used to obtain operation information about detailed operations for performing an operation according to a function and a relationship between the detailed operations. In an embodiment of the disclosure, when the hub device 1000 receives the information about the function determination model from each of the plurality of devices (e.g., the first and second devices 4100*a* and 4200*a*), the hub device 1000 may also obtain information about a storage position of the function determination model of each of the plurality of devices (e.g., device identification information, an IP address, or a MAC address).

In another embodiment of the disclosure, the hub device 1000 may identify a device in which the function determination model corresponding to the operation-performing device is stored from among the hub device 1000, the first device 4100*a*, the second device 4200*a*, and the voice assistant server 2000 by using the database 1360 (see FIG. 2) including information about function determination models of devices stored in the memory. In an embodiment of the disclosure, the hub device 1000 may search the database 1360 according to device identification information of the first device 4100*a* determined as the operation-performing device, by using the data of the function determination device determination module 1340, and may obtain information about a storage position of the function determination model 4132 corresponding to the first device 4100*a* based on a search result of the database 1360.

The hub device 1000 may transmit at least part of the text to the first device 4100*a* that is identified as storing the function determination model 4132 corresponding to the operation-performing device, by using the function determination device determination module 1340 (step 4).

The first device 4100*a* may receive the at least part of the text from the hub device 1000, and may interpret the at least part of the text by using the function determination model 4132 that is previously stored in the memory 4130. In an embodiment of the disclosure, the first device 4100*a* may analyze the at least part of the text by using the NLU model 4134 included in the function determination model 4132, and may obtain operation information about an operation to be performed by the first device 4100*a* based on an analysis result of the at least part of the text. The function determination model 4132 may include the action plan management module 4136 configured to manage operation information related to a detailed operation of a device in order to generate detailed operations to be performed by the first device 4100*a* and an execution order of the detailed operations. The action plan management module 4136 may manage operation information about detailed operations of the first device 4100*a* and a relationship between the detailed operations. The action plan management module 4136 may plan detailed operations to be performed by the first device 4100*a* and an execution order of the detailed operations, based on an analysis result of the at least part of the text. The first device 4100*a* may plan detailed operations and an execution order of the detailed operations based on an analysis result of the at least part of the text by the function determination model 4132, and may execute an operation based on a planning result (step 5).

However, the first device 4100*a* of the disclosure is not limited to performing an operation based on at least part of text received from the hub device 1000. In another embodiment of the disclosure, the first device 4100*a* may receive a voice input from the user by using the microphone 4140, may convert the received voice input into text by using an ASR model 4138, and may perform an operation corresponding to the text by interpreting the text by using the function determination model 4132. That is, the first device 4100*a* may independently execute an operation even without the involvement of the hub device 1000.

FIG. 12A illustrates an embodiment in which the first device 4100*a* that is a listening device receiving a voice input from the user and an operation-performing device that is to perform an operation related to the voice input through the hub device 1000 are the same. For example, when the first device 4100*a* receives a voice input saying "lower the air conditioner temperature to 20° C." from the user, the hub device 1000 may receive the voice input of the user from the first device 4100*a* that is the listening device, and may determine the first device 4100*a* that is an air conditioner as an operation-performing device related to the voice input. The first device 4100*a* may receive text related to the voice input from the hub device 1000, and may execute an air conditioner temperature adjustment operation based on the text.

Unlike in FIG. 12A, a listening device and an operation-performing device may be different from each other, which will be described with reference to FIG. 12B.

FIG. 12B is a conceptual diagram illustrating operations of the hub device 1000 and the plurality of devices (e.g., the first and second devices 4100*a* and 4200*a*) according to an embodiment of the disclosure.

FIG. 12B is a block diagram illustrating essential elements for describing operations of the hub device 1000 and the plurality of devices (e.g., the first and second devices 4100a and 4200a). The same elements of the hub device 1000 and the plurality of devices (e.g., the first and second devices 4100a and 4200a) as those of FIG. 12A will not be repeatedly described.

Referring to FIG. 12B, the second device 4200a may be a listening device that receives a voice input from a user. In an embodiment of the disclosure, although the second device 4200a may be a listening device, the second device 4200a may not be an operation-performing device that receives a control command from the hub device 1000 or performs an operation for a specific function. In an embodiment of FIG. 12B, the second device 4200a that is a TV may receive a voice input not related to the TV such as "lower the air conditioner temperature to 20° C." through a microphone 4240.

The second device 4200a may obtain a voice signal from the voice input received through the microphone 4240, and may transmit the voice signal to the hub device 1000 (step 1).

The hub device 1000 may receive the voice signal from the second device 4200a, and may convert the voice signal into text, by performing ASR by using data of the ASR module 1310 that is previously stored in a memory (step 2).

The hub device 1000 may determine an intent by interpreting the text by using the first NLU model 1332, and may determine an operation-performing device related to the intent by using data of the device determination model 1330 (step 3). In an embodiment of FIG. 12B, the hub device 1000 may determine that an operation-performing device that performs an operation corresponding to the intent is the first device 4100a by using the data of the device determination model 1330. The first device 4100a may be a device different from the listening device that receives the voice input from the user. For example, the first device 4100a may be an air conditioner.

The hub device 1000 may identify a device in which the function determination model 4132 corresponding to the first device 4100a determined as the operation-performing device is stored, by using data of the function determination device determination module 1340, and may transmit at least part of the text to the identified first device 4100a (step 4).

The first device 4100a may receive the at least part of the text from the hub device 1000, may analyze the at least part of the text by using the function determination model 4132, may plan detailed operations and an execution order of the detailed operations based on an analysis result, and may execute an operation based on a planning result (step 5).

Because a function determination model 4232 that may interpret information about detailed operations related to a function of the second device 4200a and an execution order of the detailed operations is stored in the memory 4230 of the second device 4200a, the second device 4200a may not interpret text related to an operation of the first device 4100a. In an embodiment of FIG. 12B, because the second device 4200a is a TV and the function determination model 4232 corresponding to the TV is stored in the memory 4230, the second device 4200a may not interpret the voice input saying "lower the air conditioner temperature to 20° C.". In this case, the second device 4200a that is a listening device may transmit the voice input received from the user to the hub device 1000, and the hub device 1000 may transmit text related to an operation to the first device 4100a determined as the operation-performing device. The first device 4100a may execute an air conditioner temperature adjustment operation based on the text received from the hub device 1000.

Referring to embodiments of FIGS. 12A and 12B, the user may not transmit a voice command regarding an operation to be executed to a specific device that performs an operation related to a specific function, but may transmit the voice command to any one of the plurality of devices (e.g., the first and second devices 4100a and 4200a) connected through a wired/wireless communication network by using a user account. For example, when the user generates a voice command saying "lower the air conditioner temperature to 20° C.", the user may transmit the voice command to an air conditioner that performs a function related to 'cooling temperature setting' or may transmit the voice command related to cooling temperature adjustment to a TV that is not related to an air conditioner at all. A listening device receiving a voice input from the user from among the plurality of devices (e.g., the first and second devices 4100a and 4200a) may transmit the voice input to the hub device 1000, and the hub device 1000 may determine an operation-performing device corresponding to the user's utterance intention included in the voice input, and may control the operation-performing device to execute an operation.

In embodiments of FIGS. 12A and 12B, because the user does not need to directly designate a specific device related to a function from among the plurality of devices (e.g., the first and second devices 4100a and 4200a) and transmit a voice command to the specific device and an operation-performing device for performing an operation related to a function is automatically determined, user convenience may be improved. Also, because the hub device 1000 determines an operation-performing device without the involvement of an external server such as the voice assistant server 2000, a network may not need to be used and thus network usage fees may be reduced.

Figure 13:
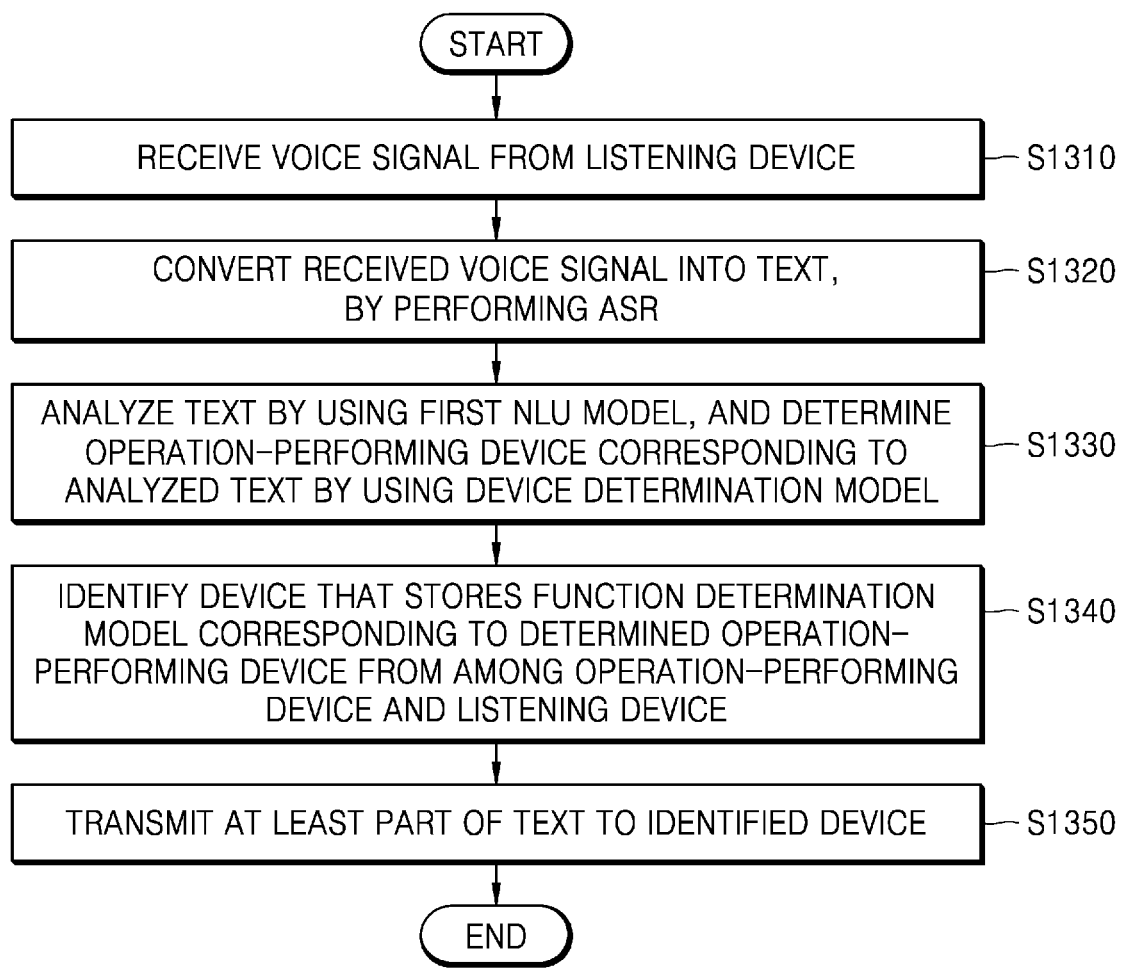
FIG. 13 is a flowchart illustrating a method in which the hub device determines an operation-performing device based on a voice signal received from a listening device and transmits text to a device that stores a function determination model corresponding to the operation-performing device according to an embodiment of the disclosure.

FIG. 13 is a flowchart illustrating a method in which the hub device 1000 determines an operation-performing device based on a voice signal received from a listening device and transmits text to a device storing a function determination model corresponding to the operation-performing device according to an embodiment of the disclosure.

According to an embodiment, in operation S1310, the hub device 1000 receives a voice signal from a listening device. The listening device may be any one of a plurality of devices that are logged in by using the same user account as a user account of the hub device 1000 and are previously registered to the IoT server 3000 by using the same user account as the user account of the hub device 1000. The listening device may be connected through a wired or wireless communication network to the hub device 1000. The listening device may be, but is not limited to, a device that only receives a voice input from the user. In an embodiment of the disclosure, the listening device may be an operation-performing device that receives a control command from the hub device 1000 and performs an operation for a specific function.

In an embodiment of the disclosure, the processor 1200 (see FIG. 2) of the hub device 1000 may receive the voice signal from the listening device through the communication interface 1400 (see FIG. 2).

According to an embodiment, in operation S1320, the hub device 1000 converts the received voice signal into text, by performing ASR. In an embodiment of the disclosure, the hub device 1000 may perform ASR to convert the voice signal received from the listening device into computer-readable text, by using a pre-defined model such as an AM or an LM. When the hub device 1000 receives an acoustic signal from which noise is not removed from the listening device, the hub device 1000 may obtain the voice signal by removing noise from the received acoustic signal and may perform ASR on the voice signal.

According to an embodiment, in operation S1330, the hub device 1000 analyzes the text by using a first NLU model, and determines an operation-performing device corresponding to the analyzed text by using a device determination model. Operation S1330 is the same as operation S630 of FIG. 6 except that the listening device is also included in device candidates that may be determined as the operation-performing device, and thus a repeated explanation will not be given.

According to an embodiment, in operation S1340, the hub device 1000 identifies a device that stores a function determination model corresponding to the operation-performing device determined from among the listening device and the operation-performing device. The function determination model corresponding to the operation-performing device determined by the hub device 1000 may be stored in the memory 1300 (see FIG. 2) of the hub device 1000, may be stored in an internal memory of the operation-performing device itself, or may be stored in the memory 2300 (see FIG. 3) of the voice assistant server 2000. When the determined operation-performing device and the listening device are not the same, the function determination model corresponding to the operation-performing device may be stored in the listening device. The function determination model corresponding to the operation-performing device is a model used by a device determined as the operation-performing device to obtain operation information about detailed operations for performing an operation according to a determined function of the operation-performing device and a relationship between the detailed operations.

In an embodiment of the disclosure, the processor 1200 (see FIG. 2) of the hub device 1000 may identify the device storing the function determination model corresponding to the operation-performing device, by using program code or data of the function determination device determination module 1340 (see FIG. 2). In an embodiment of the disclosure, the hub device 1000 may obtain storage information of a function determination model from each of a plurality of devices that are connected through a wired or wireless communication network to the hub device 1000 and are logged in by using the same user account as the hub device 1000. The term 'storage information of a function determination model' refers to information about whether each of a plurality of devices itself stores a function determination model used to obtain operation information about detailed operations for performing an operation according to a function and a relationship between the detailed operations. In an embodiment of the disclosure, when the hub device 1000 receives information about the function determination model from the plurality of devices, the hub device 1000 may also obtain information about a storage position of the function determination model of each of the plurality of devices (e.g., device identification information, an IP address, or a MAC address). When the operation-performing device and the listening device are not the same, the hub device 1000 may receive the information about the function determination model from the listening device, and may determine whether the function determination model corresponding to the operation-performing device is stored in an internal memory of the listening device based on the received information about the function determination model.

In another embodiment of the disclosure, the hub device 1000 may identify a device in which the function determination model corresponding to an operation-performing device is stored from among the hub device 1000, the operation-performing device, and the voice assistant server 2000 by using the database 1360 (see FIG. 2) including information about function determination models of devices stored in the memory 1300 (see FIG. 2). In an embodiment of the disclosure, the hub device 1000 may search the database 1360 according to device identification information of the operation-performing device by using the program code or data of the function determination device determination module 1340, and may obtain information about a storage position of the function determination model corresponding to the operation-performing device based on a search result of the database 1360. When the operation-performing device and the listening device are not the same, the hub device 1000 may search identification information of the listening device in the database 1360, and may determine whether the function determination model corresponding to the operation-performing device is stored in the internal memory of the listening device based on a search result of the database 1360.

Operation S1340 will be described with reference to FIG. 14.

According to an embodiment, in operation S1350, the hub device 1000 transmits at least part of the text to the identified device. The hub device 1000 may transmit the at least part of the text to the identified device, by using the communication interface 1400 (see FIG. 2). For example, based on determining that the function determination model corresponding to the operation-performing device is stored in the internal memory of the operation-performing device, the hub device 1000 may transmit the at least part of the text to the operation-performing device by using the communication interface 1400. When the listening device and the operation-performing device are the same, the hub device 1000 may transmit the at least part of the text to the listening device. As another example, based on determining that the function determination model corresponding to the operation-performing device is not stored in the listening device and the operation-performing device, but is stored in the memory 2300 (see FIG. 3) of the voice assistant server 2000, the hub device 1000 may transmit the at least part of the text to the voice assistant server 2000 by using the communication interface 1400.

In an embodiment of the disclosure, the hub device 1000 may control the communication interface to separate part about a name of the operation-performing device from the text and transmit only remaining part of the text to the identified device. For example, when the device that is identified as storing the function determination model corresponding to the operation-performing device is an 'air conditioner' and text is 'lower the set temperature to 20° C. in the air conditioner", "in the air conditioner" does not need to be transmitted when the text is transmitted to the air conditioner. In this case, the hub device 1000 may parse the text in units of words or phrases, may recognize a word or a phrase specifying a name, a common name, an installation position, or the like of a device, and may provide remaining part of the text other than the word or phrase recognized in the text to the device (e.g., the air conditioner).

Figure 14:
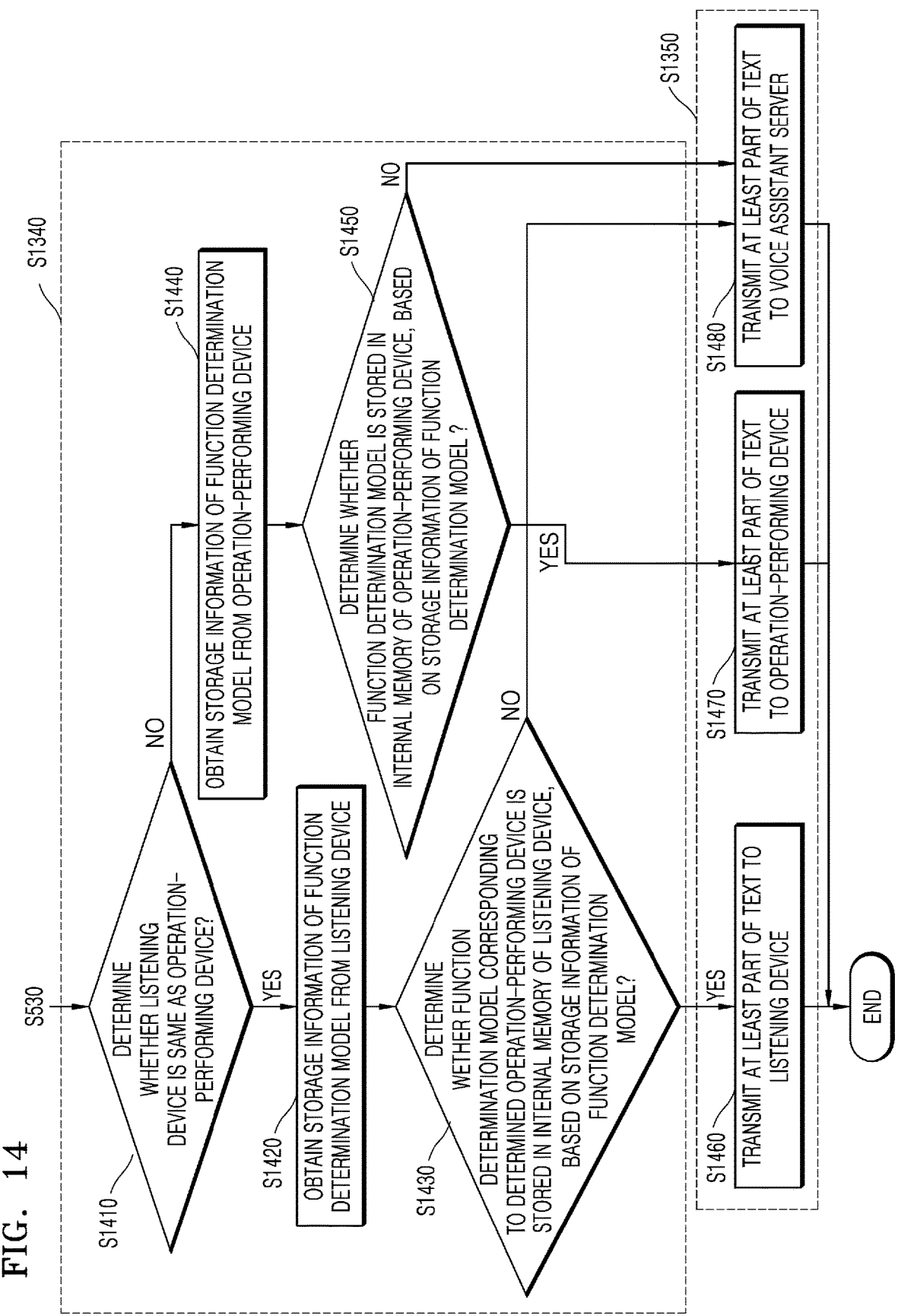
FIG. 14 is a flowchart illustrating a method in which the hub device transmits text to a device that stores a function determination model corresponding to an operation-performing device according to an embodiment of the disclosure.

FIG. 14 is a flowchart illustrating a method in which the hub device 1000 transmits text to a device that stores a function determination model corresponding to an operation-performing device according to an embodiment of the disclosure. FIG. 14 illustrates operations S1340 and S1350 of FIG. 13. Operations S1410 through S1450 of FIG. 14 are detailed embodiments of operation S1340 of FIG. 13, and operations S1460 through S1480 are detailed embodiments of operation S1350 of FIG. 13.

Operation S1410 is performed after operation S1330 of FIG. 13 is performed. In operation S1410, the hub device 1000 determines whether a listening device and a determined operation-performing device are the same. In an embodiment of the disclosure, the processor 1200 of the hub device 1000 may obtain device identification information (e.g., device id information) of the operation-performing device determined in operation S1330 (see FIG. 13) and device identification information of the listening device, and then may determine whether the listening device and the operation-performing device are the same by comparing the obtained device identification information of the operation-performing device with the obtained device identification information of the listening device.

Based on determining that the listening device and the operation-performing device are the same in operation S1410 (YES), the hub device 1000 may obtains storage information of a function determination model from the listening device (S1420). In an embodiment of the disclosure, the hub device 1000 may receive the storage information of the function determination model from the listening device by using the communication interface 1400 (see FIG. 2). The storage information of the function determination model refers to information about whether the listening device itself stores, in an internal memory, a function determination model used to obtain operation information about detailed operations for performing an operation according to a function and a relationship between the detailed operations. In an embodiment of the disclosure, when the hub device 1000 receives information about the function determination model from the listening device, the hub device 1000 may also obtain information about a storage position of the function determination model (e.g., identification information, an IP address, or a MAC address of the listening device).

In operation S1430, the hub device 1000 determines whether the function determination model corresponding to the determined operation-performing device is stored in the internal memory of the listening device, based on the storage information of the function determination model of the listening device. In an embodiment of the disclosure, the processor 1200 (see FIG. 2) of the hub device 1000 may determine whether the function determination model corresponding to the operation-performing device is stored in the internal memory of the listening device, by using program code or data of the function determination device determination module 1340 (see FIG. 2). In an embodiment of the disclosure, the processor 1200 may determine whether the function determination model stored in the internal memory of the listening device is the same as the function determination model corresponding to the operation-performing device, based on the obtained storage information of the function determination model of the listening device.

In another embodiment of the disclosure, the processor 1200 may determine whether the function determination model corresponding to the operation-performing device is stored in the internal memory of the listening device by using the database 1360 (see FIG. 2) storing information about function determination models of a plurality of devices. In an embodiment of the disclosure, the processor 1200 may search the database 1360 according to the device identification information of the listening device, by using the program code or data of the function determination device determination module 1340, and may obtain information whether the function determination model corresponding to the operation-performing device is stored in the listening device based on a search result of the database 1360.

Based on determining that the function determination model corresponding to the operation-performing device is stored in the internal memory of the listening device in operation S1430 (YES), the hub device 1000 transmits at least part of text to the listening device (S1460). In an embodiment of the disclosure, the processor 1200 may transmit the at least part of the text to the function determination model that is previously stored in the internal memory of the listening device, by using the communication interface 1400.

Based on determining that the function determination model corresponding to the operation-performing device is not stored in the internal memory of the listening device in operation S1430 (NO), the hub device 1000 transmits the at least part of the text to the voice assistant server 2000 (S1480). In an embodiment of the disclosure, the processor 1200 may transmit the at least part of the text to the function determination model corresponding to the operation-performing device from among the plurality of function determination models 2342, 2344, 2346, and 2348 that are previously stored in the memory 1300 (see FIG. 3) of the voice assistant server 2000, by using the communication interface 1400.

In operations S1460 and S1480, the processor 1200 may transmit only the at least part of the text, without transmitting the whole of the text, which is the same as that described with reference to FIG. 13 and thus a repeated explanation will not be given.

Based on determining that the listening device and the operation-performing device are different from each other in operation S1410 (NO), the hub device 1000 obtains the storage information of the function determination model from the operation-performing device (S1440). In an embodiment of the disclosure, the hub device 1000 may receive the storage information of the function determination model from the operation-performing device by using the communication interface 1400 (see FIG. 2). In an embodiment of the disclosure, when the hub device 1000 receives information about the function determination model from the operation-performing device, the hub device 1000 may also obtain information a storage position of the function determination model (e.g., identification information, an IP address, or a MAC address of the operation-performing device).

In operation S1450, the hub device 1000 determines whether the function determination model is stored in the internal memory of the operation-performing device. In an embodiment of the disclosure, the processor 1200 may determine whether the function determination model corresponding to the operation-performing device is stored in an internal memory of the operation-performing device, by using the program code or data of the function determination device determination module 1340. In another embodiment of the disclosure, the processor 1200 may determine whether the function determination model corresponding to the operation-performing device is stored in the internal memory of the operation-performing device by using the database 1360 storing information about function determination models of a plurality of devices. In an embodiment of the disclosure, the processor 1200 may search the database 1360 according to the device identification information of the operation-performing device by using the program code or data of the function determination device determination module 1340, and may obtain information about whether the function determination model corresponding to the operation-performing device is stored in the internal memory of the operation-performing device itself based on a search result of the database 1360.

Based on determining that the function determination model corresponding to the operation-performing device is stored in the internal memory of the operation-performing device in operation S1450 (YES), the hub device 1000 transmits the at least part of the text to the operation-performing device (operation S1470). In an embodiment of the disclosure, the processor 1200 may transmit the at least part of the text to the function determination model that is previously stored in the internal memory of the operation-performing device, by using the communication interface 1400.

Based on determining that the function determination model corresponding to the operation-performing device is not stored in the operation-performing device in operation S1450 (NO), the hub device 1000 transmits the at least part of the text to the voice assistant server 2000 (S1480).

Figure 15:
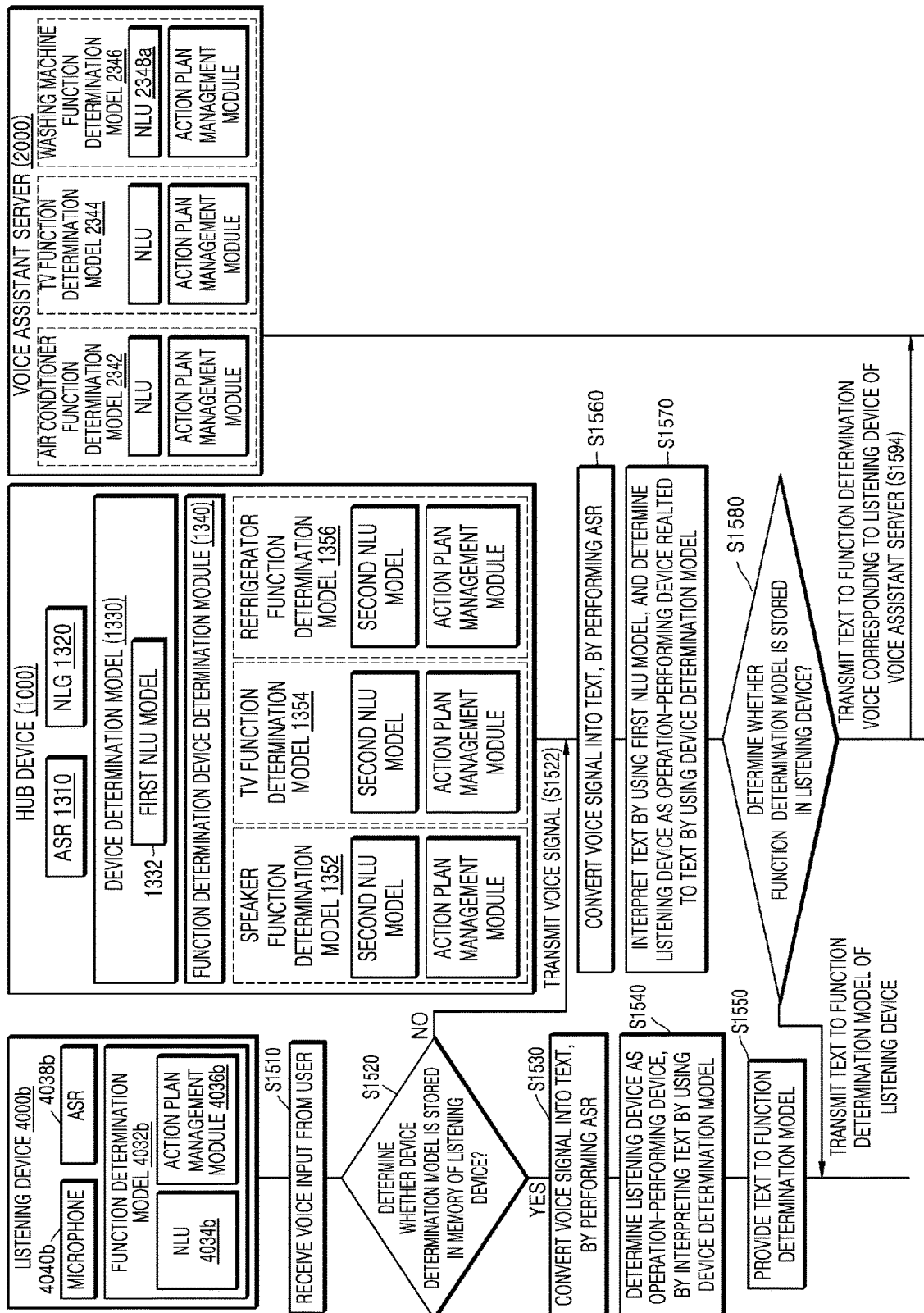
FIG. 15 is a flowchart illustrating a method of operating the hub device, the voice assistant server, and a listening device according to an embodiment of the disclosure.

FIG. 15 is a flowchart illustrating a method of operating the hub device 1000, the voice assistant server 2000, and a listening device 4000b according to an embodiment of the disclosure. FIG. 15 illustrates that the listening device 4000b is determined as an operation-performing device through natural language interpretation through the hub device 1000.

Referring to FIG. 15, the hub device 1000 may include the ASR module 1310, the NLG module 1320, the device determination model 1330, the function determination device determination module 1340, and a plurality of function determination models (e.g., 1352, 1354, and 1356). However, the disclosure is not limited thereto, and the hub device 1000 may not store a function determination model, or may not store a function determination model corresponding to an operation device.

The voice assistant server 2000 may store the plurality of function determination models 2342, 2344, and 2346. For example, the function determination model 2342 that is a first function determination model stored in the voice assistant server 2000 may be a model used to determine a function of an air conditioner and obtain operation information about detailed operations related to the determined function and a relationship between the detailed operations. For example, the function determination model 2344 that is a second function determination model may be a model used to determine a function of a TV and obtain operation information about detailed operations related to the determined function and a relationship between the detailed operations, and the function determination model 2346 that is a third function determination model may be a model used to determine a function of a washing machine and obtain operation information about detailed operations related to the determined function and a relationship between the detailed operations.

The listening device 4000b is a device that receives a voice input from a user. However, the disclosure is not limited thereto, and in an embodiment of the disclosure, the listening device 4000b may be an operation-performing device that receives a control command from the hub device 1000 and performs an operation for a specific function. In an embodiment of FIG. 15, the listening device 4000b may include a function determination model 4032b, an ASR module 4038b, and a microphone 4040b. The function determination model 4032b may include an NLU model 4034b and an action plan management module 4036b.

In operation S1510, the listening device 4000b receives a voice input from a user. In an embodiment of the disclosure, the listening device 4000b may receive, from the user, a voice input related to a function performed by the listening device 4000b through the microphone 4040b. For example, when the listening device 4000b is an air conditioner, the listening device 4000b may receive a voice input such as "lower the air conditioner temperature to 20° C." from the user through the microphone 4040b.

In an embodiment of the disclosure, the listening device 4000b may obtain a voice signal from the voice input received from the user. In an embodiment of the disclosure, the listening device 4000b may convert a sound received through the microphone 4040b into an acoustic signal, and may obtain the voice signal by removing noise (e.g., a non-voice component) from the acoustic signal.

In operation S1520, the listening device 4000b determines whether a device determination model is stored in a memory of the listening device 4000b. In an embodiment of the disclosure, the listening device 4000b may determine whether program code or data corresponding to the device determination model is stored by scanning a memory. However, the disclosure is not limited thereto, and the listening device 4000b may obtain device specification information based on device identification information (e.g., device id information), and may determine whether the device determination model is stored in an internal memory of the listening device 4000b by using the device specification information.

Based on determining that the device determination model is not stored in the memory of the listening device 4000b (NO), the listening device 4000b transmits the voice signal to the hub device 1000 (S1522).

Based on determining that the device determination mode is stored in the memory of the listening device 4000b (YES), the listening device 4000b converts the voice signal into text, by performing ASR (S1530). The listening device 4000b may convert the voice signal into computer-readable text, by performing ASR by using the ASR module 4038b. When the listening device 4000b receives an acoustic signal from which noise is not removed, the listening device 4000b may obtain the voice signal by removing noise from the received acoustic signal, and may perform ASR on the voice signal.

According to an embodiment, in operation S1540, the listening device 4000b determines the listening device 4000b as an operation-performing device, by interpreting the text by using the device determination model. In an embodiment of the disclosure, the device determination model included in the listening device 4000b may include an NLU model, and the listening device 4000b may determine the listening device 4000b as an operation-performing device, by interpreting the text by using the NLU model. For example, when the text converted from the voice signal is "lower the air conditioner temperature to 20° C.", the listening device 4000b may determine the listening device 4000b that is an air conditioner as an operation-performing device, by interpreting the text by using the NLU model.

In operation S1550, the listening device 4000b provides the text to a function determination model 4032. For example, the function determination model 4032 that is a function determination model of an air conditioner may be a model used to obtain operation information about detailed operations for executing an operation according to a function of the air conditioner and a relationship between the detailed operations. The function determination model 4032 may include the NLU model 4034b configured to obtain operation information about an operation to be performed by the listening device 4000b based on an analysis result of at least part of the text. The function determination model 4032b may include the action plan management module 4036b that manages operation information related to a detailed operation of a device to generate detailed operations to be performed by the listening device 4000b and an execution order of the detailed operations. The action plan management module 4036b may plan detailed operations to be performed by the listening device 4000b and an execution order of the detailed operations, based on an analysis result of the at least part of the text.

In an embodiment of the disclosure, the listening device 4000b may provide text saying "lower the air conditioner temperature to 20° C." to the function determination model 4032b for an air conditioner, may obtain operation information to be performed by the air conditioner, e.g., information about an operation for "set temperature down", by interpreting the text by using the NLU model 4034b, and may plan detailed operations for performing an operation for 'set temperature down' and an execution order of the detailed operations by using the action plan management module 4036b.

In operation S1522, the hub device 1000 receives the voice signal from the listening device 4000b.

According to an embodiment, in operation S1560, the hub device 1000 converts the voice signal into text, by performing ASR. A detailed method in which the hub device 1000 performs ASR is the same as a method described in operation S620 of FIG. 6, and thus a detailed explanation will not be given.

According to an embodiment, in operation S1570, the hub device 1000 interprets the text by using the first NLU model 1332, and determines the listening device 4000b as an operation determining device related to the text by using the device determination model 1330. For example, the hub device 1000 may obtain an intent corresponding to "air conditioner set temperature down", by interpreting the text saying "lower the air conditioner temperature to 20° C." by using the first NLU model 1332, and may determine the listening device 4000b that is an air conditioner as an operation-performing device based on the obtained intent by using the device determination model 1330. A detailed method in which the hub device 1000 determines an operation-performing device is the same as a method described in operation S630 of FIG. 6, and thus a detailed explanation will not be given.

According to an embodiment, in operation S1580, the hub device 1000 determines whether a function determination model is stored in the listening device 4000b. In an embodiment of the disclosure, the processor 1200 (see FIG. 2) of the hub device 1000 determines whether the function determination model corresponding to the listening device 4000b is stored in the internal memory of the listening device 4000b, based on storage information of the function determination model obtained from the listening device 4000b. In another embodiment of the disclosure, the processor 1200 may determine whether the function determination model corresponding to the listening device 4000b is stored in the internal memory of the listening device 4000b by using the database 1360 (see FIG. 2) storing information about function determination models of a plurality of devices. A detailed method of determining whether the function determination model corresponding to the listening device 4000b is stored in the internal memory of the listening device 4000b is the same as a method described in operation S1430 of FIG. 14, and thus a repeated explanation will not be given.

Based on determining that the function determination model is stored in the listening device 4000b in operation S1580 (YES), the hub device 1000 transmits the text to the function determination model of the listening device 4000b (S1592).

Based on determining that the function determination model is not stored in the listening device 4000b in operation S1580 (NO), the hub device 1000 transmits the text to the function determination model corresponding to the listening device 4000b of the voice assistant server 2000 (S1594). When the listening device 4000b is an air conditioner and it is determined that a function determination model for the air conditioner is not stored in the internal memory of the listening device 4000b, the hub device 1000 may transmit the text to the function determination model 2342 that is a function determination model for the air conditioner from among the plurality of function determination models 2342, 2344, m and 2346 that are previously stored in the memory 2300 (see FIG. 3) of the voice assistant server 2000.

In an embodiment of the disclosure, operations S1530 through S1550 performed by the listening device 4000b and operations S1560 through S1594 performed by the hub device 1000 may be performed in parallel by separate entities. Also, operations S1530 through S1550 performed by the listening device 4000b may be independently performed regardless of operations S1560 through S1594 performed by the hub device 1000. That is, although the listening device 4000b may be determined as an operation-performing device by the hub device 1000 and may receive the at least part of text, the disclosure is not limited thereto. In an embodiment of the disclosure, the listening device 4000b may determine an operation-performing device by interpreting the voice input of the user, and may provide the at least part of the text to the function determination model 4032b.

Figure 16:
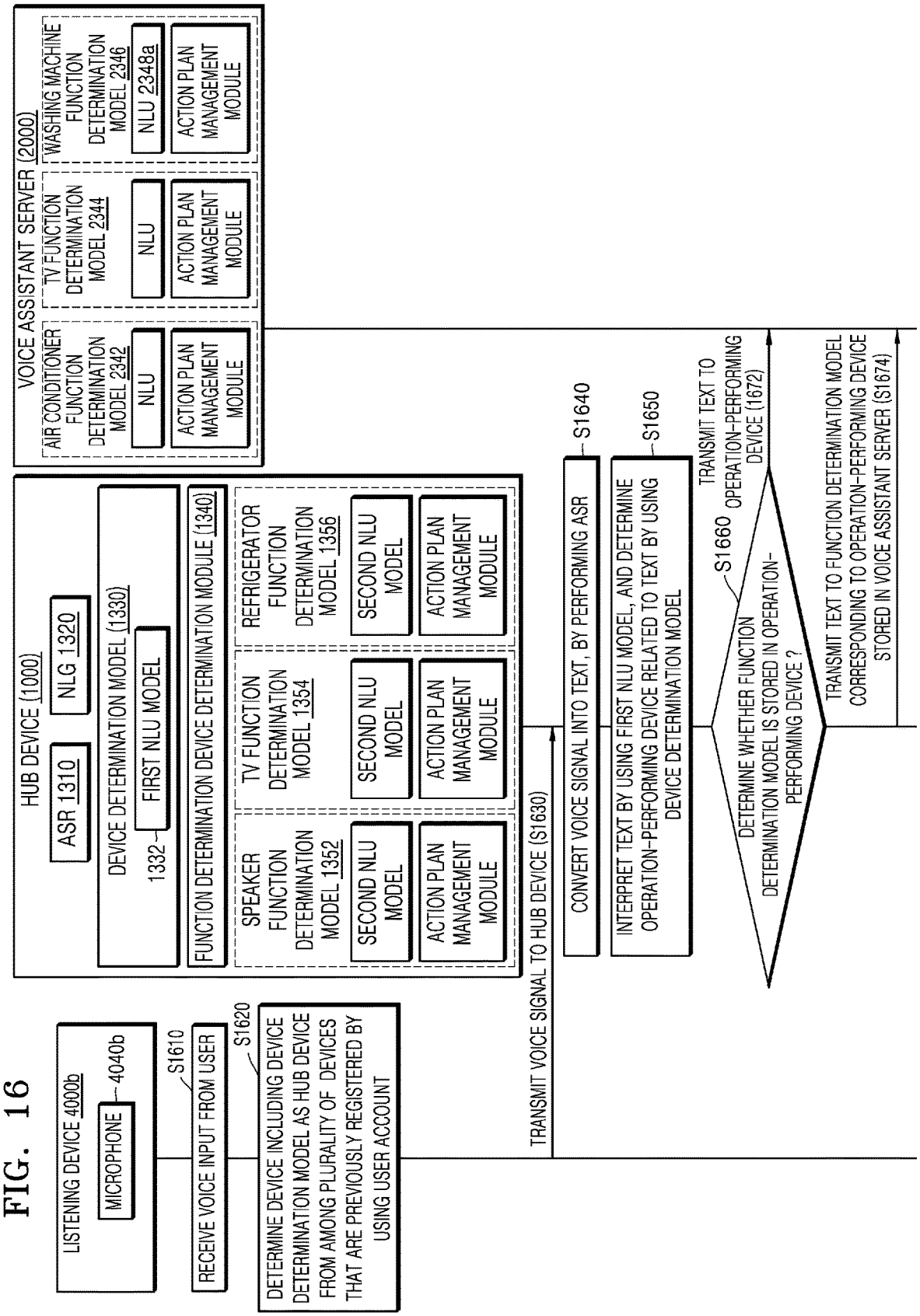
FIG. 16 is a flowchart illustrating a method of operating the hub device, the voice assistant server, the listening device, and the operation-performing device according to an embodiment of the disclosure.

FIG. 16 is a flowchart illustrating a method of operating the hub device 1000, the voice assistant server 2000, the operation-performing device 4000a, and the listening device 4000b according to an embodiment of the disclosure. FIG. 16 illustrates that the listening device 4000b and the operation-performing device 4000a are different from each other. For example, the listening device 4000b may be a TV, and the operation-performing device 4000a may be an air conditioner.

Referring to FIG. 16, the hub device 1000 may include the ASR module 1310, the NLG module 1320, the device determination model 1330, the function determination device determination module 1340, and a plurality of function determination models (e.g., 1352, 1354, and 1356).

The voice assistant server 2000 may store the plurality of function determination models 2342, 2344, and 2346.

The hub device 1000 and the voice assistant server 2000 of FIG. 16 are respectively the same as the hub device 1000 and the voice assistant server 2000 of FIG. 15, and thus a repeated explanation will not be given.

The listening device 4000b of FIG. 16 may include only the microphone 4040b, unlike in FIG. 15. The listening device 4000b may receive a voice input of a user through the microphone 4040b, and may transmit the received voice input to the hub device 1000. In an embodiment of the disclosure, when the listening device 4000b receives the voice input of the user, the listening device 4000b may be previously set to perform an operation of transmitting the voice input to the hub device 1000.

The operation-performing device 4000a itself may store the function determination model 4032. The operation-performing device 4000a itself may analyze text, and the function determination model 4032 used to perform an operation according to an intention of the user based on an analysis result of the text may be stored in a memory of the operation-performing device 4000*a*. For example, when the operation-performing device 4000*a* is an "air conditioner", the function determination model 4032 stored in the memory of the operation-performing device 4000*a* may be a model used to determine a function of the air conditioner and obtain operation information about detailed operations for the determined function and a relationship between the detailed operations.

According to an embodiment, in operation S1610, the listening device 4000*b* receives a voice input from a user. Operation S1610 is the same as operation S1510 of FIG. 15, and thus a repeated explanation will not be given.

According to an embodiment, in operation S1620, the listening device 4000*b* determines a device including the device determination model 1330 as the hub device 1000 from among a plurality of devices that are previously registered by using a user account. In an embodiment of the disclosure, the listening device 4000*b* may obtain device determination model information from a plurality of devices that are connected through a wired or wireless communication network and are logged in by using the same user account, and may determine the device storing the device determination model 1330 as the hub device 1000 based on the obtained device determination model information. The device determination model information may include at least one of information about whether there exists a device determination model of each of the plurality of devices, identification information of a device/server in which a device determination model is stored, or information about an IP address of the stored device/server or a MAC address of the stored device/server.

In operation S1630, the listening device 4000*b* transmits a voice signal to the hub device 1000.

According to an embodiment, in operation S1640, the hub device 1000 converts the voice signal into text, by performing ASR.

According to an embodiment, in operation S1650, the hub device 1000 interprets the text by using the first NLU model 1332, and determines an operation-performing device related to the text by using the device determination model 1330.

Operations S1640 and S1650 are respectively the same as operations S620 and S630 of FIG. 6, and thus a repeated explanation will not be given.

According to an embodiment, in operation S1660, the hub device 1000 determines whether a function determination model is stored in the operation-performing device. In an embodiment of the disclosure, the processor 1200 (see FIG. 2) of the hub device 1000 determines whether the function determination model 4032 corresponding to the operation-performing device 4000*a* is stored in an internal memory of the operation-performing device 4000*a*, based on storage information of the function determination model 4032 obtained from the operation-performing device 4000*a*. In another embodiment of the disclosure, the processor 1200 may determine whether the function determination model corresponding to the operation-performing device 4000*a* is stored in the internal memory of the operation-performing device 4000*a* by using the database 1360 (see FIG. 2) storing information about function determination models of a plurality of devices. A detailed method of determining whether the function determination model corresponding to the operation-performing device 4000*a* is stored in the internal memory of the operation-performing device 4000*a* is the same as a method described in operation S1450 of FIG. 14, and thus a repeated explanation will not be given.

Based on determining that the function determination model 4032 is stored in the operation-performing device 4000*a* in operation S1660 (YES), the hub device 1000 transmits the text to the operation-performing device 4000*a* (S1672). For example, when the operation-performing device 4000*a* is an air conditioner and it is determined that the function determination model 4032 stored in the memory of the operation-performing device 4000*a* is a model for obtaining operation information for the air conditioner, the hub device 1000 may transmit at least part of the text to the function determination model 4032 stored in the operation-performing device 4000*a*.

Based on determining that the function determination model is not stored in the operation-performing device 4000*a* in operation S1660 (NO), the hub device 1000 transmits the text to the voice assistant server 2000 (S1674). For example, when the operation-performing device 4000*a* is an air conditioner but it is determined that the function determination model 4032 stored in the memory of the operation-performing device 4000*a* is a model for obtaining operation information for a TV, the hub device 1000 may transmit the at least part of the text to the function determination model 2342 for obtaining operation information for the air conditioner from among the plurality of function determination models 2342, 2344, and 2346 stored in the voice assistant server 2000.

Figure 17:
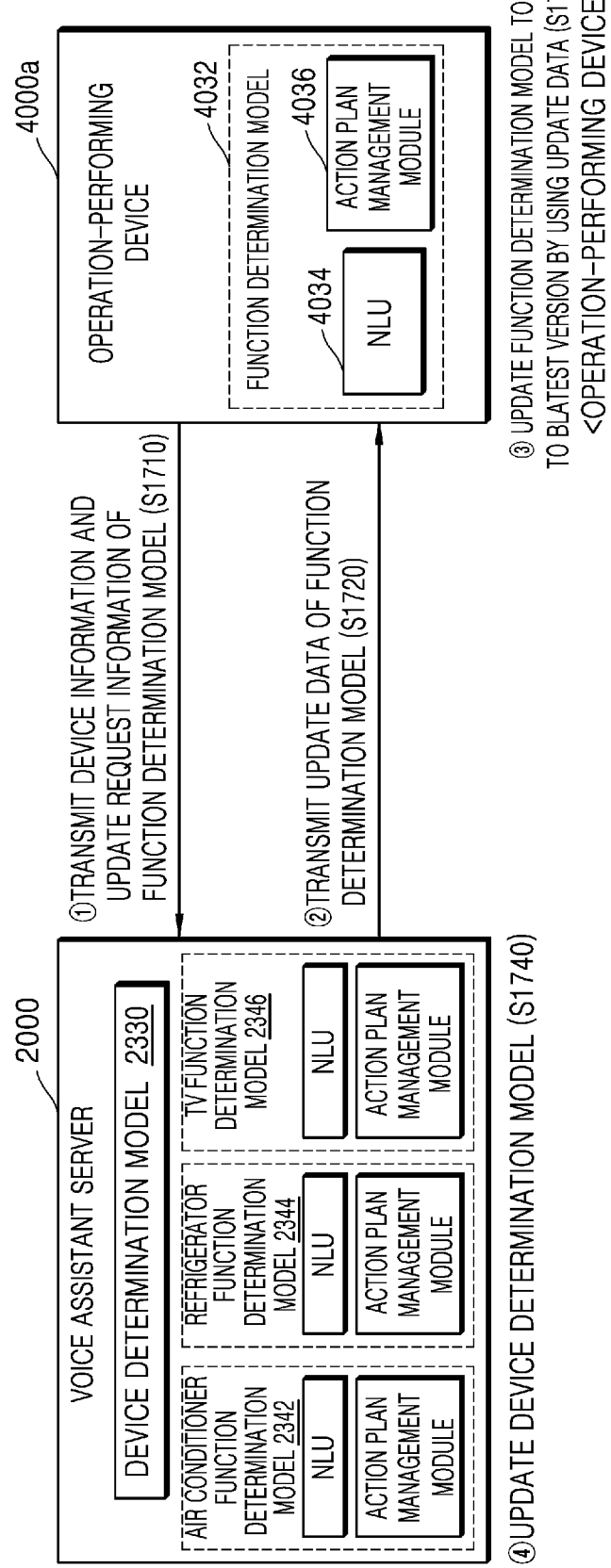
FIG. 17 is a diagram illustrating an example where the operation-performing device updates a function determination model according to an embodiment of the disclosure.

FIG. 17 is a diagram illustrating an example where the operation-performing device 4000*a* updates a function determination model according to an embodiment of the disclosure.

Referring to FIG. 17, the voice assistant server 2000 may include the device determination model 2330 and the plurality of function determination models 2342, 2344 and 2346. The operation-performing device 4000*a* may include the function determination model 4032, and the function determination model 4032 may include the NLU model 4034 and the action plan management module 4036.

The device determination model 2330 included in the voice assistant server 2000 may be a latest version of a model configured to determine the operation-performing device 4000*a*, by interpreting a voice input for a latest function or a latest device. The plurality of function determination models 2342, 2344, and 2346 included in the voice assistant server 2000 may be latest versions of models configured to interpret voice inputs for latest functions related to, for example, an air conditioner, a refrigerator, and a TV, and generate operation information as an analysis result.

The function determination model 4032 included in the operation-performing device 4000*a* that is a model configured to interpret text converted from the voice input and generate operation information for performing a specific function may include the NLU model 4034 trained to interpret only text about a limited number of functions and the action plan management module 4036 trained to generate operation information from the text interpreted by the NLU model 4034. In an embodiment of the disclosure, the function determination model 4032 included in the operation-performing device 4000*a* may not be a latest version, and thus may not interpret text about the latest function and may not generate operation information about the latest function. When the text about the latest function is received, because the function determination model 4032 may not interpret the text and may not determine the function even when the NLU model 4034 is used, the function determination model 4032 may not generate operation information even when the action plan management module 4036 is used. In this case, the operation-performing device 4000*a* is unable to determine a function.

According to an embodiment, in operation S1710, the operation-performing device 4000*a* transmits device information and update request information of a function determination model to the voice assistant server 2000. The update request information of the function determination model may be information for requesting a version of the function determination model 4032 stored in a memory of the operation-performing device 4000*a* to be synchronized with a version of a function determination model corresponding to the operation-performing device 4000*a* from among the plurality of function determination models 2342, 2344, and 2346 stored in the voice assistant server 2000.

In an embodiment of the disclosure, the operation-performing device 4000*a* may periodically transmit the update request information of the function determination model to the voice assistant server 2000 at certain time intervals, certain dates, or the like. However, the disclosure is not limited thereto, and the operation-performing device 4000*a* may transmit the update request information of the function determination model to the voice assistant server 2000 when an application or firmware is updated. In another embodiment of the disclosure, when the operation-performing device 4000*a* receives a control command from the IoT server 3000, the operation-performing device 4000*a* may transmit the update request information of the function determination model to the voice assistant server 2000.

According to an embodiment, in operation S1720, the voice assistant server 2000 transmits update data of the function determination model.

According to an embodiment, in operation S1730, the operation-performing device 4000*a* updates the function determination model to a latest version by using the update data. In an embodiment of the disclosure, the operation-performing device 4000*a* may overwrite and update the function determination model 4032 that is previously stored by using data of the latest version of the function determination model received from the voice assistant server 2000. The operation-performing device 4000*a* may perform training to interpret text about the latest function added, modified, or deleted by updating the function determination model 4032 and generate operation information according to an interpretation result.

According to an embodiment, in operation S1740, the voice assistant server 2000 updates the device determination model 2330. In an embodiment of the disclosure, when the voice assistant server 2000 interprets the text related to the latest function and determines a device for performing an operation for the latest function, the operation-performing device 4000*a* may be updated so that the device determination model 2330 is also included in device candidates.

According to an embodiment of FIG. 17, because the function determination model 4032 stored in an internal memory of the operation-performing device 4000*a* itself is synchronized with a latest function determination model of the voice assistant server 2000, when the user utters to execute a latest function, an operation may be performed through the function determination model 4032 of the operation-performing device 4000*a* even without accessing the voice assistant server 2000 by using a communication network, thereby reducing network usage fees and improving server operation efficiency.

Figure 18:
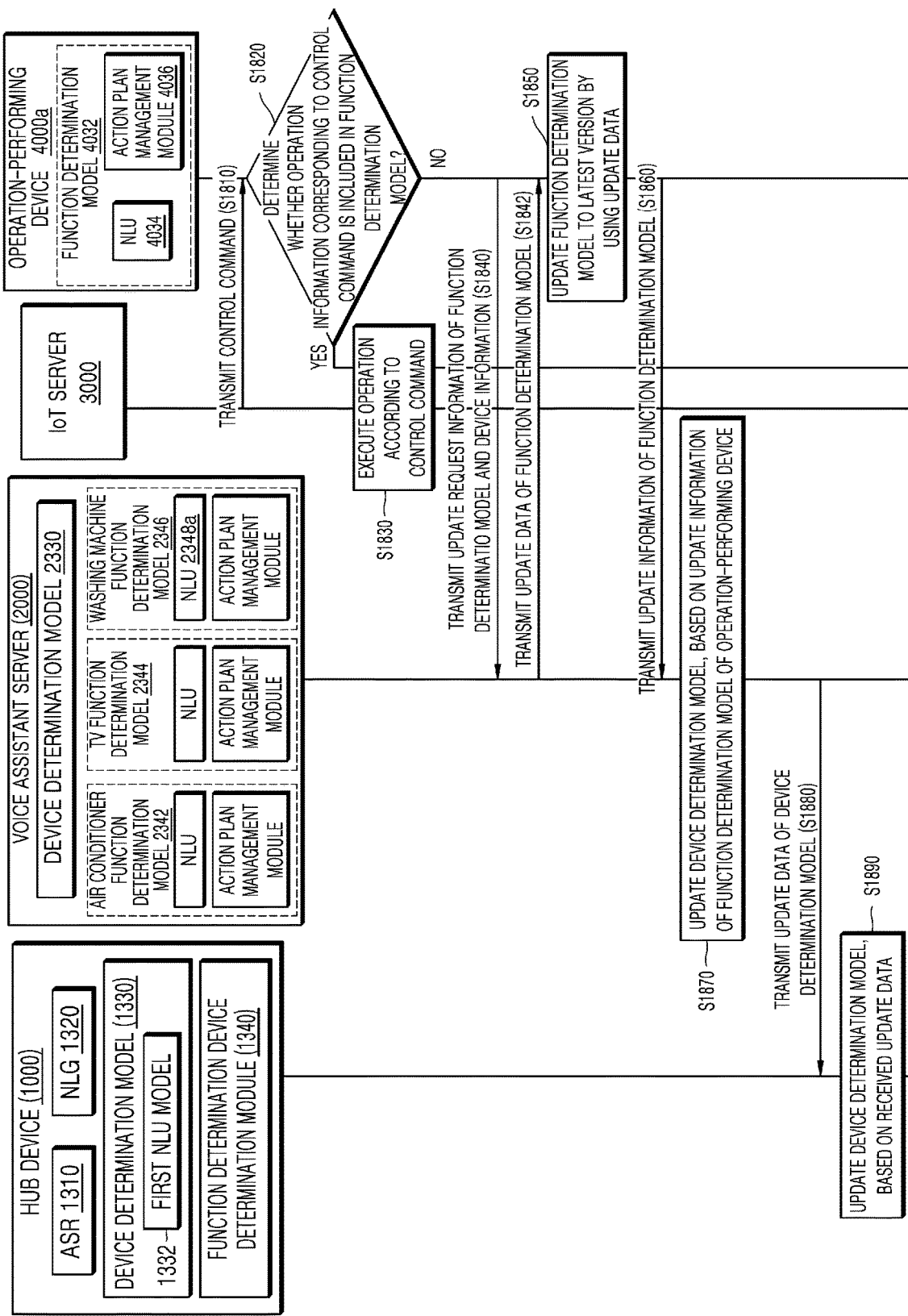
FIG. 18 is a flowchart illustrating a method of operating the hub device, the voice assistant server, the IoT server, and the operation-performing device according to an embodiment of the disclosure.

FIG. 18 is a flowchart illustrating a method of operating the hub device 1000, the voice assistant server 2000, the IoT server 3000, and the operation-performing device 4000*a* according to an embodiment of the disclosure. FIG. 18 illustrates that the operation-performing device 4000*a* updates the function determination model 4032 to a latest version when receiving a control command from the IoT server 3000.

Referring to FIG. 18, the hub device 1000 may include the ASR module 1310, the NLG module 1320, the device determination model 1330, the function determination device determination module 1340, and a plurality of function determination models (e.g., 1352, 1354, and 1356).

The operation-performing device 4000*a* may include the function determination model 4032, and the function determination model 4032 may include the NLU model 4034 and the action plan management module 4036.

The hub device 1000 and the operation-performing device 4000*a* of FIG. 18 are respectively the same as the hub device 1000 and the operation-performing device 4000*a* of FIG. 16, and thus a repeated explanation will not be given.

The voice assistant server 2000 may include the device determination model 2330 and the plurality of function determination models 2342, 2344, and 2346. The device determination model 2330 is the same as the device determination model 2330 of FIG. 3, and thus a repeated explanation will not be given.

In operation S1810, the IoT server 3000 transmits a control command to the operation-performing device 4000*a*.

In operation S1820, the operation-performing device 4000*a* determines whether operation information corresponding to the control command is included in the function determination model 4032. In an embodiment of the disclosure, the operation-performing device 4000*a* may determine whether information about a function for performing an operation according to the control command received from the IoT server 3000 is included in the function determination model 4032. For example, when the operation-performing device 4000*a* is an air conditioner and a control command for a dehumidification mode is received, the operation-performing device 4000*a* may determine whether information about detailed operations for a dehumidification function for operating the dehumidification mode and an execution order of the detailed operations is stored in the function determination model 4032.

Based on determining that the operation information corresponding to the control command is stored in the function determination model 4032 in operation S1820 (YES), the operation-performing device 4000*a* executes operations according to the control command (S1830).

Based on determining that the operation information corresponding to the control command is not stored in the function determination model 4032 in operation S1820 (NO), the operation-performing device 4000*a* transmits update request information of the function determination model 4032 and device information to the voice assistant server 2000 (S1840). The device information may include at least one of device identification information (e.g., device id information) of the operation-performing device 4000*a*, storage information of the function determination model 4032 of the operation-performing device 4000*a*, or version information of the function determination model 4032. The version information of the function determination model 4032 may include information about an attribute, a type, or the number of functions that may be identified by using the function determination model 4032.

In operation S1842, the voice assistant server 2000 transmits update data of the function determination model to the operation-performing device 4000*a*.

In operation S1850, the operation-performing device 4000a updates the function determination model 4032 to a latest version by using the update data. Operation S1850 is the same as operation S1730 of FIG. 17, and thus a repeated explanation will not be given.

In operation S1860, the operation-performing device 4000a transmits update information of the function determination model 4032 to the voice assistant server 2000. In an embodiment of the disclosure, the operation-performing device 4000a may transmit, to the voice assistant server 2000, at least one of information about a version of the function determination model 4032 after updating, and information about an attribute, a type, or the number of functions that may be identified by using the function determination model 4032 after updating.

In operation S1870, the voice assistant server 2000 updates the device determination model 2330 based on the update information of the function determination model 4032 of the operation-performing device. In an embodiment of the disclosure, the voice assistant server 2000 may update the device determination model 2330 so that the operation-performing device 4000a is included in a device candidate list for determining a device for performing an operation for a latest function, based on at least one of updated version information of the function determination model 4032, or information about an attribute, a type, and the number of functions that may be identified by using the updated function determination model 4032 received from the operation-performing device 4000a.

In operation S1880, the voice assistant server 2000 transmits update data of the device determination model 2330 to the hub device 1000.

In operation S1890, the hub device 1000 updates the device determination model 1330, based on the received update data. The device determination model 1330 may be synchronized with the device determination model 2330 of the voice assistant server 2000, by being updated. Accordingly, when a voice input of a user related to a latest function is received through the hub device 1000, because the hub device 1000 itself may determine the operation-performing device 4000a by using the device determination model 1330 that is stored in the internal memory 1300 (see FIG. 2), without accessing the voice assistant server 2000 by using a communication network, network usage fees may be reduced, a processing time may be reduced, and thus a response speed may be improved.

Figure 19:
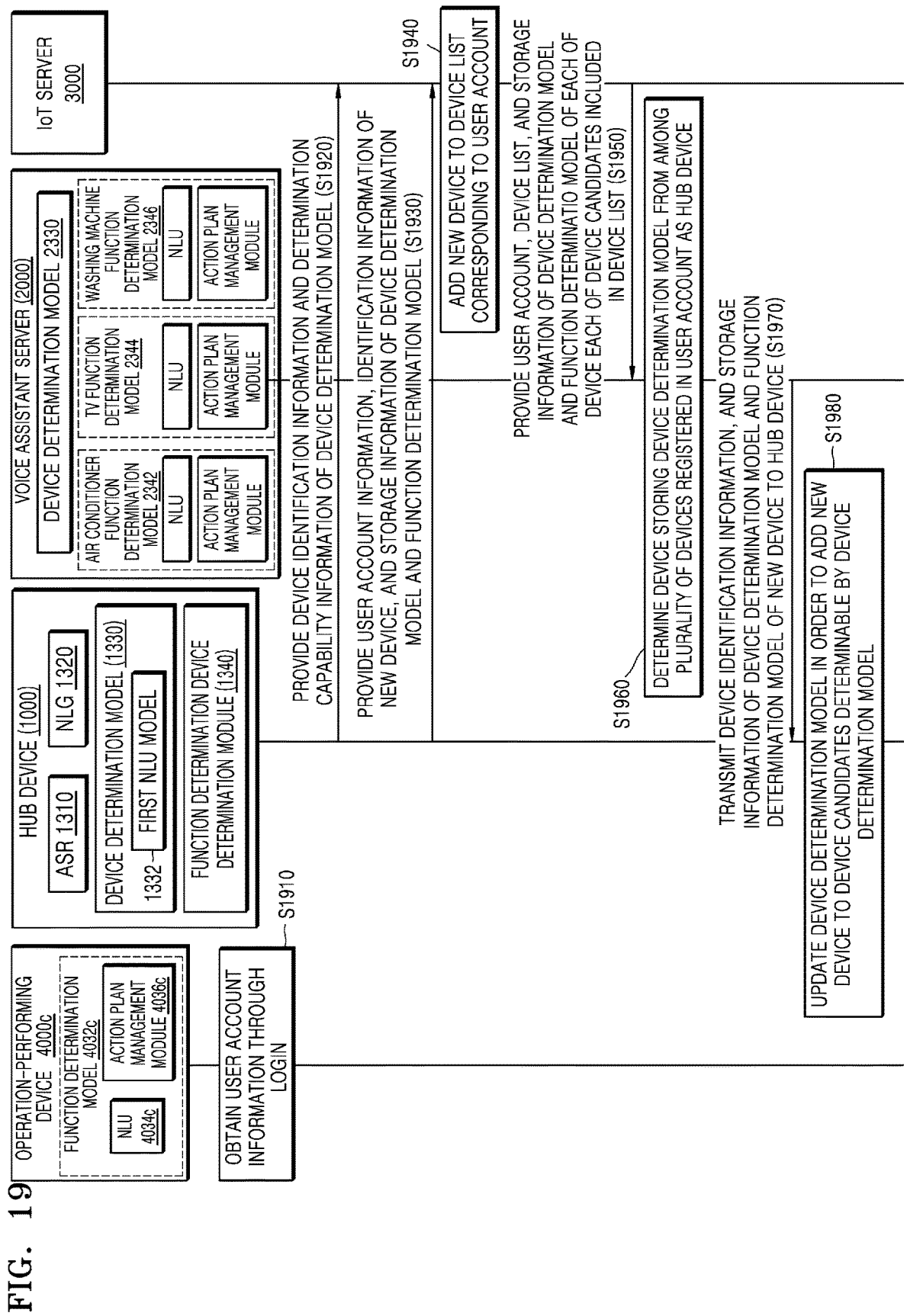
FIG. 19 is a flowchart illustrating a method of operating the hub device, the voice assistant server, the IoT server, and a new device according to an embodiment of the disclosure.

FIG. 19 is a flowchart illustrating a method of operating the hub device 1000, the voice assistant server 2000, the IoT server 3000, and a new device 4000c.

Referring to FIG. 19, the hub device 1000 may include the ASR module 1310, the NLG module 1320, the device determination model 1330, and the function determination device determination module 1340.

The voice assistant server 2000 may include the device determination model 2330 and the plurality of function determination models 2342, 2344, and 2346. The device determination model 2330 is the same as the device determination model 2330 of FIG. 3, and thus a repeated explanation will not be given.

The new device 4000c is a target device that is logged in by using the same user account as a user account of the hub device 1000 and is expected to be registered in a user account of the voice assistant server 2000. The new device 4000c may be connected to the hub device 1000, the voice assistant server 2000, and the IoT server 3000 through a wired or wireless communication network.

In an embodiment of FIG. 19, the new device 4000c itself may analyze text, and a function determination model 4032c used to perform an operation according to a user's intention based on an analysis result of the text may be stored in a memory of the new device 4000c. For example, when the new device 4000c is an 'air purifier', the function determination model 4032c stored in the memory of the new device 4000c may be a model used to determine a function of the air conditioner and obtain operation information about detailed operations for the determined function and a relationship between the detailed operations. The function determination model 4032c may include an NLU model 4034c and an action plan management module 4036c.

However, the disclosure is not limited thereto, and the new device 4000c may not include the function determination model 4032c. In another embodiment of the disclosure, the new device 4000c may include a device determination model.

In operation S1910, the new device 4000c obtains user account information through login. The user account information includes a user id and a password. The obtained user account information may be the same as user account information of the hub device 1000.

In operation S1920, the hub device 1000 provides device identification information and determination capability information of the device determination model 1330 to the IoT server 3000. The term 'device determination capability information' refers to information about a capability of the hub device 1000 to interpret text by using the first NLU model 1332 included in the device determination model 1330 and determine a device for performing an operation according to an interpretation result of the text by using the device determination model 1330. The capability information may include information about device candidates used by the device determination model 1330 to determine an operation-performing device. For example, the device determination model 1330 of the hub device 1000 may be a model trained to interpret only text related to an air conditioner, a TV, and a refrigerator and determine only one device from among the air conditioner, the TV, and the refrigerator as an operation-performing device according to an interpretation result. In this case, the device candidates may be the 'air conditioner, the TV, and the refrigerator'.

In operation S1930, the new device 4000c provides user account information, identification information (e.g., device id information) of the new device 4000c, and storage information of a device determination model and a function determination model to the IoT server 3000. The term 'storage information of the device determination model' refers to information about whether the new device 4000c itself stores a device determination model for determining an operation-performing device in an internal memory. The term 'storage information of the function determination model' refers to information about whether the new device 4000c stores, in the internal memory, a function determination model used to obtain operation information about detailed operations for performing an operation according to a function and a relationship between the detailed operations. The storage information of the function determination model may include information about whether not only a function determination model corresponding to the new device 4000c but also a function determination model corresponding to a device other than the new device 4000c are stored.

In operation S1940, the IoT server 3000 adds the new device 4000c to a device list corresponding to a user account. The IoT server 3000 may store the device identification information and storage information of the device determination model and the function determination model of the new device 4000c in the device list registered according to each user account. Operation S1940 may be an operation in which the new device 4000c is registered. When operation S1940 is performed, the new device 4000c is a registered device.

In operation S1950, the IoT server 3000 provides the user account, the device list, and the storage information of the device determination model and the function determination model of each of device candidates included in the device list to the voice assistant server 2000.

In operation S1960, the voice assistant server 2000 determines a device storing a device determination model from among a plurality of devices registered in the user account as the hub device 1000. In an embodiment of the disclosure, the voice assistant server 2000 may identify a device storing a device determination model based on the storage information of the device determination model for each of the plurality of devices registered according to the user account obtained from the IoT server 3000, and may determine the identified device as the hub device 1000.

In operation S1970, the voice assistant server 2000 transmits the device identification information and the storage information of the device determination model and the function determination model of the new device 4000c to the hub device 1000.

In operation S1980, the hub device 1000 updates the device determination model 1330, in order to add the new device 4000c to the device candidates which may be determined as an operation-performing device by the device determination model 1330. Through updating, the device determination model 1330 may interpret text related to the new device 4000c by using the first NLU model 1332, and the device determination model 1330 may determine the new device 4000c as an operation-performing device according to an interpretation result.

For example, when the new device 4000c is an air purifier, before the device determination model 1330 is updated, the device determination model 1330 may fail to interpret text such as "operate the fine dust purification mode", may fail to determine an operation-performing device, and thus may output a 'fail' message. When the new device 4000c is added to the device candidates by updating the device determination model 1330, the device determination model 1330 may interpret the text saying "operate the fine dust purification mode" by using the updated first NLU model 1332, and may determine the air purifier that is the new device 4000c as an operation-performing device based on an interpretation result of the text.

Figure 20:
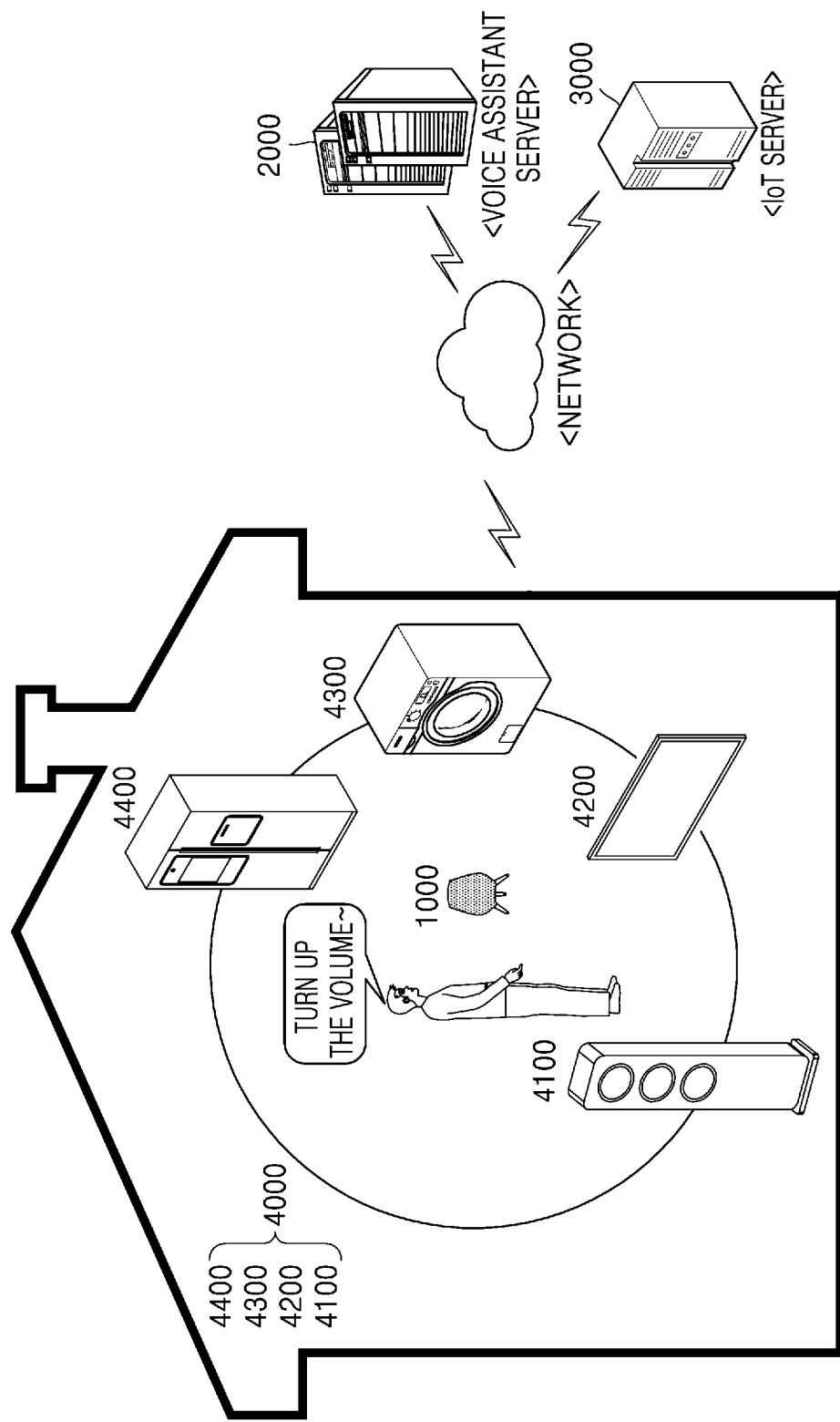
FIG. 20 is a diagram illustrating a multi-device system environment including the hub device, the voice assistant server, and the plurality of devices.

FIG. 20 is a diagram illustrating a network environment including the hub device 1000, the plurality of devices 4000, and the voice assistant server 2000.

Referring to FIG. 20, the hub device 1000, the plurality of devices 4000, the voice assistant server 2000, and the IoT server 3000 may be connected to one another by using a wired communication or wireless communication method, and may perform communication. In an embodiment of the disclosure, the hub device 1000 and the plurality of devices 4000 may be directly connected to each other through a communication network, but the disclosure is not limited thereto.

The hub device 1000 and the plurality of devices 4000 may be connected to the voice assistant server 2000, and the hub device 1000 may be connected to the plurality of devices 4000 through a server. Also, the hub device 1000 and the plurality of devices 4000 may be connected to the IoT server 3000. In another embodiment of the disclosure, the hub device 1000 and the plurality of devices 4000 may each be connected to the voice assistant server 2000 through a communication network, and may be connected to the IoT server 30000 through the voice assistant server 2000. In another embodiment of the disclosure, the hub device 1000 may be connected to the plurality of devices 4000, and the hub device 1000 may be connected to the plurality of devices 4000 through one or more nearby access points. Also, the hub device 1000 may be connected to the plurality of devices 4000 in a state where the hub device 1000 is connected to the voice assistant server 2000 or the IoT server 3000.

The hub device 1000, the plurality of devices 4000, the voice assistant server 2000, and the IoT server 3000 may be connected through a LAN, a WAN, a VAN, a mobile radio communication network, a satellite communication network, or a combination thereof. Examples of the wireless communication method may include, but are not limited to, Wi-Fi, Bluetooth, BLE, Zigbee, WFD, UWB, IrDA, and NFC.

In an embodiment of the disclosure, the hub device 1000 may receive a voice input of a user. At least one of the plurality of devices 4000 may be a target device that receives a control command of the voice assistant server 2000 and/or the IoT server 3000 and performs a specific operation. At least one of the plurality of devices 4000 may be controlled to perform a specific operation based on the voice input of the user received by the hub device 1000. In an embodiment of the disclosure, at least one of the plurality of devices 4000 may receive a control command from the hub device 1000, without receiving a control command from the voice assistant server 2000 and/or the IoT server 3000.

The hub device 1000 may receive a voice input (e.g., an utterance) from the user. In an embodiment of the disclosure, the hub device 1000 may include an ASR model. In an embodiment of the disclosure, the hub device 1000 may include an ASR model having a limited function. For example, the hub device 1000 may include an ASR model having a function of detecting a designated voice input (e.g., a wake-up input such as 'Hi, Bixby' or 'OK, Google') or a function of pre-processing a voice signal obtained from part of a voice input. Although the hub device 1000 is an AI speaker in FIG. 20, the disclosure is not limited thereto. In an embodiment of the disclosure, one of the plurality of devices 4000 may be the hub device 1000. Also, the hub device 1000 may include a first NLU model, a second NLU model, and a natural language generation model. In this case, the hub device 1000 may receive a voice input of the user through a microphone, or may receive a voice input of the user from at least one of the plurality of devices 4000. When a voice input of the user is received, the hub device 1000 may process the voice input of the user by using the ASR model, the first NLU model, the second NLU model, and the natural language generation model, and may provide a response to the voice input of the user.

The hub device 1000 may determine a type of the target device for performing an operation intended by the user, based on the received voice signal. The hub device 1000 may receive a voice signal that is an analog signal, and may convert a voice part into computer-readable text by performing ASR. The hub device 1000 may interpret the text by using the first NLU model, and may determine the target device based on an interpretation result. The hub device 1000 may determine at least one of the plurality of devices 4000 as the target device. The hub device 1000 may select a second NLU model corresponding to the determined target device from among a plurality of stored second NLU models. The hub device 1000 may determine an operation to be performed by the target device requested by the user by using the selected second NLU model. Based on determining that there is no second NLU model corresponding to the determined target device from among the plurality of stored second NLU models, the hub device 1000 may transmit at least part of the text to at least one of the plurality of devices 4000 or the voice assistant server 2000. The hub device 1000 transmits information about the determined operation to the target device so that the determined target device executes the determined operation.

The hub device 1000 may receive information of the plurality of devices 4000 from the IoT server 3000. The hub device 1000 may determine the target device by using the received information of the plurality of devices 4000. Also, the hub device 1000 may control the target device to execute the determined operation, by using the IoT server 3000 as a relay server for transmitting the information about the determined operation.

The hub device 1000 may receive a voice input of the user through the microphone, and may transmit the received voice input to the voice assistant server 2000. In an embodiment of the disclosure, the hub device 1000 may obtain a voice signal from the received voice input, and may transmit the voice signal to the voice assistant server 2000.

In an embodiment of FIG. 20, the plurality of devices 4000 include, but are not limited to, the first device 4100 that is an air conditioner, the second device 4200 that is a TV, the third device 4300 that is a washing machine, and a fourth device 4400 that is a refrigerator. For example, the plurality of devices 4000 may include at least one of a smartphone, a tablet PC, a tablet PC, a mobile phone, a video phone, an e-book reader, a desktop PC, a laptop PC, a netbook computer, a workstation, a server, a PDA, a PMP, an MP3 player, a mobile medical device, a camera, or a wearable device. In an embodiment of the disclosure, the plurality of devices 4000 may be home appliances. The home appliances may include at least one of a TV, a digital video disk (DVD) player, an audio device, a refrigerator, an air conditioner, a cleaner, an oven, a microwave oven, a washing machine, an air purifier, a set-top box, a home automation control panel, a security control panel, a game console, an electronic key, a camcorder, or an electronic picture frame.

The voice assistant server 2000 may determine a type of the target device for performing an operation intended by the user, based on the received voice signal. The voice assistant server 2000 may receive a voice signal that is an analog signal from the hub device 1000, and may convert a voice part into computer-readable text by performing ASR. The voice assistant server 2000 may interpret the text by using the first NLU model, and may determine the target device based on an interpretation result. Also, the voice assistant server 2000 may receive at least part of the text and information about the target device determined by the hub device 1000 from the hub device 1000. In this case, the hub device 1000 converts a user voice signal into text by using the ASR model and the first NLU model of the hub device 1000, and determines the target device by interpreting the text. Also, the hub device 1000 transmits at least part of the text and information about the determined target device to the voice assistant server 2000.

The voice assistant server 2000 may determine an operation to be performed by the target device requested by the user by using the second NLU model corresponding to the determined target device. The voice assistant server 2000 may receive information of the plurality of devices 4000 from the IoT server 3000. The voice assistant server 2000 may determine the target device by using the received information of the plurality of devices 4000. Also, the voice assistant server 2000 may control the target device to execute the determined operation by using the IoT server 3000 as a relay server for transmitting information about the determined operation. The IoT server 3000 may store the information about the plurality of devices 4000 that are connected through a network and are previously registered. In an embodiment of the disclosure, the IoT server 3000 may store at least one of identification information (e.g., device id information) of the plurality of devices 4000, a device type of each of the plurality of devices 4000, or function execution capability information of each of the plurality of devices 4000.

In an embodiment of the disclosure, the IoT server 3000 may store state information about power on/off of each of the plurality of devices 4000 or an operation that is being executed. The IoT server 3000 may transmit a control command for executing the determined operation to the target device from among the plurality of devices 4000. The IoT server 3000 may receive the information about the determined target device and the information about the determined operation from the voice assistant server 2000, and may transmit the control command to the target device based on the received information.

Figure 21A:
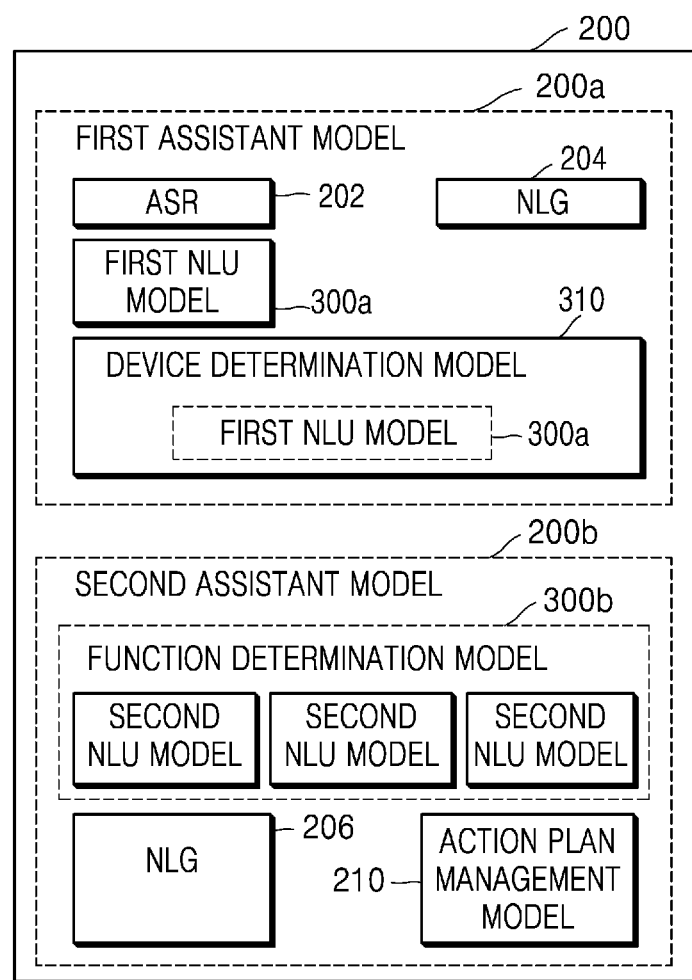
FIGS. 21A and 21B are diagrams illustrating a voice assistant model executable by the hub device and the voice assistant server, according to an embodiment of the disclosure.
Figure 21B:
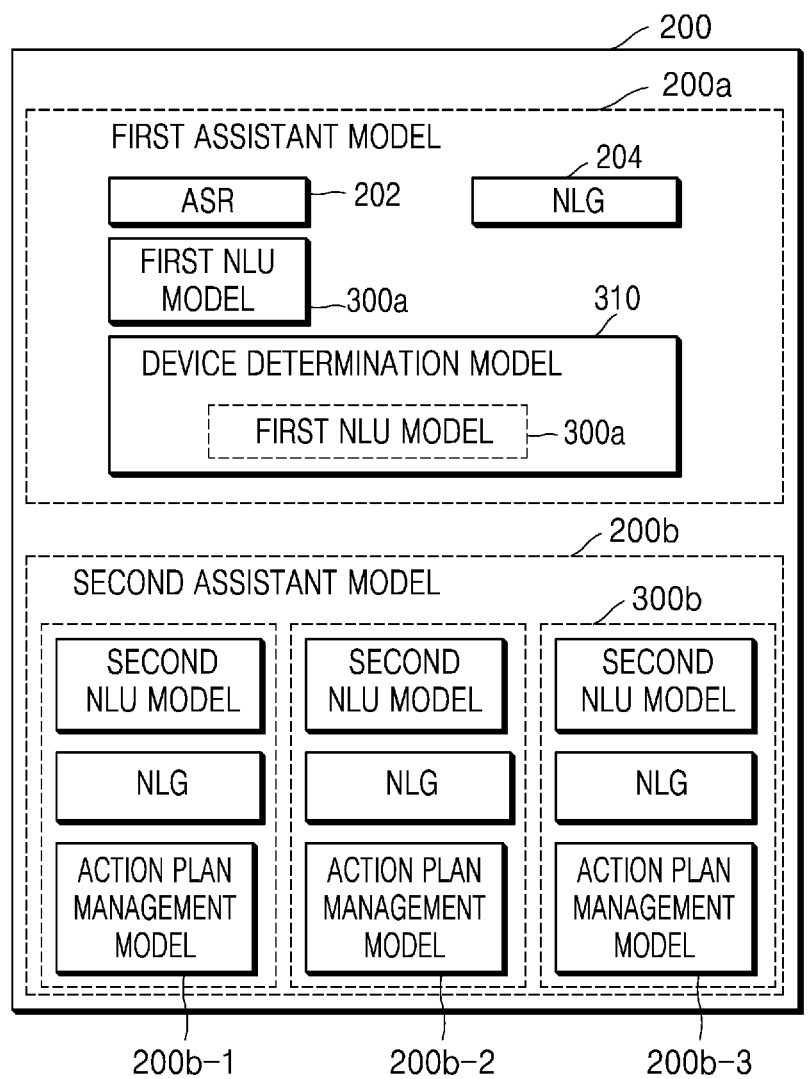

FIGS. 21A and 21B are diagrams illustrating a voice assistant model 200 executable by the hub device 1000 and the voice assistant server 2000 according to an embodiment of the disclosure.

Referring to FIGS. 21A and 21B, the voice assistant model 200 is implemented as software. The voice assistant model 200 may be configured to determine a user's intention from a voice input of the user and control a target device related to the user's intention. When a device controlled through the voice assistant model 200 is added, the voice assistant model 200 may include a first assistant model 200a configured to update an existing model to a new model through learning or the like and a second assistant model 200b configured to add a model corresponding to the added device to the existing model.

The first assistant model 200a is a model that determines the target device related to the user's intention by analyzing the voice input of the user. The first assistant model 200a may include an ASR model 202, an NLG model 204, a first NLU model 300a, and a device determination model 310. In an embodiment of the disclosure, the device determination model 310 may include a first NLU model 300a. In another embodiment of the disclosure, the device determination model 310 and the first NLU model 300a may be configured separate elements.

The device determination model 310 is a model for performing an operation of determining the target device by using an analysis result of the first NLU model 300a. The device determination model 310 may include a plurality of detailed models, and one of the plurality of detailed models may be the first NLU model 300a. The first NLU model 300a or the device determination model 310 may be an AI model.

When a device controlled through the voice assistant model 200 is added, the first assistant model 200a may update at least the device determination model 310 and the first NLU model 300a through learning. The learning may refer to learning using both training data used to train an existing device determination model and a first NLU model and additional training data related to the added device. Also, the learning may refer to updating the device determination model and the first NLU model by using only the additional training data related to the added device.

The second assistant model 200b that is a model specialized for a specific device is a model that determines an operation to be performed by the target device corresponding to the voice input of the user from among a plurality of operations performable by the specific device. In FIG. 21A, the second assistant model 200b may include a plurality of second NLU models 300b, an NLG model 206, and an action plan management module 210. The plurality of second NLU models 300b may respectively correspond to a plurality of different devices. A second NLU model, an NLG model, and an action plan management module may be models implemented through a rule-based system. In an embodiment of the disclosure, the second NLU model, the NLG model, and the action plan management model may be AI models. A plurality of second NLU models may be elements of a plurality of function determination models.

When a device controlled through the voice assistant model 200 is added, the second assistant model 200b may be configured to add a second NLU model corresponding to the added device. That is, the second assistant model 200b may further include a second NLU model corresponding to the added device in addition to the existing plurality of second NLU models 300b. In this case, the second assistant model 200b may be configured to select a second NLU model corresponding to the determined target device, from among the plurality of second NLU models including the added second NLU model, by using information about the target device determined through the first assistant model 200a.

Referring to FIG. 21B, the second assistant model 200b may include a plurality of action plan management models and a plurality of NLG models. In FIG. 21B, the plurality of second NLU models included in the second assistant model 200b may respectively correspond to the second NLU models 300b of FIG. 21A, each of the plurality of NLG models included in the second assistant model 200b may correspond to the NLG model 206 of FIG. 21A, and each of the plurality of action plan management models included in the second assistant model 200b may correspond to the action plan management module 210 of FIG. 21A.

In FIG. 21B, the plurality of action plan management models may be configured to respectively correspond to the plurality of second NLU models. Also, the plurality of NLG models may be configured to respectively correspond to the plurality of second NLU models. In another embodiment of the disclosure, one NLG model may be configured to correspond to the plurality of second NLU models, and one action plan management model may be configured to correspond to the plurality of second NLU models.

In FIG. 21B, when a device controlled through the voice assistant model 200 is added, the second assistant model 200b may be configured to add a second NLU model, an NLG model, and an action plan management model corresponding to the added device.

In FIG. 21B, when a device controlled through the voice assistant model 200 is added, the first NLU model 300a may be configured to be updated to a new model through learning or the like. Also, when the device determination model 310 includes the first NLU model 300a, the device determination model 310 may be configured so that an existing model is entirely updated to a new model through learning or the like when a device controlled through the voice assistant model 200 is added. The first NLU model 300a or the device determination model 310 may be an AI model. The learning may refer to learning using both training data used to train an existing device determination model and a first NLU model and additional training data related to the added device. Also, the learning may refer to updating the device determination model and the first NLU model by using only the additional training data related to the added device.

In FIG. 21B, when a device controlled through the voice assistant model 200 is added, the second assistant model 200b may be updated by adding a second NLU model, an NLG model, and an action plan management model corresponding to the added device to an existing model. The second NLU model, the NLG model, and the action plan management model may be models implemented through a rule-based system.

In an embodiment of FIG. 21B, the second NLU model, the NLG model, and the action plan management model may be AI models. The second NLU model, the NLG model, and the action plan management model may each be managed as one device according to a corresponding device. In this case, the second assistant model 200b may include a plurality of second assistant models 200b-1, 200b-2, and 200b-3 respectively corresponding to a plurality of devices. For example, a second NLU model corresponding to a TV, an NLG model corresponding to the TV, and an action plan management model corresponding to the TV may be managed as the second assistant model 200b-1. Also, a second NLU model corresponding to a speaker, an NLG model corresponding to the speaker, and an action plan management model corresponding to the speaker may be managed as the second assistant model 200b-2 corresponding to the speaker. Also, a second NLU model corresponding to a refrigerator, an NLG model corresponding to the refrigerator, and an action plan management model corresponding to the refrigerator may be managed as the second assistant model 200b-3 corresponding to the refrigerator.

When a device controlled through the voice assistant model 200 is added, the second assistant model 200b may be configured to add a second assistant model corresponding to the added device. That is, the second assistant model 200b may further include the second assistant model corresponding to the added device in addition to the existing plurality of second assistant models 200b-1 through 200b-3. In this case, the second assistant model 200b may be configured to select a second assistant model corresponding to the determined target device, from among the plurality of second assistant models including the second assistant model corresponding to the added device, by using information about the target device determined by the first assistant model 200a.

A program executed by the hub device 1000, the voice assistant server 2000, and the plurality of devices 4000 according to the disclosure may be realized as hardware components, software components, and/or a combination of hardware components and software components. The program may be executed by any system capable of executing computer-readable instructions.

Software may include a computer program, code, instructions, or a combination of one or more thereof, and may configure a processing device to operate as required or separately or collectively command the processing device.

Software may be implemented in a computer program that includes instructions stored in a computer-readable storage medium. Computer-readable storage media may include, for example, magnetic storage media (e.g., ROM, RAM, floppy disks, hard disks, etc.) and optical reading media (e.g., compact disk (CD)-ROM, DVD, etc.). The computer-readable recording media may be distributed in computer systems connected in a network and may store and execute computer-readable code in a distributed fashion. The media may be computer-readable, may be stored in a memory, and may be executed by a processor.

The computer-readable storage media may be provided in the form of non-transitory storage media. Here, 'non-transitory' means that the storage medium does not include a signal and is tangible, but does not distinguish whether data is stored semi-permanently or temporarily on the storage medium.

Further, the program according to the embodiments of the disclosure may be provided in a computer program product. The computer program product is a product purchasable between a seller and a purchaser.

The computer program product may include a software program and a computer-readable storage medium in which the software program is stored. For example, the computer program product may include a software program-type product (e.g., a downloadable application) electronically distributed by a manufacturer of a device or electronic markets (e.g., Google Play™ store, App Store, etc.). For electronic distribution, at least a portion of the software program may be stored in storage media or temporarily generated. In this case, the storage media may be a server of the manufacturer, a server of the electronic market, or a storage medium of a broadcasting server temporarily storing the software program.

The computer program product may include a storage medium of a server or a storage medium of a device in a system including the server and the device. Alternatively, when there is a third device (e.g., a smartphone) connected with the server or the device for communication, the computer program product may include a storage medium of the third device. Alternatively, the computer program product may include a software program transmitted to the device or the third device from the server or to the device from the third device.

In this case, one of the server, the device, and the third device may perform a method according to the embodiments of the disclosure by executing the computer program product. Alternatively, at least two of the server, the device, and the third device may perform the method according to the embodiments of the disclosure in a distributed fashion by executing the computer program product.

For example, the server (e.g., an IoT server or a voice assistant server) may execute the computer program product stored in the server and control the device connected with the server for communication to perform the method according to the embodiments of the disclosure.

As another example, the third device may execute the computer program product and control the device connected to the third device for communication to perform the method according to the embodiments of the disclosure.

When the third device executes the computer program product, the third device may download the computer program product from the server and execute the downloaded computer program product. Alternatively, the third device may execute the computer program product provided in a free-loaded state and perform the method according to the embodiments of the disclosure.

Although the embodiments of the disclosure have been described by the limited embodiments and the drawings as described above, various modifications and variations are possible by one of ordinary skill in the art from the above description. For example, the described techniques may be performed in a different order than the described method, and/or elements of the described computer system, module, etc. may be combined or integrated in a different form than the described method, or may be replaced or substituted by other elements or equivalents to achieve appropriate results.

What is claimed is:

1. A device for controlling a device based on a voice input, the device comprising:
   a communication interface configured to perform data communication with at least one of a plurality of devices, a voice assistant server, or an Internet of Things (IoT) server;
   a microphone configured to receive a voice input of a user;
   a memory storing a program comprising one or more instructions; and
   a processor configured to execute the one or more instructions of the program stored in the memory,
   wherein the processor is further configured to execute the one or more instructions to:
   convert the voice input received through the microphone into text by performing automatic speech recognition (ASR),
   determine an operation-performing device capable of performing an operation corresponding to the text from among the plurality of devices, by using a device determination model,
   identify a device that stores function determination model corresponding to the determined operation-performing device by using function determination model information, and
   control the communication interface to transmit at least part of the text to the identified device.

2. The device of claim 1, wherein
   the device determination model comprises a first natural language understanding (NLU) model configured to analyze the text and determine the operation-performing device based on a result of the analyzing of the text.

3. The device of claim 1, wherein
   the function determination model comprises a second NLU model configured to analyze the at least part of the text and obtain operation information about an operation to be performed by the determined operation-performing device based on a result of the analyzing of the at least part of the text.

4. The device of claim 1, wherein
   the function determination model information comprises information about whether each of the plurality of devices itself stores a function determination model used to obtain operation information for performing an operation.

5. The device of claim 1, wherein the processor is further configured to obtain, from the plurality of devices, storage information of the function determination model comprising at least one of device identification information, an IP address, or a MAC address of each of the plurality of devices.

6. The device of claim 1, wherein
   the function determination model corresponding to the determined operation-performing device is stored in at least one of the memory of the device, an internal memory of the operation-performing device itself, or the voice assistant server.

7. The device of claim 1, wherein
   the plurality of devices are logged in by a same user account as an user account of the device and connected to the device through a network.

8. The device of claim 1, wherein the processor is further configured to:

receive update data of the device determination model from the voice assistant server, by using the communication interface, and update the device determination model, by using the received update data.

9. The device of claim 8, wherein
the update data comprises data for updating the device determination model to determine an updated function from the text and determine the operation-performing device corresponding to the updated function, based on update information of the function determination model included in the operation-performing device.

10. The device of claim 1, wherein the processor is further configured to:

receive, by using the communication interface, device information of a new device comprising at least one of device identification information of the new device, storage information of a device determination model of the new device, or storage information of a function determination model of the new device, from the voice assistant server, and update the device determination model, by adding the new device to device candidates determinable as the operation-performing device by the device determination model by using the received device information of the new device.

11. A method, performed by a device, for controlling a device based on a voice input, the method comprising:

receiving a voice input of a user by the device;

converting, by the device, the received voice input into text by performing automatic speech recognition (ASR);

determining an operation-performing device capable of performing an operation corresponding to the text from among a plurality of devices, by using a device determination model;

identifying a device that stores function determination model corresponding to the determined operation-performing device by using function determination model information; and transmitting at least part of the text to the identified device.

12. The method of claim 11, wherein
the device determination model comprises a first natural language understanding (NLU) model configured to analyze the text and determine the operation-performing device based on a result of the analyzing of the text.

13. The method of claim 11, wherein
the function determination model comprises a second NLU model configured to analyze the at least part of the text and obtain operation information related to an operation to be performed by the determined operation-performing device based on a result of the analyzing of the at least part of the text.

14. The method of claim 11, wherein
the function determination model information comprises information about whether each of the plurality of devices itself stores a function determination model used to obtain operation information for performing an operation.

15. The method of claim 11, further comprising:
obtaining, from the plurality of devices, storage information of the function determination model comprising at least one of device identification information, an IP address, or a MAC address of each of the plurality of devices.

16. The method of claim 11, wherein
the function determination model corresponding to the determined operation-performing device is stored in at least one of the memory of the device, an internal memory of the operation-performing device itself, or a voice assistant server.

17. The method of claim 11, wherein
the plurality of devices are logged in by a same user account as an user account of the device and connected to the device through a network.

18. The method of claim 11, further comprising:
receiving update data of the device determination model from a voice assistant server; and
updating the device determination model, by using the received update data.

19. The method of claim 18, wherein
the update data comprises data for updating the device determination model to determine an updated function from the text and determine the operation-performing device corresponding to the updated function, based on update information of the function determination model included in the operation-performing device.

20. The method of claim 11, further comprising:
receiving device information of a new device comprising at least one of device identification information of the new device, storage information of a device determination model of the new device, or storage information of a function determination model of the new device, from a voice assistant server; and
updating the device determination model, by adding the new device to device candidates determinable as the operation-performing device by the device determination model by using the received device information of the new device.

* * * * *